United States Patent
Lehr et al.

(10) Patent No.: US 7,254,734 B2
(45) Date of Patent: *Aug. 7, 2007

(54) STRUCTURE CABLING SYSTEM

(75) Inventors: Amir Lehr, Tel Aviv (IL); Ilan Atias, Haifa (IL); Dror Korcharz, Bat Yam (IL); David Pincu, Holon (IL)

(73) Assignee: PowerDsine, Ltd. - Microsemi Corporation, Hod Hasharon (IL)

( * ) Notice: Subject to any disclaimer, the term of this patent is extended or adjusted under 35 U.S.C. 154(b) by 701 days.

This patent is subject to a terminal disclaimer.

(21) Appl. No.: 10/712,331

(22) Filed: Nov. 12, 2003

(65) Prior Publication Data

US 2004/0095917 A1    May 20, 2004

(51) Int. Cl.
  *G06F 11/30* (2006.01)
(52) U.S. Cl. .......................................... 713/340; 702/64
(58) Field of Classification Search ................ 713/310, 713/323, 340; 340/310.11, 425.2, 657; 702/64
  See application file for complete search history.

(56) References Cited

U.S. PATENT DOCUMENTS

| | | | |
|---|---|---|---|
| 3,863,036 A | 1/1975 | McCrudden | |
| 4,156,799 A | 5/1979 | Cave | |
| 4,467,314 A | 8/1984 | Weikel | |
| 4,495,494 A | 1/1985 | McCune | |
| 4,528,667 A | 7/1985 | Fruhauf | |
| 4,654,640 A | 3/1987 | Carll | |
| 4,692,761 A | 9/1987 | Robinton | |
| 4,731,829 A | 3/1988 | Bonnet | |
| 4,733,389 A | 3/1988 | Puvogel | |
| 4,760,382 A | 7/1988 | Faulkner | |
| 4,799,211 A | 1/1989 | Felker et al. | |
| 4,815,106 A | 3/1989 | Propp et al. | |
| 4,885,563 A | 12/1989 | Johnson et al. | |
| 4,903,006 A | 2/1990 | Boomgaard | |
| 4,958,371 A | 9/1990 | Damoci | |
| 4,992,774 A | 2/1991 | McCullough | |
| 5,020,100 A | 5/1991 | Gardiner | |
| 5,032,833 A | 7/1991 | Laporte | |
| 5,059,948 A | 10/1991 | Desmeules | |
| 5,066,939 A | 11/1991 | Mansfield, Jr. | |
| 5,093,828 A | 3/1992 | Braun | |
| 5,148,144 A | 9/1992 | Sutterlin et al. | |

(Continued)

FOREIGN PATENT DOCUMENTS

WO    WO9217968 A1    10/1992
WO    WO9623377 A1    8/1996

OTHER PUBLICATIONS

Universal Serial Bus Specification—Rev 1.0, Jan. 15, 1996; Sec 4.2.1 pp. 29-30.

(Continued)

*Primary Examiner*—Thuan Du
(74) *Attorney, Agent, or Firm*—Simon Kahn

(57) ABSTRACT

This invention discloses a local area network including a hub, a plurality of nodes, communication cabling connecting the plurality of nodes to the hub for providing data communication, and a power supply distributor operative to provide at least some operating power to at least some of the plurality of nodes via the communication cabling.

23 Claims, 59 Drawing Sheets

U.S. PATENT DOCUMENTS

| | | |
|---|---|---|
| 5,192,231 A | 3/1993 | Dolin |
| 5,351,272 A | 9/1994 | Abraham |
| 5,406,260 A | 4/1995 | Cummings |
| 5,452,344 A | 9/1995 | Larson |
| 5,491,463 A | 2/1996 | Sargeant |
| 5,652,893 A | 7/1997 | Ben Meir et al. |
| 5,664,202 A * | 9/1997 | Chen et al. ............... 713/340 |
| 5,684,826 A | 11/1997 | Ratner |
| 5,689,230 A | 11/1997 | Merwin |
| 5,799,196 A | 8/1998 | Flannery |
| 5,828,293 A | 10/1998 | Rickard |
| 5,835,005 A | 11/1998 | Furukawa |
| 5,859,596 A | 1/1999 | McRae |
| 5,884,086 A | 3/1999 | Amoni et al. |
| 5,991,885 A | 11/1999 | Chang ..................... 713/300 |
| 5,994,998 A | 11/1999 | Fisher et al. |
| 6,033,101 A | 3/2000 | Reddick et al. |
| 6,115,468 A | 9/2000 | De Nicolo |
| 6,125,448 A | 9/2000 | Schwan et al. |
| 6,140,911 A | 10/2000 | Fisher et al. |
| 6,218,930 B1 | 4/2001 | Katzenberg et al. |
| 6,243,818 B1 | 6/2001 | Schwan |
| 6,301,527 B1 | 10/2001 | Butland et al. |
| 6,301,674 B1 * | 10/2001 | Saito et al. ................. 713/340 |
| 6,329,906 B1 | 12/2001 | Fisher et al. |
| 6,348,874 B1 | 2/2002 | Cole et al. ............ 340/825.01 |
| 6,377,874 B1 | 4/2002 | Ykema |
| 6,393,607 B1 | 5/2002 | Hughes et al. |
| 6,480,510 B1 | 11/2002 | Binder |
| 6,496,105 B2 | 12/2002 | Fisher et al. |
| 6,526,516 B1 * | 2/2003 | Ishikawa et al. ............ 713/340 |
| 6,753,761 B2 | 6/2004 | Fisher et al. |
| 6,795,321 B2 * | 9/2004 | Balakrishnan et al. ... 363/21.15 |
| 2003/0058085 A1 | 3/2003 | Fisher et al. |

OTHER PUBLICATIONS

Universal Serial Bus Specification—Rev 1.0, Jan. 15, 1996; Sec 7.2.1-7.2.1.5 pp. 131-135.

Universal Serial Bus Specification—Rev 1.0, Jan. 15, 1996; Sec 9.2.1-9.2.5.1 pp. 170-171.

Universal Serial Bus Specification—Rev 1.0, Jan. 15, 1996; Sec 9.6.2 pp. 184-185.

Lynn K "Universal Serial Bus (USB) Power Management"; WESCON/97 Conference Proceedings, Santa Clara, CA, USA, Nov. 4-6, 1997; New York, N.Y.; IEEE Nov. 4, 1997 pp. 434-441 XP010254418.

Berfield, J.M., "Control the Power Interface of USB's Voltage Bus", Electronic Design, U.S. Penton Publishing, Cleveland Ohio, vol. 45, No. 15, Jul. 1997, pp. 80, 82,84,86.

RAD Data Comm. Ltd, "Token Ring Design Guide", 1994, #TR-20-01/94, Chapters 1 through 4-21.

PowerDsine Product Catalog 1999, pp. 56-79 and 95-105, ISRAEL.

An Interoperable Solution for FDDI Signaling Over Shielded Twisted Pair: Advanced Micro Devices et al; May 21, 1991, pp. 1-16.

\* cited by examiner

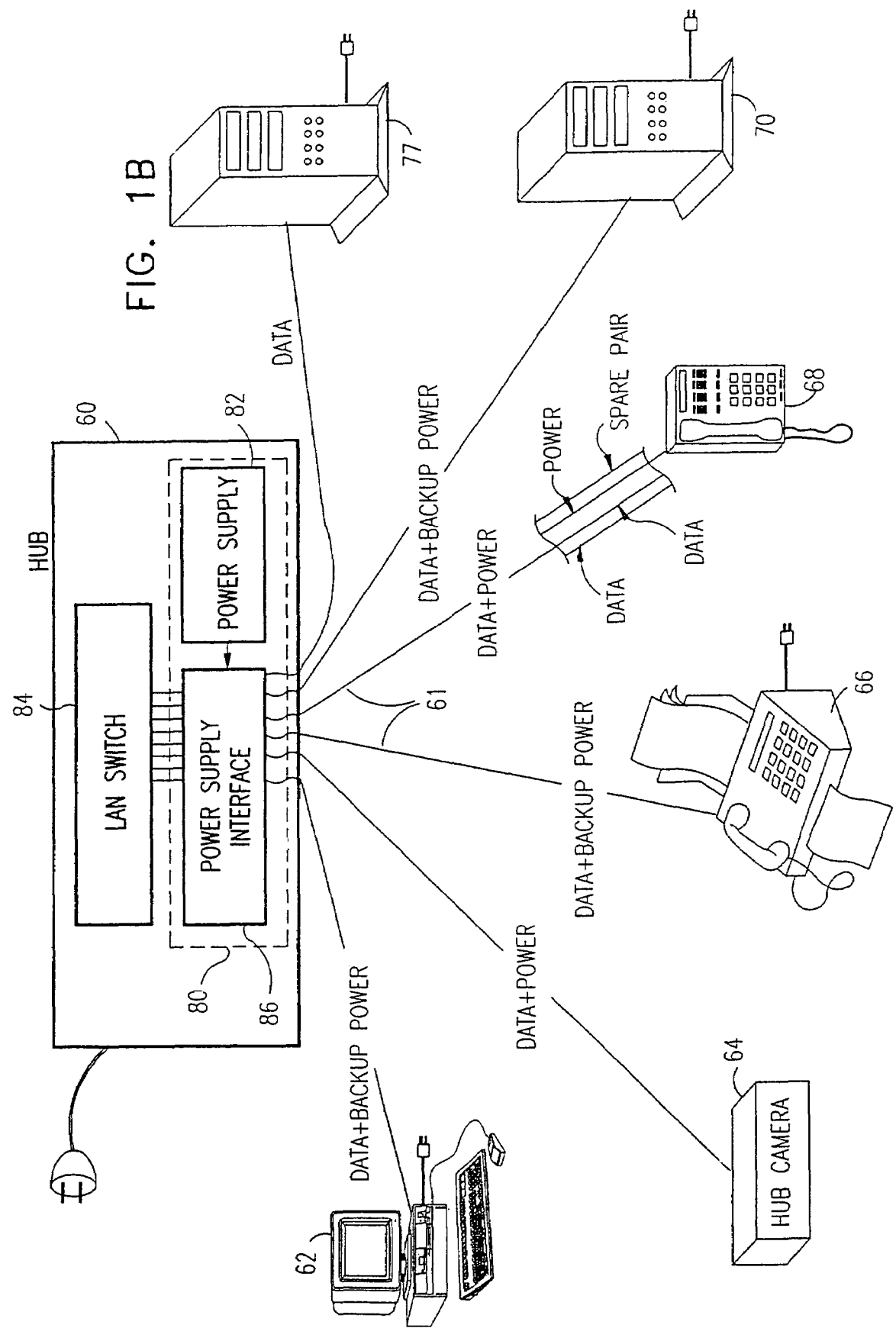

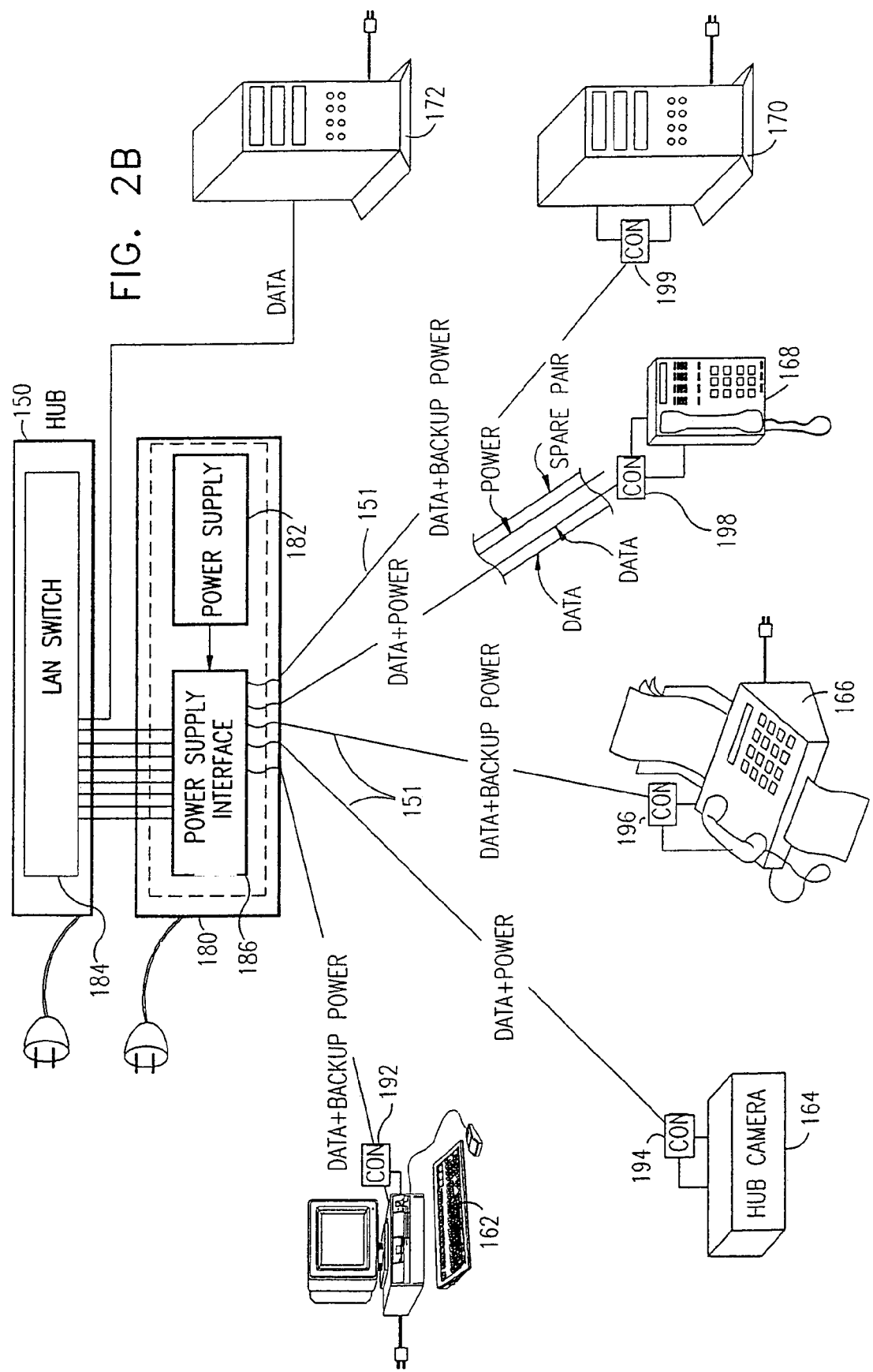

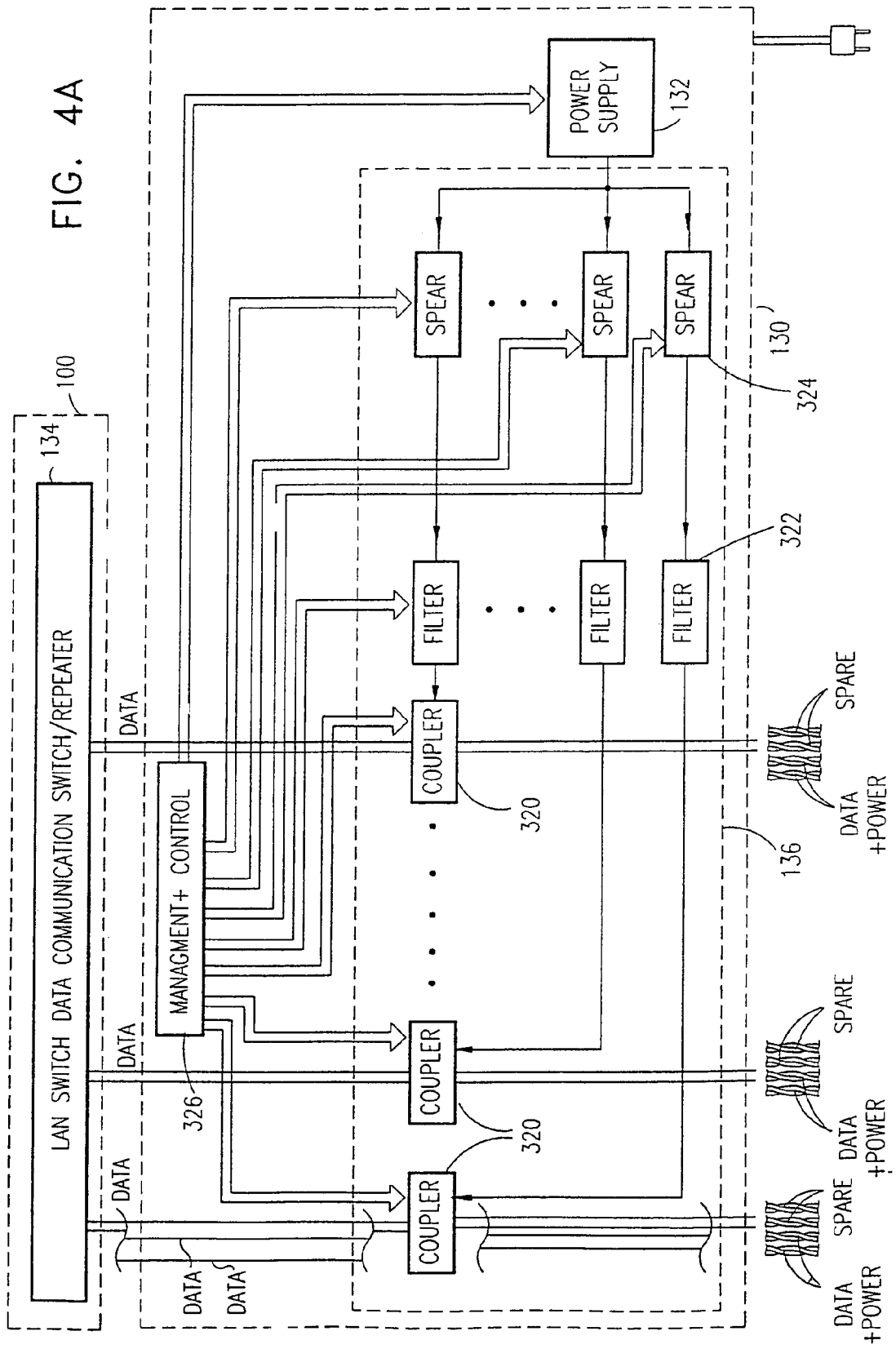

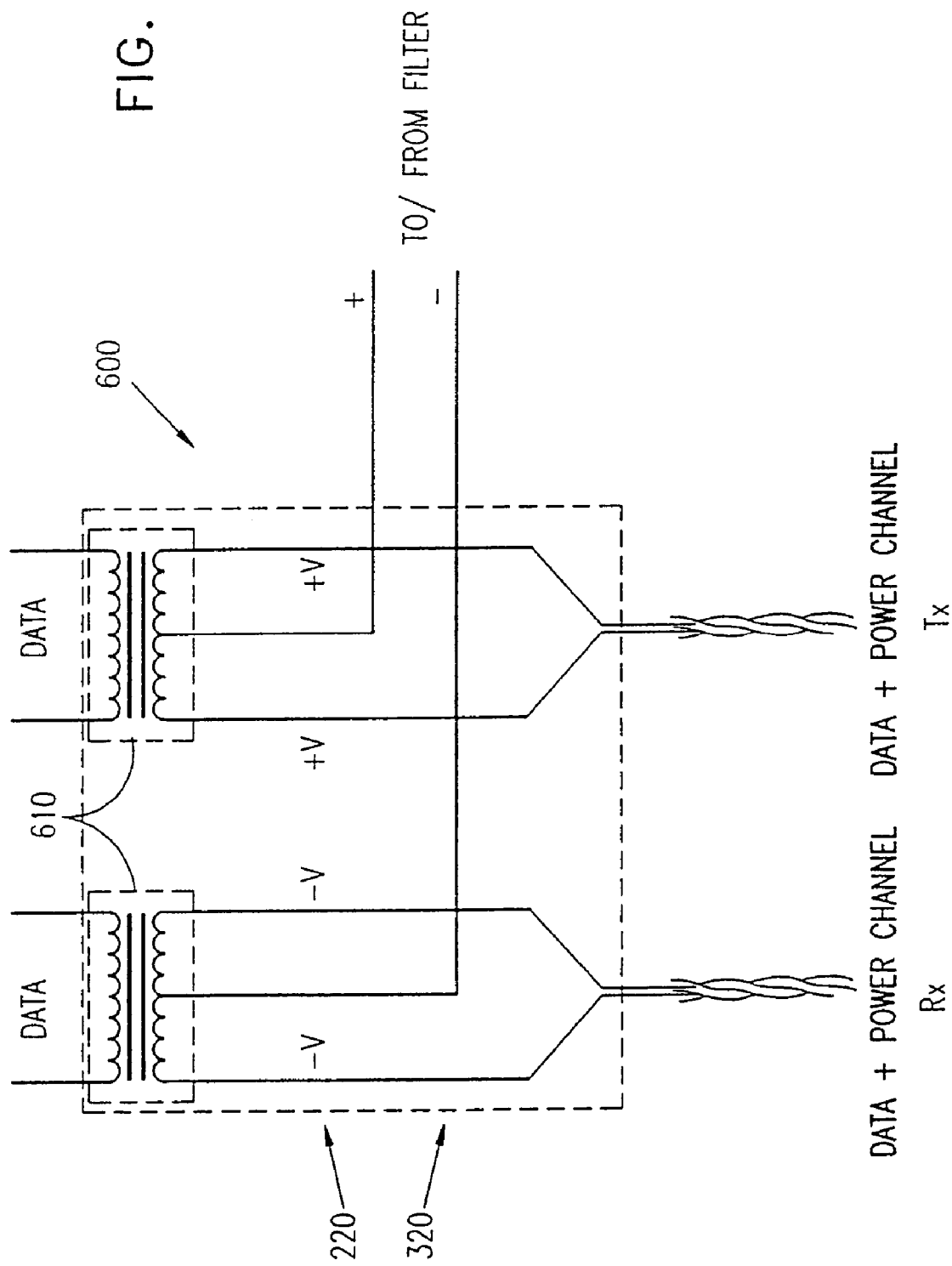

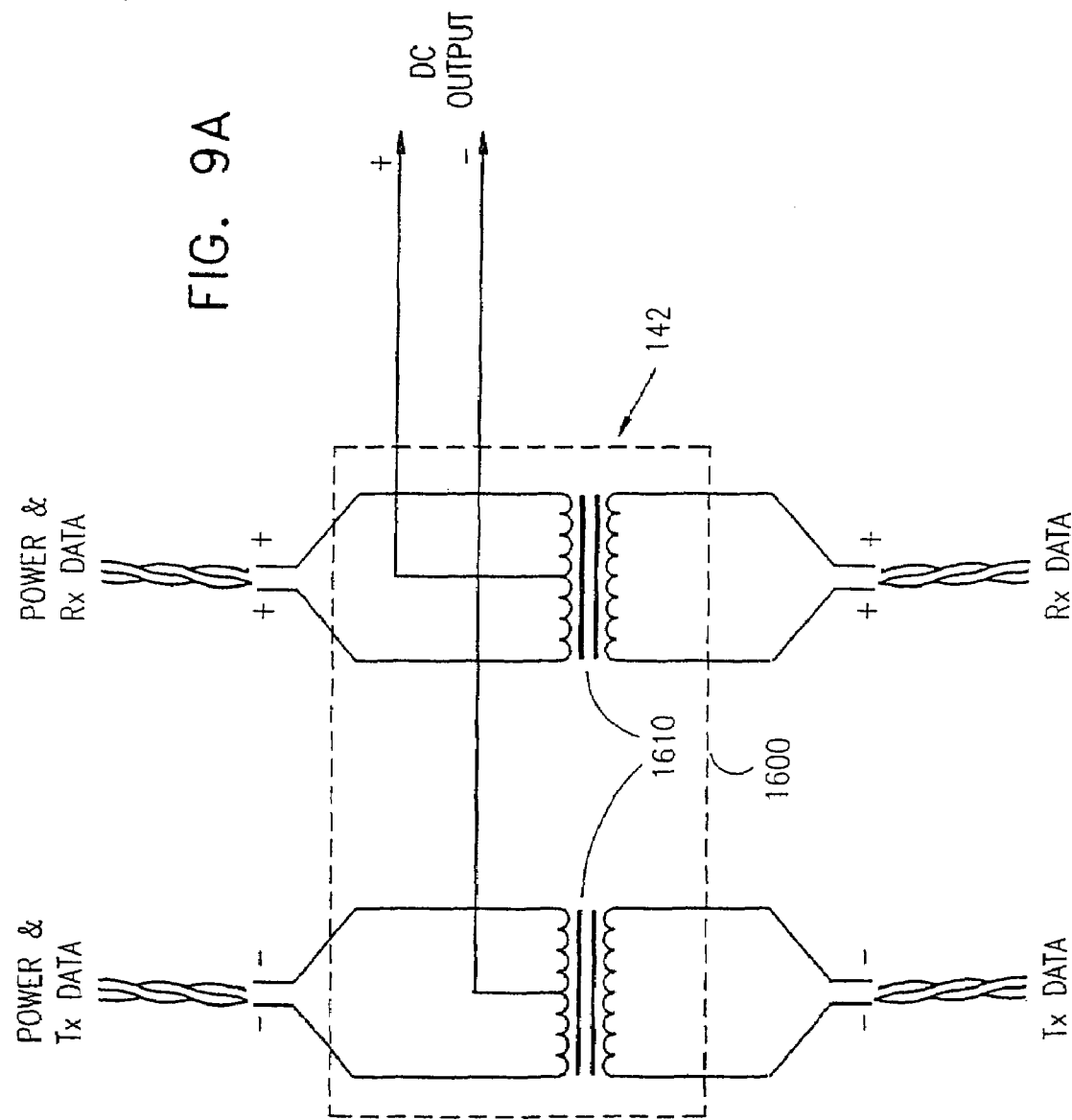

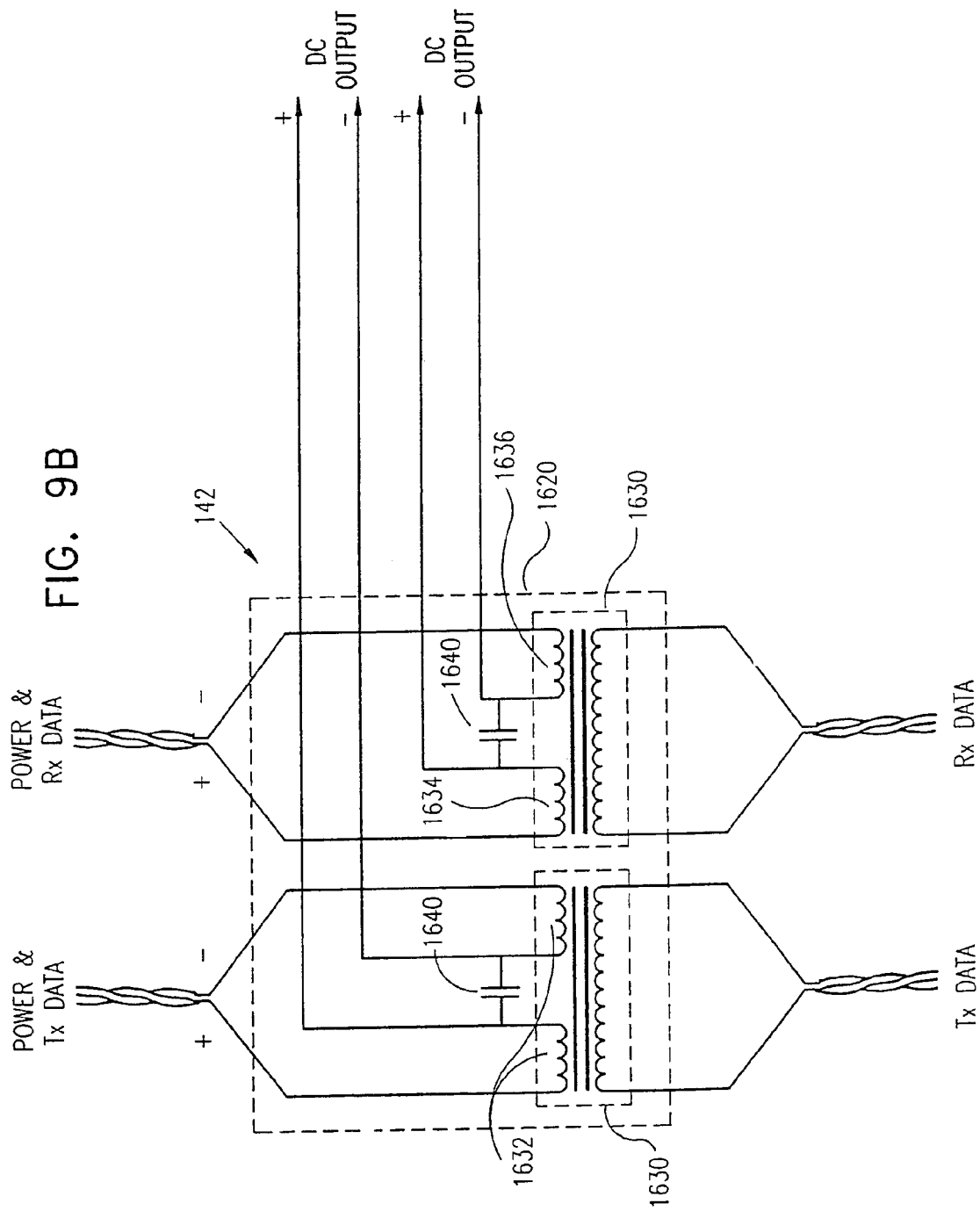

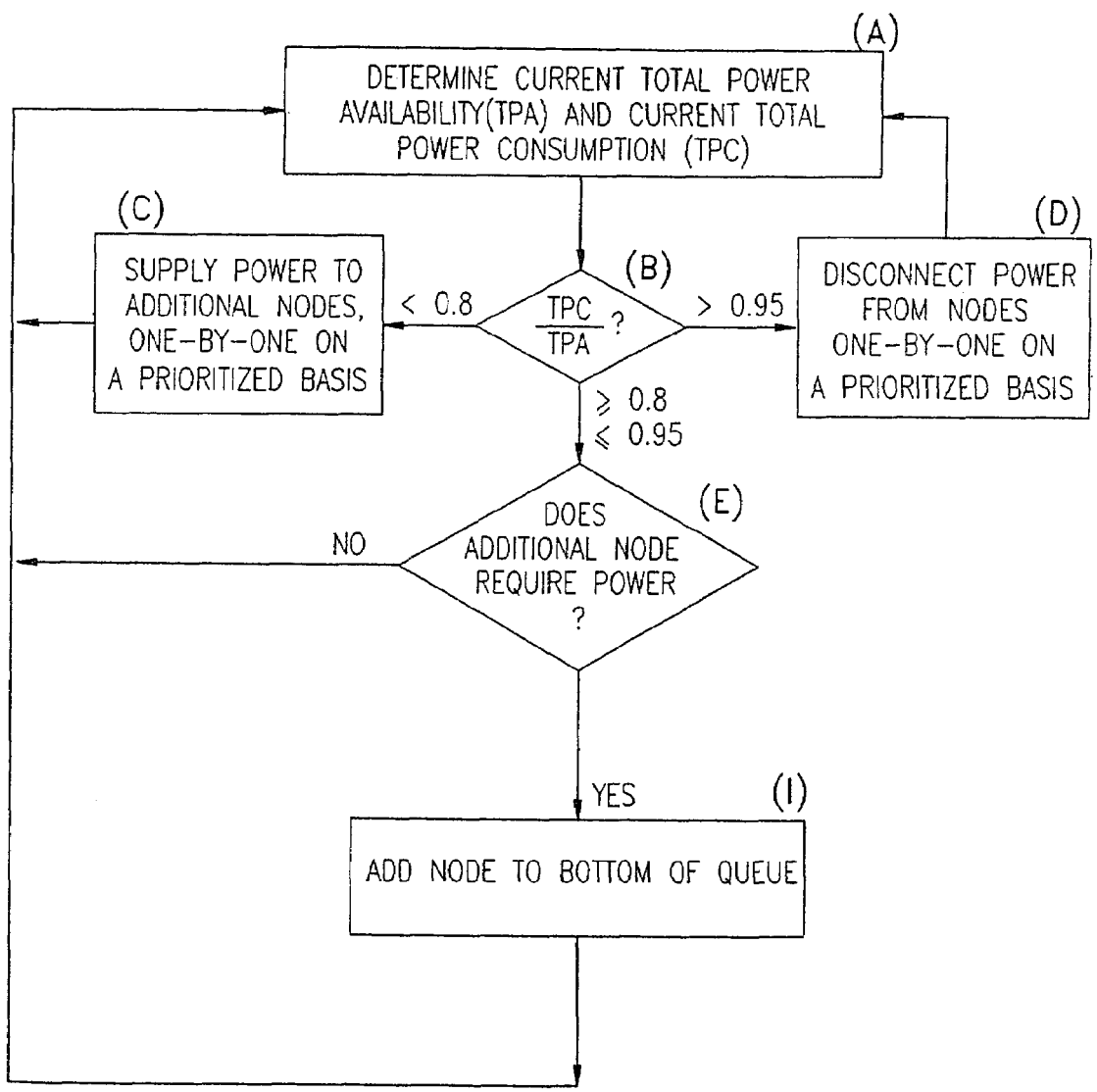
FIG. 1.9C

INVOLUNTARY POWER MANAGEMENT, FULL
FUNCTIONALITY OR REDUCED FUNCTIONALITY, EMERGENCY OVERRIDE

VOLUNTARY POWER MANAGEMENT, FULL
FUNCTIONALITY OR REDUCED FUNCTIONALTY, EMERGENCY OVERRIDE

STRUCTURE CABLING SYSTEM

FIELD OF THE INVENTION

The present invention relates to structured cabling systems and more particularly to structured cabling systems used in local area networks.

BACKGROUND OF THE INVENTION

Structured cabling systems are well known for use in institutional infrastructure. Such systems provide a standardized yet flexible platform for a dynamic communications environment. Typically structure cabling systems employ twisted copper pairs which are installed in accordance with predetermined criteria. Structured cabling systems are conventionally employed for telephone, data communications, as well as for alarms, security and access control applications.

SUMMARY OF THE INVENTION

The present invention seeks to provide an enhanced structured cabling system and local area network employing such a system.

There is thus provided in accordance with a preferred embodiment of the present invention a local area network including a hub, a plurality of nodes, communication cabling connecting the plurality of nodes to the hub for providing data communication; and a power supply distributor operative to provide at least some operating power to at least some of the plurality of nodes via the communication cabling.

Further in accordance with a preferred embodiment of the present invention the communication cabling includes at least part of a structured cabling system.

Still further in accordance with a preferred embodiment of the present invention the power supply distributor is located within the hub.

Additionally in accordance with a preferred embodiment of the present invention the power supply distributor is located outside the hub.

Moreover in accordance with a preferred embodiment of the present invention the power supply distributor is located partially within the hub and partially outside the hub.

Still further in accordance with a preferred embodiment of the present invention the operating power supplied by said power supply distributor to at least some of said plurality nodes via said communication cabling includes backup power.

Additionally in accordance with a preferred embodiment of the present invention the hub includes a data communication concentrator, the power supply distributor includes a combiner, and the communication cabling connects the data communication concentrator via the combiner to the nodes.

Sill further in accordance with a preferred embodiment of the present invention the hub includes a data communication concentrator and wherein the power supply distributor is also located within the hub.

Additionally in accordance with a preferred embodiment of the present invention the hub includes a data communication concentrator and wherein the power supply distributor is also located within the hub and includes a power supply and a combiner, the combiner coupling power from the power supply to the communication cabling which also carries data from the data communication concentrator.

Preferably the data communication concentrator comprises a LAN switch which functions as a data communication switch/repeater.

Additionally in accordance with a preferred embodiment of the present invention the plurality of nodes includes at least one of the following types of nodes: wireless LAN access points, emergency lighting system elements, paging loudspeakers, CCTV cameras, alarm sensors, door entry sensors, access control units, laptop computers, IP telephones, hubs, switches, routers, monitors and memory backup units for PCs and workstations.

Still further in accordance with a preferred embodiment of the present invention the hub includes a data communication concentrator the power supply distributor includes a combiner and a power supply, the communication cabling connects the data communication concentrator via the combiner to the nodes, and the combiner includes a plurality of couplers, each of which is connected to an output of the power supply.

Further in accordance with a preferred embodiment of the present invention the hub includes a data communication concentrator, the power supply distributor includes a combiner and a power supply, the communication cabling connects the data communication concentrator via the combiner to the nodes, and the combiner comprises a plurality of couplers and a plurality of filters, each coupler being connected via a filter to an output of the power supply.

Still further according to a preferred embodiment of the present invention the hub includes a data communication concentrator, the power supply distributor includes a combiner and a power supply, the communication cabling connects the data communication concentrator via the combiner to the nodes, and the combiner includes a plurality of couplers and a plurality of filters and a plurality of smart power allocation and reporting circuits (SPEARs), each coupler being connected via a filter and a SPEAR to an output of the power supply.

Moreover in accordance with a preferred embodiment of the present invention the hub includes a data communication concentrator, the power supply distributor includes a combiner and a power supply, and the power supply includes a power failure backup facility.

Additionally or alternatively the hub includes a data communication concentrator; the power supply distributor includes a combiner and a power supply, the communication cabling connects the data communication concentrator via the combiner to the nodes, and the combiner comprises a plurality of couplers and a plurality of filters, each coupler being connected via a filter to an output of the power supply.

Moreover according to a preferred embodiment of the present invention the hub includes a data communication concentrator, the power supply distributor includes a combiner and a power supply, the communication cabling connects the data communication concentrator via the combiner to the nodes, and the combiner includes a plurality of couplers and a plurality of filters and a plurality of smart power allocation and reporting circuits (SPEARs), each coupler being connected via a filter and a SPEAR to an output of the power supply.

Preferably the hub includes a data communication concentrator, the power supply distributor includes a combiner and a power supply, the communication cabling connects the data communication concentrator via the combiner to the nodes, and the combiner includes a plurality of couplers and a plurality of filters, each coupler being connected via a filter to an output of the power supply.

Additionally or alternatively the hub includes a data communication concentrator, the power supply distributor includes a combiner and a power supply, the communication cabling connects the data communication concentrator via the combiner to the nodes, and the combiner comprises a plurality of couplers and a plurality of filters and a plurality of smart power allocation and reporting circuits (SPEARs), each coupler being connected via a filter and a SPEAR to an output of the power supply.

Preferably the hub includes a data communication concentrator, the power supply distributor includes a combiner and a power supply, the communication cabling connects the data communication concentrator via the combiner to the nodes, and the combiner includes a plurality of couplers and a plurality of filters, each coupler being connected via a filter to an output of the power supply.

Additionally or alternatively the hub includes a data communication concentrator, the power supply distributor includes a combiner and a power supply, the communication cabling connects the data communication concentrator via the combiner to the nodes, and the combiner includes a plurality of couplers and a plurality of filters and a plurality of smart power allocation and reporting circuits (SPEARs), each coupler being connected via a filter and a SPEAR to an output of the power supply.

Further in accordance with a preferred embodiment of the present invention the power supply distributor is operative to provide electrical power along the communication cabling without unacceptable degradation of the digital communication.

Still further in accordance with a preferred embodiment of the present invention the communication cabling comprises at least one twisted wire pair connected to each node and wherein power is transmitted over a twisted wire pair along which data is also transmitted.

Preferably the hub includes a data communication concentrator, the power supply distributor includes a power supply interface and a power supply, the communication cabling connects the data communication concentrator via the power supply interface to the nodes, and power supply interface includes a plurality of filters and a plurality of smart power allocation and reporting circuits (SPEARs), each filter being connected via a SPEAR to an output of the power supply.

Additionally in accordance with a preferred embodiment of the present invention the communication cabling comprises at least two twisted wire pairs connected to each node and wherein power is transmitted over a twisted wire pair different from that along which data is transmitted.

Preferably the hub includes a data communication concentrator, the power supply distributor includes a power supply interface and a power supply, the communication cabling connects the data communication concentrator via the power supply interface to the nodes, and the power supply interface includes a plurality of filters and a plurality of smart power allocation and reporting circuits (SPEARs), each filter being connected via a SPEAR to an output of the power supply.

Still further in accordance with a preferred embodiment of the present invention the hub includes a data communication concentrator, the power supply distributor includes a combiner and a power supply, the communication cabling connects the data communication concentrator via the combiner to the nodes, the combiner includes a plurality of couplers and a plurality of filters and a plurality of smart power allocation and reporting circuits (SPEARs), each coupler being connected via a filter and a SPEAR to an output of the power supply, and each coupler has at least two ports, one of which is connected to a port of the data communication concentrator and the other of which is connected, via communication cabling, to one of the plurality of nodes.

There is also provided in accordance with a preferred embodiment of the present invention a local area network node for use in a local area network including a hub, a plurality of nodes, communication cabling connecting the plurality of nodes to the hub for providing digital communication and a power supply distributor operative to provide at least some operating power to at least some of the plurality of nodes via the hub and the communication cabling, the local area network node including a communications cabling interface receiving both power and data and separately providing power to a node power input and data to a node data input.

Further in accordance with a preferred embodiment of the present invention the communications cabling interface is internal to at least one of the plurality of nodes.

Still further in accordance with a preferred embodiment of the present invention the communications cabling interface is external to at least one of the plurality of nodes.

Additionally in accordance with a preferred embodiment of the present invention the power supply distributor is operative to provide electrical power along the communication cabling without unacceptable degradation of the digital communication.

Still further in accordance with a preferred embodiment of the present invention the communication cabling includes at least one twisted wire pair connected to each node and wherein power is transmitted over a twisted wire pair along which data is also transmitted.

Additionally in accordance with a preferred embodiment of the present invention the communication cabling includes at least two twisted wire pairs connected to each node and wherein power is transmitted over a twisted wire pair different from that along which data is transmitted.

Preferably the power supply distributor is operative to provide electrical power along the communication cabling without unacceptable degradation of the digital communication.

Additionally the communication cabling may include at least one twisted wire pair connected to each node and wherein power is transmitted over a twisted wire pair along which data is also transmitted.

Further more in accordance with a preferred embodiment of the present invention the communication cabling includes at least two twisted wire pairs connected to each node and wherein power is transmitted over a twisted wire pair different from that along which data is transmitted.

Preferably the power supply distributor is operative to provide electrical power along the communication cabling without unacceptable degradation of the digital communication.

Further in accordance with a preferred embodiment of the present invention the communication cabling includes at least one twisted wire pair connected to each node and wherein power is transmitted over a twisted wire pair along which data is also transmitted.

Still further in accordance with a preferred embodiment of the present invention the communication cabling includes at least two twisted wire pairs connected to each node and wherein power is transmitted over a twisted wire pair different from that along which data is transmitted.

Moreover in accordance with a preferred embodiment of the present invention the hub includes a data communication concentrator, the power supply distributor includes a combiner, a management and control unit and a power supply, the communication cabling connects said data communication concentrator via the combiner to the node, the combiner includes a plurality of couplers and a plurality of filters and a plurality of smart power allocation and reporting circuits (SPEARs), each coupler being connected via a filter and a SPEAR to an output of said power supply, and the SPEAR is operative to report to the management and control unit the current consumption of a node connected thereto.

Further in accordance with a preferred embodiment of the present invention the hub includes a data communication concentrator, the power supply distributor includes a combiner and a power supply, the communication cabling connects the data communication concentrator via the combiner to the nodes, the combiner comprises a plurality of couplers and a plurality of filters and a plurality of smart power allocation and reporting circuits (SPEARs), each coupler being connected via a filter and a SPEAR to an output of the power supply, and the SPEAR is operative to limit the maximum current supplied to a node connected thereto.

Alternatively according to a preferred embodiment of the present invention the hub includes a data communication concentrator, the power supply distributor includes a combiner and a power supply, the communication cabling connects the data communication concentrator via the combiner to the nodes, the combiner includes a plurality of couplers and a plurality of filters and a plurality of smart power allocation and reporting circuits (SPEARs), each coupler being connected via a filter and a SPEAR to an output of the power supply, and the SPEAR is operative to automatically disconnect a node connected thereto displaying an over-current condition following elapse of a programmably predetermined period of time.

Additionally in accordance with a preferred embodiment of the present invention the hub includes a data communication concentrator, the power supply distributor includes a combiner and a power supply, the communication cabling connects the data communication concentrator via the combiner to the nodes, the combiner includes a plurality of couplers and a plurality of filters and a plurality of smart power allocation and reporting circuits (SPEARs), each coupler being connected via a filter and a SPEAR to an output of the power supply, and the SPEAR is operative to automatically disconnect power from a node connected thereto displaying an over-current condition following elapse of a programmably predetermined period of time and to automatically reconnect the node to power thereafter when it no longer displays the over-current condition.

Moreover in accordance with a preferred embodiment of the present invention the hub includes a data communication concentrator, the power supply distributor includes a combiner and a power supply, the communication cabling connects said data communication concentrator via the combiner to the nodes, the combiner includes a plurality of couplers and a plurality of filters and a plurality of smart power allocation and reporting circuits (SPEARs), each coupler being connected via a filter and a SPEAR to an output of the power supply, and the SPEAR includes a current sensor which receives a voltage input Vin from a power supply and generates a signal which is proportional to the current passing therethrough, and a multiplicity of comparators receiving the signal from the current sensor and also receiving a reference voltage Vref from respective reference voltage sources.

Preferably the reference voltage sources are programmable reference voltage sources and receive control inputs from management & control circuits.

Additionally the outputs of the multiplicity of comparators may be supplied to a current limiter and switch which receives input voltage Vin via the current sensor and provides a current-limited voltage output Vout.

Furthermore the outputs of the comparators are supplied to management & control circuits to serve as monitoring inputs providing information regarding the DC current flowing through the SPEAR.

Additionally in accordance with a preferred embodiment of the present invention the hub includes a data communication concentrator, the power supply distributor includes a combiner and a power supply, the communication cabling connects the data communication concentrator via the combiner to the nodes, and the combiner includes a plurality of couplers each of which includes at least a pair of transformers, each having a center tap at a secondary thereof via which the DC voltage is fed to each wire of a twisted pair connected thereto.

Further in accordance with a preferred embodiment of the present invention the hub includes a data communication concentrator, the power supply distributor includes a combiner and a power supply, the communication cabling connects the data communication concentrator via the combiner to the nodes, and the combiner includes a plurality of couplers each of which includes at least one transformer, which is characterized in that it includes a secondary which is split into two separate windings and a capacitor which is connected between the two separate windings and which effectively connects the two windings in series for high frequency signals, but effectively isolates the two windings for DC.

Still further in accordance with a preferred embodiment of the present invention the hub includes a data communication concentrator, the power supply distributor includes a combiner a power supply, the communication cabling connects the data communication concentrator via the combiner to the nodes, and the combiner includes a pair of capacitors which effectively block DC from reaching the data communication concentrator.

Still further in accordance with a preferred embodiment of the present invention the hub includes a data communication concentrator, the power supply distributor includes a combiner and a power supply, the communication cabling connects the data communication concentrator via the combiner to the nodes, and the combiner comprises two pairs of capacitors which effectively block DC from reaching the data communication concentrator.

Additionally in accordance with a preferred embodiment of the present invention the hub includes a data communication concentrator, the power supply distributor includes a combiner and a power supply, the communication cabling connects the data communication concentrator via the combiner to the nodes, and the combiner includes a self-balancing capacitor-less and transformer-less common mode coupling circuit.

Preferably the communications cabling interface includes a separator and a pair of transformers, each having a center tap at a primary thereof via which the DC voltage is extracted from each wire of a twisted pair connected thereto.

Additionally or alternatively the communications cabling interface includes a separator including at least one transformer, which is characterized in that it includes a primary which is split into two separate windings and a capacitor which is connected between the two separate windings and which effectively connects the two windings in series for high frequency signals, but effectively isolates the two windings for DC.

Furthermore the communications cabling interface includes a separator comprising a pair of capacitors which effectively block DC from reaching a data input of a node connected thereto.

Additionally in accordance with a preferred embodiment of the present invention the communications cabling interface includes a separator comprising two pairs of capacitors which effectively block DC from reaching a data input of a node connected thereto.

Additionally or alternatively the communications cabling interface includes a separator includes a self-balancing capacitor-less and transformer-less common mode coupling circuit.

There is further provided in accordance with a preferred embodiment of the present invention a local area network including a hub, a plurality of nodes, a communication cabling connecting said plurality of nodes to the hub for providing data communication, and a power supply distributor operative to provide at least some operating power to at least some of the plurality of nodes via the communication cabling, the power supply distributor including power management functionality.

Preferably the power supply distributor includes a power management & control unit which monitors and controls the power supplied to various nodes via the communications cabling.

Additionally in accordance with a preferred embodiment of the present invention the power supply distributor includes a management workstation which is operative to govern the operation of the power management & control unit.

Preferably the management workstation governs the operation of multiple power management & control units.

Moreover in accordance with a preferred embodiment of the present invention the power management & control unit communicates with various nodes via a data communication concentrator thereby to govern their current mode of power usage.

Further in accordance with a preferred embodiment of the present invention the power management & control unit communicates with various nodes via control messages which are decoded at the nodes and are employed for controlling whether full or partial functionality is provided there at.

Still further in accordance with a preferred embodiment of the present invention the power management & control unit senses that mains power to said power supply distributor is not available and sends a control message to cause nodes to operate in a backup or reduced power mode.

Preferably the node includes essential circuitry, which is required for both full functionality and reduced functionality operation, and non-essential circuitry, which is not required for reduced functionality operation.

There is also provided with yet another preferred embodiment of the present invention a local area network power supply distributor for use in a local area network including a hub, a plurality of nodes and communication cabling connecting the plurality of nodes to a hub for providing digital communication therebetween, the power supply distributor being operative to provide at least some operating power to at least some of said plurality of nodes via the communication cabling.

Further in accordance with a preferred embodiment of the present invention the supply distributor is located within the hub.

Still further in accordance with a preferred embodiment of the present invention the power supply distributor is located outside the hub. Alternatively the power supply distributor is located partially within the hub and partially outside the hub.

Additionally in accordance with a preferred embodiment of the present invention the operating power supplied by the power supply distributor to at least some of the plurality of nodes via the communication cabling includes backup power.

Still further in accordance with a preferred embodiment of the present invention the hub includes a data communication concentrator, the power supply distributor includes a combiner, and the communication cabling connects the data communication concentrator via the combiner to the nodes.

Moreover in accordance with a preferred embodiment of the present invention the hub includes a data communication concentrator and wherein the power supply distributor is also located within the hub.

Still further in accordance with a preferred embodiment of the present invention the hub includes a data communication concentrator and wherein said power supply distributor is also located within the hub and includes a power supply and a combiner, the combiner coupling power from the power supply to the communication cabling which also carries data from the data communication concentrator.

Preferably the combiner includes a plurality of couplers, each of which is connected to an output of the power supply.

Additionally in accordance with a preferred embodiment of the present invention the combiner includes a plurality of couplers and a plurality of filters, each coupler being connected via a filter to an output of the power supply.

Furthermore the combiner may also include a plurality of couplers and a plurality of filters and a plurality of smart power allocation and reporting circuits (SPEARs), each coupler being connected via a filter and a SPEAR to an output of the power supply.

Additionally in accordance with a preferred embodiment of the present invention the power supply distributor includes a power supply, and the power supply includes a power failure backup facility.

Still further in accordance with a preferred embodiment of the present invention the combiner includes a plurality of couplers and a plurality of filters, each coupler being connected via a filter to an output of the power supply.

Preferably the combiner includes a plurality of couplers and a plurality of filters and a plurality of smart power allocation and reporting circuits (SPEARs), each coupler being connected via a filter and a SPEAR to an output of the power supply.

Moreover in accordance with a preferred embodiment of the present invention the combiner includes a plurality of couplers and a plurality of filters, each coupler being connected via a filter to an output of a power supply.

Additionally the combiner may also include a plurality of couplers and a plurality of filters and a plurality of smart power allocation and reporting circuits (SPEARs), each coupler being connected via a filter and a SPEAR to an output of the power supply.

Furthermore the combiner may also include a plurality of couplers and a plurality of filters, each coupler being connected via a filter to an output of a power supply.

Moreover in accordance with a preferred embodiment of the present invention the power supply distributor is operative to provide electrical power along the communication cabling without unacceptable degradation of the digital communication.

Further in accordance with a preferred embodiment of the present invention the communication cabling includes at least one twisted wire pair connected to each node and wherein power is transmitted over a twisted wire pair along which data is also transmitted.

Preferably the power supply distributor includes a power supply interface and a power supply, the communication cabling connects the data communication concentrator via the power supply interface to the nodes, and the power supply interface includes a plurality of filters and a plurality of smart power allocation and reporting circuits (SPEARs), each filter being connected via a SPEAR to an output of the power supply.

Additionally in accordance with a preferred embodiment of the present invention the communication cabling includes at least two twisted wire pairs connected to each node and wherein power is transmitted over a twisted wire pair different from that along which data is transmitted.

Moreover in accordance with a preferred embodiment of the present invention the hub includes a data communication concentrator, the power supply distributor includes a power supply interface and a power supply, the communication cabling connects the data communication concentrator via the power supply interface to said nodes, and the power supply interface includes a plurality of filters and a plurality of smart power allocation and reporting circuits (SPEARs), each filter being connected via a SPEAR to an output of the power supply.

Still further in accordance with a preferred embodiment of the present invention the hub includes a data communication concentrator, the power supply distributor includes a combiner and a power supply, the communication cabling connects the data communication concentrator via the combiner to the nodes, the combiner includes a plurality of couplers and a plurality of filters and a plurality of smart power allocation and reporting circuits (SPEARs), each coupler being connected via a filter and a SPEAR to an output of the power supply, and each coupler has at least two ports, one of which is connected to a port of the data communication concentrator and the other of which is connected, via communication cabling, to one of the plurality of nodes.

Additionally in accordance with a preferred embodiment of the present invention the hub includes a data communication concentrator, the power supply distributor includes a combiner, a management and control unit and a power supply, the communication cabling connects said data communication concentrator via the combiner to the nodes, the combiner includes a plurality of couplers and a plurality of filters and a plurality of smart power allocation and reporting circuits (SPEARs), each coupler being connected via a filter and a SPEAR to an output of the power supply, and the SPEAR is operative to report to the management and control unit the current consumption of a node connected thereto.

Still further in accordance with a preferred embodiment of the present invention the hub includes a data communication concentrator, the power supply distributor includes a combiner and a power supply, the communication cabling connects the data communication concentrator via the combiner to the nodes, the combiner includes a plurality of couplers and a plurality of filters and a plurality of smart power allocation and reporting circuits (SPEARs), each coupler being connected via a filter and a SPEAR to an output of the power supply, and the SPEAR is operative to limit the maximum current supplied to a node connected thereto.

Still further in accordance with a preferred embodiment of the present invention the hub includes a data communication concentrator, the power supply distributor includes a combiner and a power supply, the communication cabling connects the data communication concentrator via the combiner to the nodes, the combiner includes a plurality of couplers and a plurality of filters and a plurality of smart power allocation and reporting circuits (SPEARs), each coupler being connected via a filter and a SPEAR to an output of the power supply, and the SPEAR is operative to automatically disconnect a node connected thereto displaying an over-current condition following elapse of a programmably predetermined period of time.

Additionally in accordance with a preferred embodiment of the present invention the hub includes a data communication concentrator, the power supply distributor includes a combiner and a power supply, the communication cabling connects the data communication concentrator via the combiner to the nodes, the combiner includes a plurality of couplers and a plurality of filters and a plurality of smart power allocation and reporting circuits (SPEARs), each coupler being connected via a filter and a SPEAR to an output of the power supply, and the SPEAR is operative to automatically disconnect power from a node connected thereto displaying an over-current condition following elapse of a programmably predetermined period of time and to automatically reconnect the node to power thereafter when it no longer displays the over-current condition.

Still further in accordance with a preferred embodiment of the present invention the hub includes a data communication concentrator, the power supply distributor includes a combiner and a power supply, the communication cabling connects the data communication-concentrator via the combiner to the nodes, the combiner includes a plurality of couplers and a plurality of filters and a plurality of smart power allocation and reporting circuits (SPEARs), each coupler being connected via a filter and a SPEAR to an output of the power supply, and the SPEAR includes a current sensor which receives a voltage input Vin from a power supply and generates a signal which is proportional to the current passing therethrough, and a multiplicity of comparators receiving the signal from the current sensor and also receiving a reference voltage Vref from respective reference voltage sources.

Preferably the reference voltage sources are programmable reference voltage sources and receive control inputs from management & control circuits.

Additionally the outputs of the multiplicity of comparators may be supplied to a current limiter and switch which receives input voltage Vin via the current sensor and provides a current-limited voltage output Vout.

Furthermore the outputs of the comparators may be supplied to management & control circuits to serve as monitoring inputs providing information regarding the DC current flowing through the SPEAR.

Still further in accordance with a preferred embodiment of the present invention the hub includes a data communication concentrator, the power supply distributor includes a combiner and a power supply, the communication cabling connects the data communication concentrator via the combiner to the nodes, and the combiner includes plurality of couplers each of which includes at least a pair of transformers, each having a center tap at a secondary thereof via which the DC voltage is fed to each wire of a twisted pair connected thereto.

Additionally in accordance with a preferred embodiment of the present invention the hub includes a data communication concentrator, the power supply distributor includes a combiner and a power supply, the communication cabling connects the data communication concentrator via the combiner to the nodes, and the combiner includes a plurality of couplers each of which includes at least one transformer, which is characterized in that it includes a secondary which is split into two separate windings and a capacitor which is connected between the two separate windings and which effectively connects the two windings in series for high frequency signals, but effectively isolates the two windings for DC.

Further in accordance with a preferred embodiment of the present invention the hub includes a data communication concentrator, the power supply distributor includes a combiner and a power supply, the communication cabling connects the data communication concentrator via the combiner to the nodes, and the combiner includes a pair of capacitors which effectively block DC from reaching the data communication concentrator.

Still further in accordance with a preferred embodiment of the present invention the hub includes a data communication concentrator, the power supply distributor includes a combiner and a power supply, the communication cabling connects the data communication concentrator via the combiner to the nodes, and the combiner comprises two pairs of capacitors which effectively block DC from reaching the data communication concentrator.

Additionally in accordance with a preferred embodiment of the present invention the hub includes a data communication concentrator, the power supply distributor includes a combiner and a power supply, the communication cabling connects the data communication concentrator via the combiner to the nodes, and the combiner comprises a self-balancing capacitor-less and transformer-less common mode coupling circuit.

Preferably the power supply distributor includes power management functionality.

Additionally the power supply distributor may include a power management & control unit which monitors and controls the power supplied to various nodes via the communications cabling.

Furthermore the power supply distributor may include a management workstation which is operative to govern the operation of said power management & control unit.

Furthermore in accordance with a preferred embodiment of the present invention the management workstation governs the operation of multiple power management & control units.

Preferably the power management & control unit communicates with various nodes via a data communication concentrator thereby to govern their current mode of power usage.

Additionally in accordance with a preferred embodiment of the present invention the power management & control unit communicates with various nodes via control messages which are decoded at the nodes and are employed for controlling whether full or partial functionality is provided there at.

Additionally the power management & control unit senses that mains power to the power supply distributor is not available and sends a control message to cause nodes to operate in a backup or reduced power mode.

Furthermore the node includes essential circuitry, which is required for both full functionality and reduced functionality operation, and non-essential circuitry, which is not required for reduced functionality operation.

BRIEF DESCRIPTION OF THE DRAWINGS

The present invention will be understood and appreciated more fully from the following detailed description, taken in conjunction with the drawings in which:

FIGS. 1A and 1B are simplified block diagram illustrations of two alternative embodiments of a local area network including a power supply operative to provide electrical power to local area network nodes over communication cabling constructed and operative in accordance with one preferred embodiment of the present invention;

FIGS. 2A and 2B are simplified block diagram illustrations of two alternative embodiments of a local area network including a power supply operative to provide electrical power to local area network nodes over communication cabling constructed and operative in accordance with another preferred embodiment of the present invention;

FIGS. 4A & 4B are simplified block diagrams of hubs and power supply subsystems useful in the embodiments of FIGS. 2A & 2B respectively;

FIGS. 8A-8G are simplified block diagram and schematic illustrations of various embodiments of a combiner useful in the embodiments of FIGS. 3A and 4A;

FIGS. 9A-9G are simplified block diagram and schematic illustrations of various embodiments of a separator useful in the embodiments of FIGS. 1A, 2A & 7A in combination with combiners of FIGS. 8A-8G;

FIGS. 19A, 19B, 19C and 19D are generalized flowcharts each illustrating one possible mechanism for full or no functionality operation in an involuntary power management step in the flowchart of FIG. 16;

DETAILED DESCRIPTION OF PREFERRED EMBODIMENTS

Figure 1A:
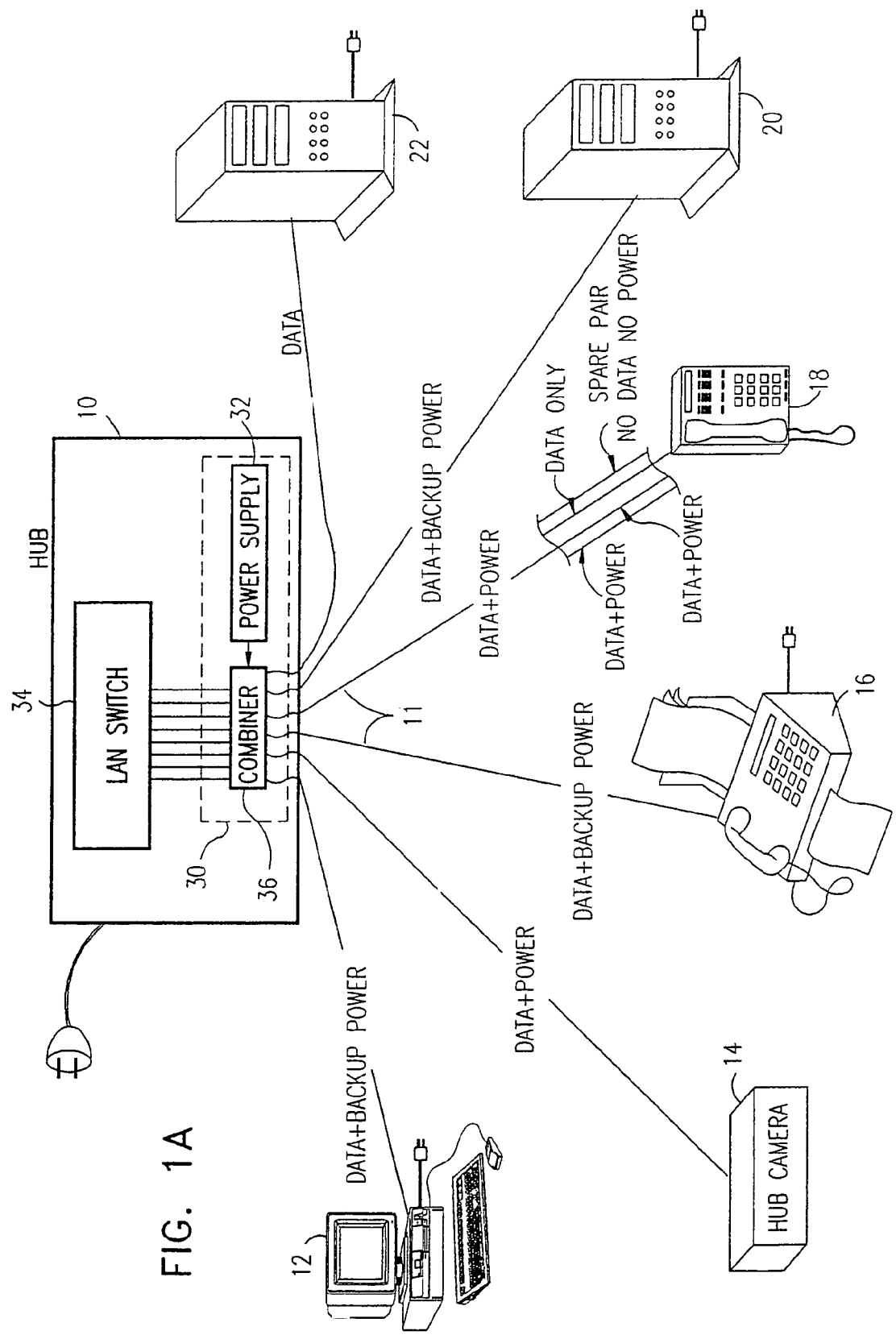

Reference is now made to FIG. 1A, which is a simplified block diagram illustration of a local area network constructed and operative in accordance with a preferred embodiment of the present invention. As seen in FIG. 1A, there is provided a local area network (LAN) comprising a hub 10 which is coupled, by cabling 11, preferably a structured cabling system, to a plurality of LAN nodes, such as a desktop computer 12, a web camera 14, a facsimile machine 16, a LAN telephone, also known as an IP telephone 18, a computer 20 and a server 22.

Cabling 11 is preferably conventional LAN cabling having four pairs of twisted copper wires cabled together under a common jacket. In the embodiment of FIG. 1A, as will be described hereinbelow, at least one of the pairs of twisted copper wires is employed for transmitting both data and electrical power to nodes of the network. Typically two such pairs are employed for transmitting both data and electrical power along each line connecting a hub to each node, while one such pair carries data only and a fourth pair is maintained as a spare and carries neither data nor power.

In accordance with a preferred embodiment of the present invention there is provided a power supply subsystem 30 which is operative to provide at least some operating or backup power to at least some of said plurality of nodes via the hub 10 and the communication cabling connecting the hub to various LAN nodes.

In the illustrated embodiment of FIG. 1A, subsystem 30 is located within the hub 10 and includes a power supply 32 which supplies operating power and/or backup power to various LAN nodes via the communication cabling. The communication cabling connects a LAN switch 34 via a combiner 36 to the various LAN nodes. The combiner couples electrical power from the power supply 32 along the communication cabling to at least some of the LAN nodes. Bidirectional data communications from LAN switch 34 pass through the combiner 36, substantially without interference.

It is seen that the communication cabling 11 from the hub 10 to the desktop computer 12, facsimile machine 16 and computer 20 carries both data and backup power, while the communication cabling from the hub 10 to the hub camera 14 and LAN telephone 18 carries both data and operating power and the communication cabling from the hub to the server 22 carries only data, in a typically LAN arrangement constructed and operative in accordance with a preferred embodiment of the present invention.

It is a particular feature of the embodiment of FIG. 1A that both data and power are carried on the same twisted copper pair.

It is appreciated that each of the LAN nodes 12-20 which receives power over the communication cabling includes a separator for separating the electrical power from the data. In the illustrated embodiment of FIG. 1A, the separators are typically internal to the respective nodes and are not separately designated, it being appreciated that alternatively discrete separators may be employed.

Reference is now made to FIG. 1B, which is a simplified block diagram illustration of a local area network constructed and operative in accordance with another preferred embodiment of the present invention. As seen in FIG. 1B, there is provided a local area network (LAN) comprising a hub 60 which is coupled, by cabling 61, preferably a structured cabling system, to a plurality of LAN nodes, such as a desktop computer 62, a web camera 64, a facsimile machine 66, a LAN telephone, also known as an IP telephone 68, a computer 70 and a server 72.

Cabling 61 is preferably conventional LAN cabling having four pairs of twisted copper wires cabled together under a common jacket. In the embodiment of FIG. 1B, in contrast to the arrangement described above with respect to FIG. 1A and as will be described hereinbelow, at least one of the pairs of twisted copper wires is employed only for transmitting electrical power to nodes of the network and at least one of the pairs of twisted copper wires is employed only for transmitting data. Typically two such pairs are employed for transmitting data only and two such pairs are employed only for supplying electrical power along each line connecting a hub to each node.

In accordance with a preferred embodiment of the present invention there is provided a power supply subsystem 80 which is operative to provide at least some operating or backup power to at least some of said plurality of nodes via the hub 60 and the communication cabling 61 connecting the hub to various LAN nodes.

In the illustrated embodiment of FIG. 1B, subsystem 80 is located within the hub 60 and includes a power supply 82 which supplies operating power and/or backup power to various LAN nodes via the communication cabling. The communication cabling connects a LAN switch 84 via a power supply interface 86 to the various LAN nodes. The power supply interface 86 distributes electrical power from the power supply 82, along twisted pairs of the communication cabling 61 which are not used for carrying data, to at least some of the LAN nodes. Bidirectional data communications from LAN switch 84 pass through the power supply interface 86, substantially without interference.

It is seen that the communication cabling 61 from the hub 60 to the desktop computer 62, facsimile machine 66 and computer 70 carries both data and backup power along separate twisted pairs, while the communication cabling 61 from the hub 60 to the hub camera 64 and LAN telephone 68 carries both data and operating power along separate twisted pairs and the communication cabling 61 from the hub 60 to the server 72 carries only data, in a typically LAN arrangement constructed and operative in accordance with a preferred embodiment of the present invention.

It is a particular feature of the embodiment of FIG. 1B that data and power are carried on separate twisted copper pairs of each communication cabling line.

It is appreciated that each of the LAN nodes 62-70 which receives power over the communication cabling 61 includes a connector for connecting the twisted pairs carrying electrical power to a node power supply and separately connecting the twisted pairs carrying data to a data input of the node. In the illustrated embodiment of FIG. 1B, the connectors are typically internal to the respective nodes and are not separately designated, it being appreciated that alternatively discrete connectors may be employed.

Figure 2A:
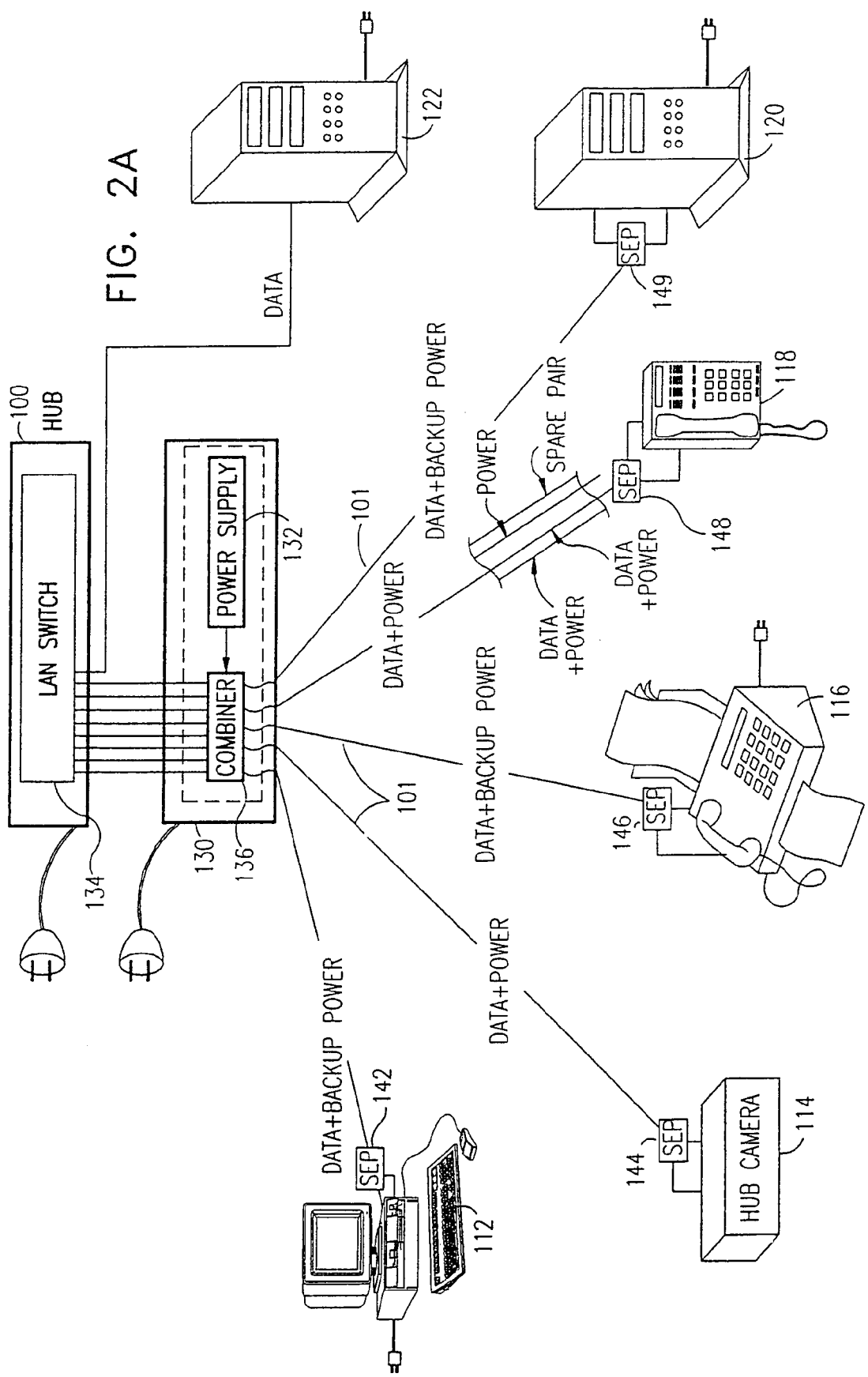

It is appreciated that FIGS. 1A and 1B illustrates two embodiments of a system providing electric power to plural LAN nodes via a hub and communication cabling connecting the hub to various LAN nodes. Another two embodiments of a system providing electric power to plural LAN nodes via a hub and communication cabling connecting the hub to various LAN nodes are illustrated in FIGS. 2A & 2B. FIGS. 2A & 2B illustrate a local area network including a power supply operative to provide electrical power to local area network nodes over communication cabling.

In the illustrated embodiment of FIG. 2A, a conventional hub 100 does not provide electrical power over the communication cabling 101 and a power supply subsystem 130 is located externally of hub 100 and includes a power supply 132 which supplies operating power and/or backup power to various LAN nodes via the communication cabling 101. The communication cabling connects a LAN switch 134 of conventional hub 100 to a combiner 136 in power supply subsystem 130 and connects the combiner to the various LAN nodes. The combiner 136 provides electrical power from the power supply 132 along the communication cabling to at least some of the LAN nodes. Bidirectional data communications from LAN switch 134 pass through the combiner 136, substantially without interference.

Cabling 101 is preferably conventional LAN cabling having four pairs of twisted copper wires cabled together under a common jacket. In the embodiment of FIG. 2A, as will be described hereinbelow, at least one of the pairs of twisted copper wires is employed for transmitting both data and electrical power to nodes of the network. Typically two such pairs are employed for transmitting both data and electrical power along each line connecting the power supply sub-system 130 to each node, while one such pair carries data only and a fourth pair is maintained as a spare and carries neither data nor power.

It is seen that the communication cabling 101 from the power supply sub-system 130 to the desktop computer 112, facsimile machine 116 and computer 120 carries both data and backup power, while the communication cabling from the power supply sub-system 130 to the hub camera 114 and LAN telephone 118 carries both data and operating power and the communication cabling from the hub 100 to the server 122 carries only data and may, but need not pass through subsystem 130, in a typically LAN arrangement constructed and operative in accordance with a preferred embodiment of the present invention.

It is a particular feature of the embodiment of FIG. 2A that both data and power are carried on the same twisted copper pair.

In the illustrated embodiment of FIG. 2A, each of the LAN nodes 112-120 which receives power is provided with an external separator for separating the data from the electrical power coupled to the communication cabling. The external separators associated with respective nodes 112-120 are designated by respective reference numbers 142-149. Each such separator has a communication cabling input and separate data and power outputs. It is appreciated that some or all of the nodes 112-120 may alternatively be provided with internal separators and that some or all of the nodes 112-120 may be provided with external separators.

It is appreciated that in addition to the LAN nodes described hereinabove, the present invention is useful with any other suitable nodes such as, for example, wireless LAN access points, emergency lighting system elements, paging loudspeakers, CCTV cameras, alarm sensors, door entry sensors, access control units, laptop computers, network elements such as hubs, switches and routers, monitors and memory backup units for PCs and work-stations.

In the illustrated embodiment of FIG. 2B, a conventional hub 150 does not provide electrical power over the communication cabling 151 and a power supply subsystem 180 is located externally of hub 150 and includes a power supply 182 which supplies operating power and/or backup power to various LAN nodes via the communication cabling 151. The communication cabling connects a LAN switch 184 of conventional hub 150 to a power supply interface 186 in power supply subsystem 180 and connects the power supply interface 186 to the various LAN nodes. The power supply interface distributes electrical power from the power supply 182 along the communication cabling to at least some of the LAN nodes. Bidirectional data communications from LAN switch 184 pass through the power supply interface 186, substantially without interference.

Cabling 151 is preferably conventional LAN cabling having four pairs of twisted copper wires cabled together under a common jacket. In the embodiment of FIG. 2B, in contrast to the arrangement described above with respect to FIG. 2A and as will be described hereinbelow, at least one of the pairs of twisted copper wires is employed only for transmitting electrical power to nodes of the network and at least one of the pairs of twisted copper wires is employed only for transmitting data. Typically two such pairs are employed for transmitting data only and two such pairs are employed only for supplying electrical power along each line connecting a hub to each node.

It is seen that the communication cabling 151 from the hub 150 to the desktop computer 162, facsimile machine 166 and computer 170 carries both data and backup power, while the communication cabling from the hub 150 to the hub camera 164 and LAN telephone 168 carries both data and operating power and the communication cabling from the hub 150 to the server 172 carries only data and may, but need not pass through subsystem 180, in a typically LAN arrangement constructed and operative in accordance with a preferred embodiment of the present invention.

It is a particular feature of the embodiment of FIG. 2B that data and power are carried on separate twisted copper pairs of each communication cabling line.

In the illustrated embodiment of FIG. 2B, each of the LAN nodes 162-170 which receives power is provided with an external connector for separately providing data and electrical power from the communication cabling. The external connector associated with respective nodes 162-170 are designated by respective reference numbers 192-199. Each such connector has a communication cabling input and separate data and power outputs. It is appreciated that some or all of the nodes 162-170 may alternatively be provided with internal connectors and that some or all of the nodes 162-170 may be provided with external connectors.

It is appreciated that in addition to the LAN nodes described hereinabove, the present invention is useful with any other suitable nodes such as, for example, wireless LAN access points, emergency lighting system elements, paging loudspeakers, CCTV cameras, alarm sensors, door entry sensors, access control units, laptop computers, network elements, such as hubs, switches and routers, monitors and memory backup units for PCs and work-stations.

Figure 3A:
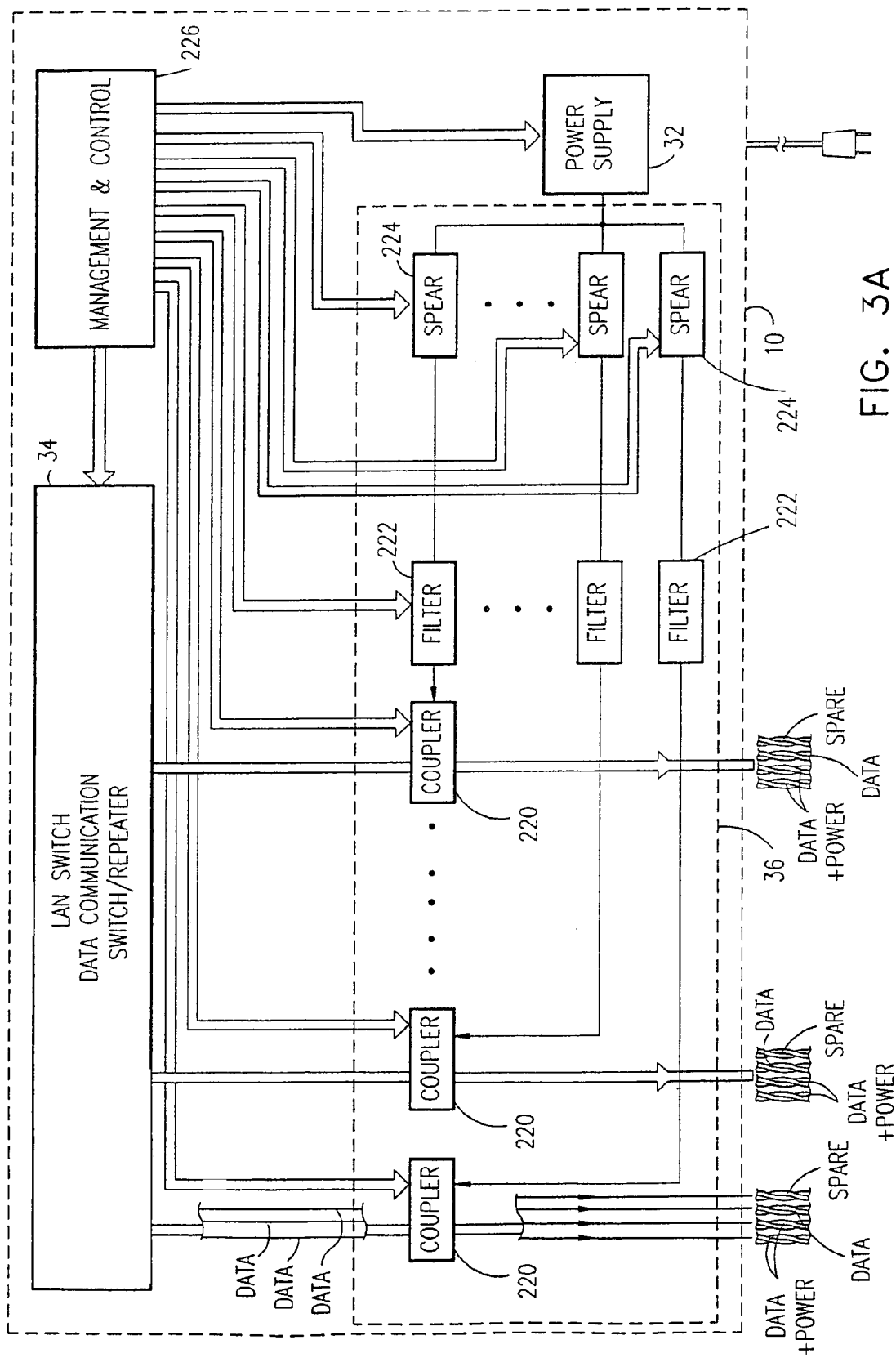
FIGS. 3A & 3B are simplified block diagrams of hubs useful in the embodiments of FIGS. 1A and 1B respectively.

Reference is now made to FIG. 3A, which is a simplified block diagram of a hub, such as hub 10, useful in the embodiment of FIG. 1A. Hub 10 preferably comprises a conventional, commercially available, LAN switch 34 which functions as a data communication switch/repeater and is coupled to combiner 36. Combiner 36 typically comprises a plurality of couplers 220, each of which is connected via a filter 222 to a smart power allocation and reporting circuit (SPEAR) 224. Each SPEAR 224 is connected to power supply 32 for receiving electrical power therefrom. It is appreciated that power supply 32 may be physically located externally of the hub 10. Power supply 32 may be provided with a power failure backup facility, such as a battery connection.

Each coupler 220. has two ports, one of which is preferably connected to a port of LAN switch 34 and the other of which is preferably connected, via communication cabling, to a LAN node.

Couplers 220 are preferably operative to couple electrical power to the communication cabling substantially without interfering with the data communication there along.

Filters 222 are preferably operative to avoid unwanted interport and interpair coupling, commonly known as "crosstalk" and to block noise from the power supply 32 from reaching the communication cabling.

A central management and control subsystem 226, typically embodied in a microcontroller, preferably controls the operation of the power supply 32, the LAN switch 34, the couplers 220, the filters 222 and the SPEARs 224.

Figure 3B:
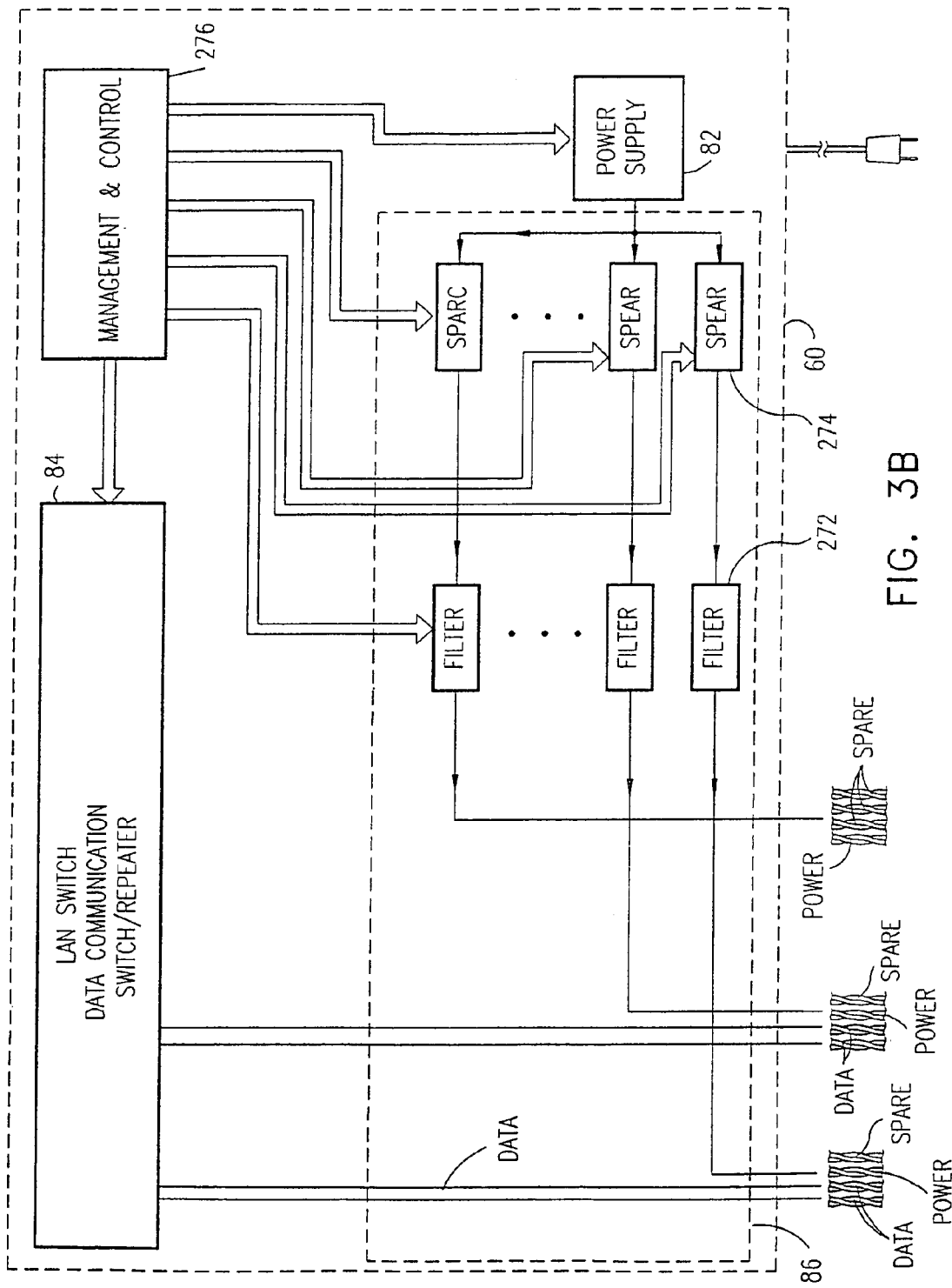

Reference is now made to FIG. 3B, which is a simplified block diagram of a hub, such as hub 60, useful in the embodiment of FIG. 1B. Hub 60 preferably comprises a conventional, commercially available, LAN switch 84 which functions as a data communication switch/repeater and is coupled to power supply interface 86. Power supply interface 86 typically comprises a plurality of filters 272, each connected to a smart power allocation and reporting circuit (SPEAR) 274. Each SPEAR 274 is connected to power supply 82 for receiving electrical power therefrom. It is appreciated that power supply 82 may be physically located externally of the hub 60. Power supply 82 may be provided with a power failure backup facility, such as a battery connection.

Filters 272 are preferably operative to avoid unwanted interport coupling, commonly known as "crosstalk" and to block noise from the power supply 82 from reaching the communication cabling.

A central management and control subsystem 276, typically embodied in a microcontroller, preferably controls the operation of the power supply 82, the LAN switch 84, the filters 272 and the SPEARs 274.

It is seen that in the embodiment of FIG. 3B, couplers are not provided inasmuch as power and data are transmitted over separate twisted pairs. The data carried on conductors via the power supply interface is substantially unaffected by the operation of the power supply interface.

Reference is now made to FIG. 4A, which is a simplified block diagram of hub 100 and the power supply subsystem 130 employed in the embodiment of FIG. 2A. Hub 100 preferably comprises a conventional, commercially available, LAN switch 134 which functions as a data communication switch/repeater and is coupled to combiner 136 forming part of power supply subsystem 130. Combiner 136 typically comprises a plurality of couplers 320, each of which is connected via a filter 322 to a smart power allocation and reporting circuit (SPEAR) 324. Each SPEAR 324 is connected to power supply 132 (FIG. 2A) for receiving electrical power therefrom. It is appreciated that power supply 132 may be physically located externally of the power supply subsystem 130. Power supply 132 may be provided with a power failure backup facility, such as a battery connection.

Each coupler 320 has two ports, one of which is preferably connected to a port of LAN switch 134 and the other of which is preferably connected, via communication cabling, to a LAN node.

Couplers 320 are preferably operative to couple electrical power to the communication cabling substantially without interfering with the data communication there along.

Filters 322 are preferably operative to avoid unwanted interport and interpair coupling, commonly known as "crosstalk" and to block noise from the power supply 132 from reaching the communication cabling.

A central management and control subsystem 326, typically embodied in a microcontroller, preferably controls the operation of the power supply 132, the couplers 320, the filters 322 and the SPEARs 324.

Figure 4B:
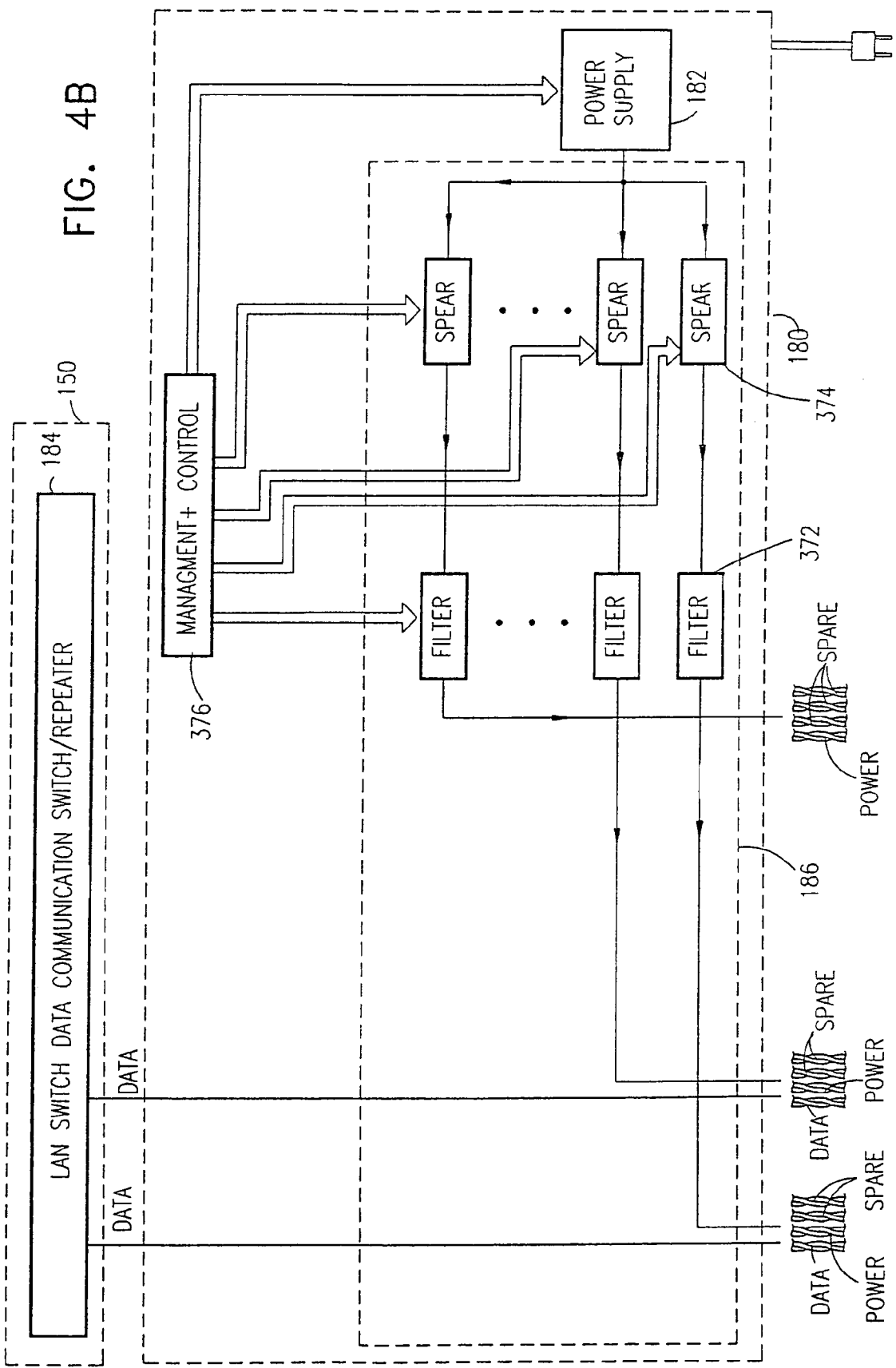

Reference is now made to FIG. 4B, which is a simplified block diagram of hub 150 and the power supply subsystem 180 employed in the embodiment of FIG. 2B. Hub 150 preferably comprises a conventional, commercially available, LAN switch 184 which functions as a data communication switch/repeater and is coupled to power supply interface 186 forming part of power supply subsystem 180. Power supply interface 186 typically comprises a plurality of filters 372 each coupled to a smart power allocation and reporting circuit (SPEAR) 374. Each SPEAR 374 is connected to power supply 182 (FIG. 2B) for receiving electrical power therefrom. It is appreciated that power supply 182 may be physically located externally of the power supply subsystem 180. Power supply 182 may be provided with a power failure backup facility, such as a battery connection.

Filters 372 are preferably operative to avoid unwanted interport and interpair coupling, commonly known as "crosstalk" and to block noise from the power supply 182 from reaching the communication cabling.

A central management and control subsystem 376, typically embodied in a microcontroller, preferably controls the operation of the power supply 182, filters 372 and the SPEARs 374.

It is seen that in the embodiment of FIG. 4B, couplers are not provided inasmuch as power and data are transmitted over separate twisted pairs. The data carried on conductors via the power supply interface is substantially unaffected by the operation of the power supply interface.

It is appreciated that power supply 32 (FIG. 3A), power supply 82 (FIG. 3B), power supply 132 (FIG. 4A) and power supply 182 (FIG. 4B) provide output power to SPEARs 224 (FIG. 3A), SPEARs 274 (FIG. 3B), 324 (FIG. 4A) and 374 (FIG. 4B) respectively along a pair of conductors, one of which is designated as a positive conductor and indicated by (+) and the other of which is designated as a negative conductor and indicated by (−). The voltages supplied to the respective positive and negative conductors are designated respectively as +Vin and −Vin. The difference therebetween is designated as Vin.

Figure 5:
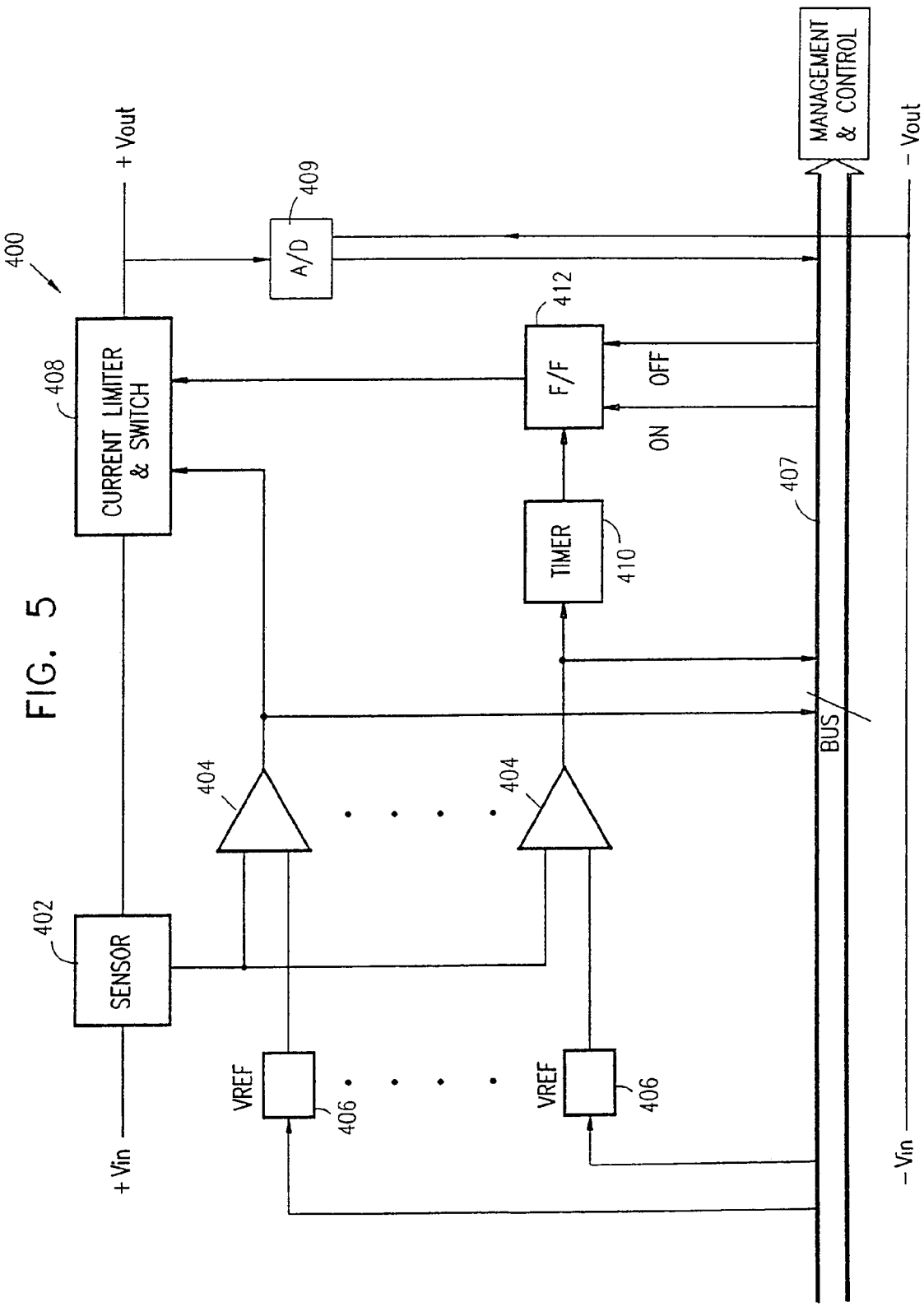
FIG. 5 is a simplified block diagram illustration of a smart power allocation and reporting circuit useful in the embodiments of FIGS. 3A, 3B, 4A and 4B.

Reference is now made to FIG. 5, which is a simplified block diagram illustration of a smart power allocation and reporting circuit (SPEAR) 400 useful in the embodiments of FIGS. 3A, 3B and FIGS. 4A, 4B particularly when DC current is coupled to the communication cabling.

SPEAR 400 preferably comprises a current sensor 402 which receives a voltage input +Vin from a power supply and generates a signal which is proportional to the current passing 43 therethrough. A voltage input −Vin received from the power supply 32 (FIG. 3A), 82 (FIG. 3B), 132 (FIG. 4A) or 182 (FIG. 4B) provides a voltage output −Vout which is typically unchanged from voltage input −Vin.

The output of current sensor 402 is supplied to a multiplicity of comparators 404 which also receive respective reference voltages Vref from respective programmable reference voltage sources 406, typically implemented in A/D converters. Programmable reference voltage sources 406 receive control inputs from management & control circuits 226 (FIG. 3A), 276 (FIG. 3B), 326 (FIG. 4A) and 376 (FIG. 4B) preferably via a bus 407. Alternatively, voltage sources 406 need not be programmable.

The outputs of comparators 404 are supplied to a current limiter and switch 408 which receives input voltage Vin via the current sensor 402 and provides a current-limited voltage output Vout. Output voltages +Vout and −Vout are applied as inputs to an A/D converter 409 which outputs a digital indication of Vout, which is the difference between +Vout and −Vout, to the management & control circuits 226 (FIG. 3A), 276 (FIG. 3B), 326 (FIG. 4A) and 376 (FIG. 4B) preferably via bus 407. The outputs of comparators 404 are supplied to management & control circuits 226 (FIG. 3A), 276 (FIG. 3B), 326 (FIG. 4A) and 376 (FIG. 4B) preferably via bus 407 to serve as monitoring inputs providing information regarding the DC current flowing through the SPEAR.

The outputs of some of comparators 404 are supplied directly to current limiter and switch 408, while the outputs of others of comparators 404 are supplied thereto via a timer 410 and a flip/flop 412. The comparators whose outputs are supplied directly to current limiter and switch 408 provide immediate current limiting at a relatively high threshold, while the comparators whose outputs are supplied to current limiter and switch 408 via timer 410 and flip/flop 412 provide delayed action current cut-off at a relatively low threshold.

Flip-flop 412 is responsive to external inputs which enable remote control of the operation of the current limiter and switch 408 by the management & control circuits 226 (FIG. 3A), 276 (FIG. 3B), 326 (FIG. 4A) and 376 (FIG. 4B) via bus 407.

It is appreciated that the above described SPEAR circuitry may also be operated on the negative lead. In such a case a short-lead would be connected between the Vin and the Vout.

It is further appreciated that the components of the SPEAR may also be organize in an alternative sequence.

Figure 6:
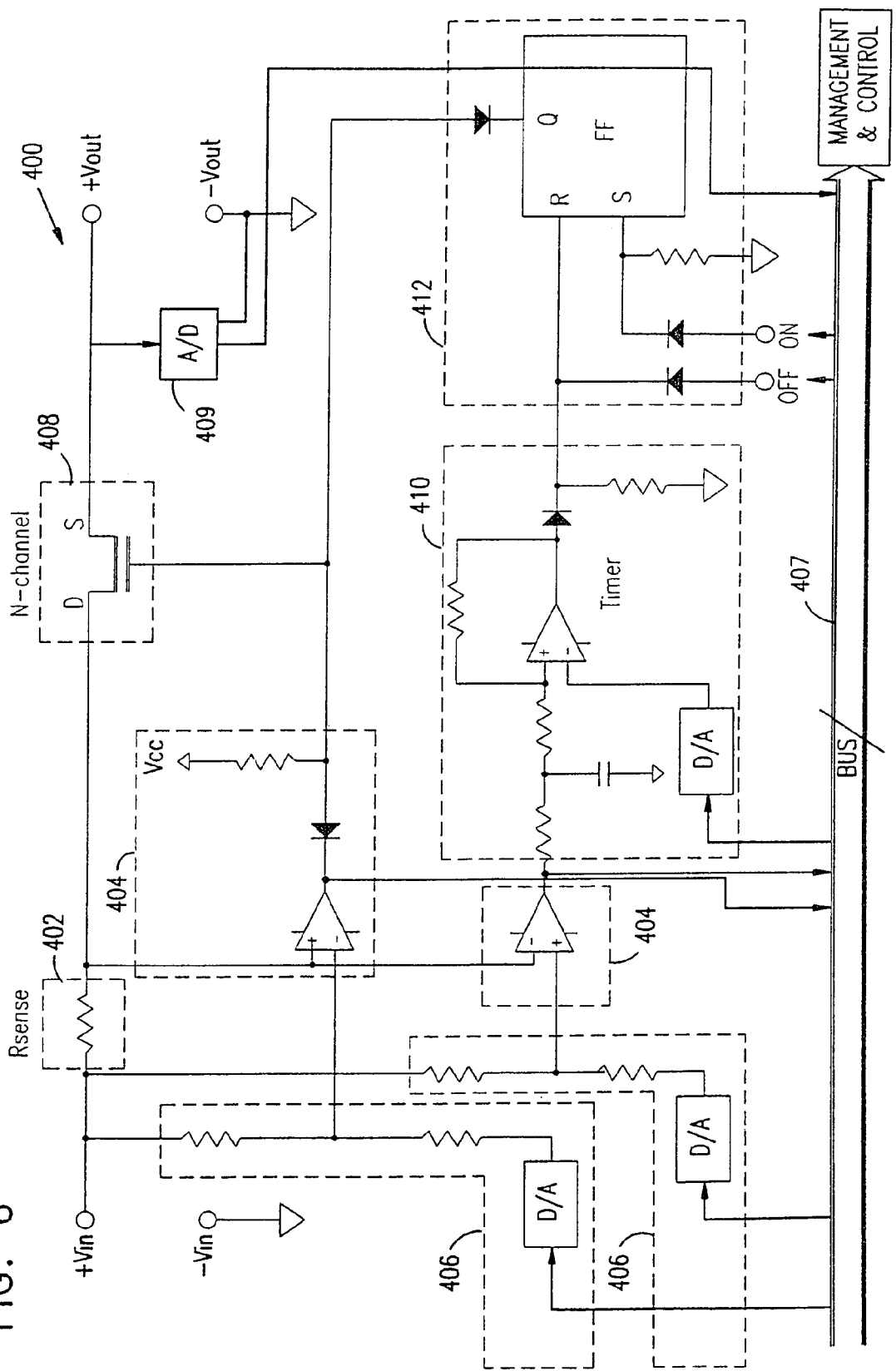
FIG. 6 is a simplified schematic illustration of the embodiment of FIG. 5.

Reference is now made FIG. 6, which is a simplified schematic illustration of a preferred implementation of the embodiment of FIG. 5. Inasmuch as identical reference numerals are employed in both FIGS. 5 and 6, the schematic illustration of FIG. 6 is believed to be self-explanatory and therefore, for the sake of conciseness, no additional textual description thereof is provided herein.

Figure 7A:
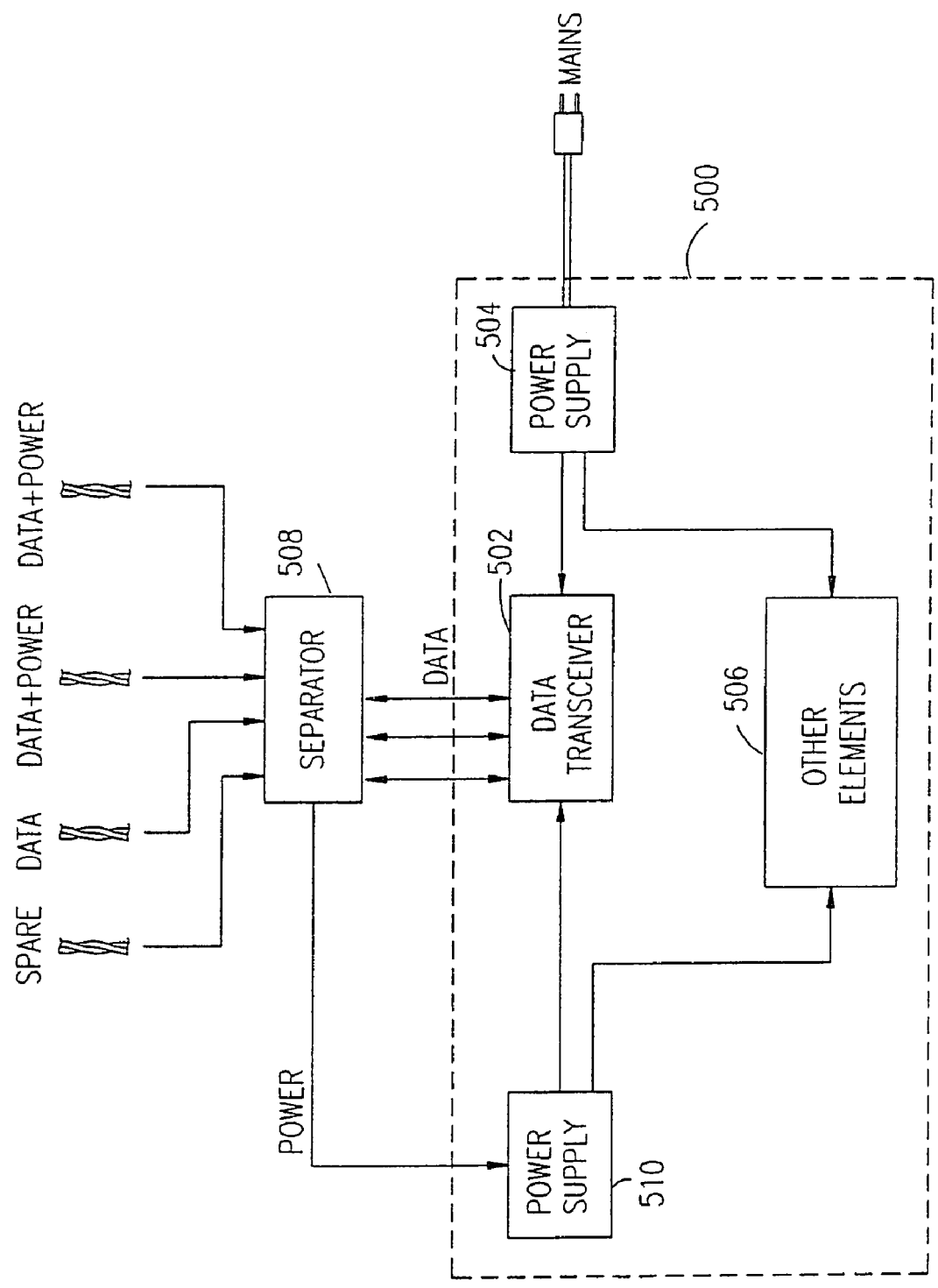
FIGS. 7A & 7B are simplified block diagram illustrations of LAN node interface circuits useful in the embodiments of FIGS. 1A & 2A and FIGS. 1B & 2B respectively.

Reference is now made to FIG. 7A, which is a simplified block diagram illustration of a LAN node interface circuit useful in the embodiments of FIGS. 1A and 2A for example as external separators 142-149. It is appreciated that the circuitry of FIG. 7A alternatively may be built-in to LAN nodes, as shown, for example in FIG. 1A.

FIG. 7A shows typical constituent elements of a network node 500, including a data transceiver 502, a mains-fed power supply 504 and various other elements 506 depending on the functionality of the node. The interface circuitry typically comprises a separator 508 which is operative to receive data and electrical power over communication cabling and to provide a data output to the data transceiver 502 and a separate power output to a communications cabling-fed power supply 510, preferably forming part of network node 500, which preferably powers the data transceiver 502 and possibly any other suitable circuitry.

Figure 7B:
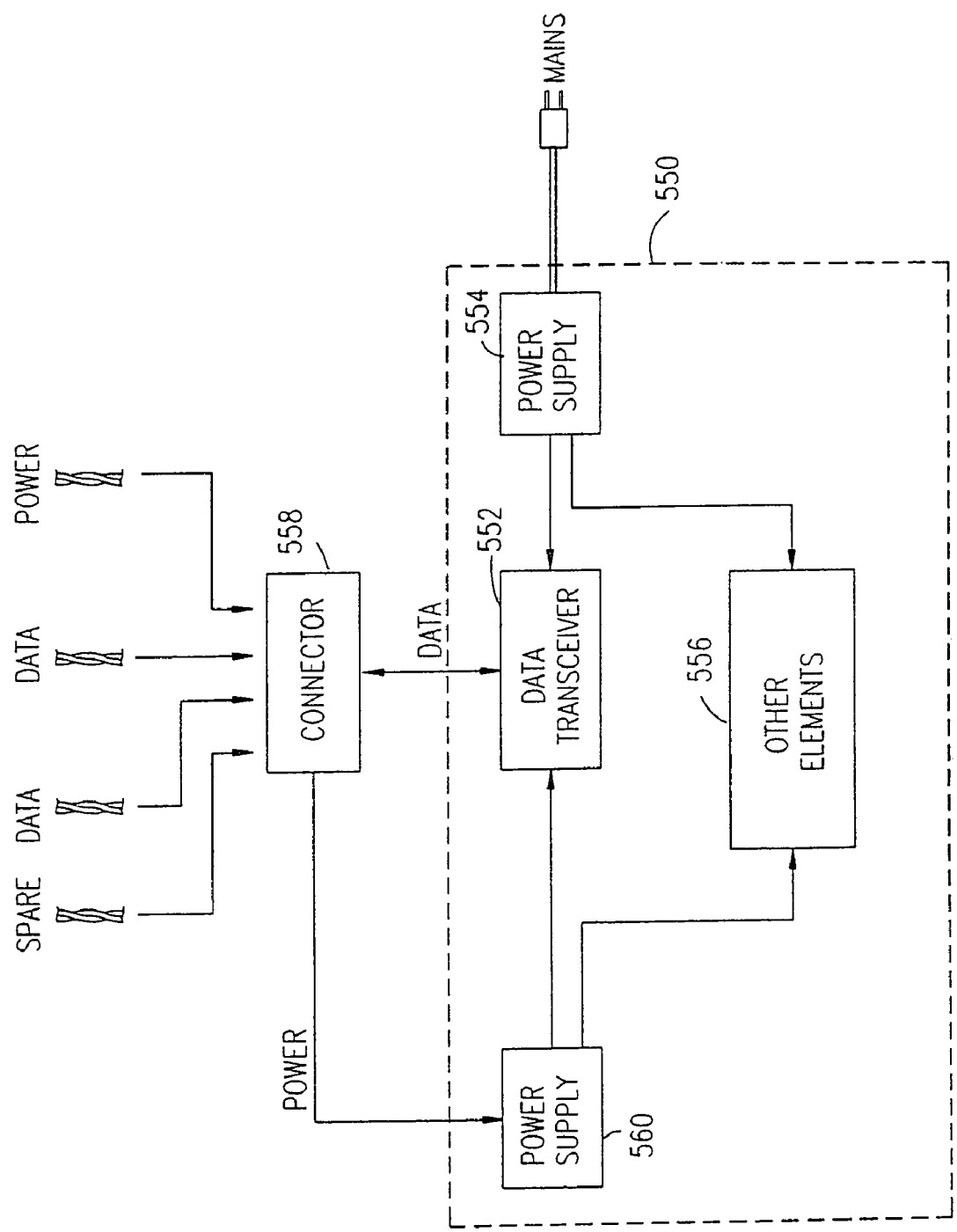

Reference is now made to FIG. 7B, which is a simplified block diagram illustration of a LAN node interface circuit useful in the embodiments of FIGS. 1B and 2B for example as external connectors 192-199. It is appreciated that the circuitry of FIG. 7B alternatively may be built-in to LAN nodes, as shown, for example in FIG. 1B.

FIG. 7B shows typical constituent elements of a network node 550, including a data transceiver 552, a mains-fed power supply 554 and various other elements 556 depending on the functionality of the node. The interface circuitry typically comprises a connector 558 which is operative to receive data and electrical power over communication cabling and to provide a data output to the data transceiver 552 and a separate power output to a communications cabling-fed power supply 560, preferably forming part of network node 550, which preferably powers the data transceiver 552 and possibly any other suitable circuitry.

Reference is FIGS. 8A-8E, which are simplified block diagram illustrations of various embodiments of a coupler useful in the embodiments of FIGS. 3A and 4A. The various embodiments have the common purpose of coupling DC power to the communication cabling without upsetting the balance there along, while producing a minimal change in the line impedance thereof and preventing saturation or burnout of line transformers coupled thereto.

FIG. 8A describes a coupler 600, such as coupler 220 (FIG. 3A) or coupler 320 (FIG. 4A) suitable for use with a LAN in accordance with a preferred embodiment of the present invention and which includes a pair of additional transformers 610 for each channel. Transformers 610 are typically 1:1 transformers which are characterized in that they include a center tap at the secondary via which the DC voltage is fed to both wires of a twisted pair.

This structure maintains the balance of the line and prevents core saturation. This structure also has the advantage that due to the fact that the same voltage is carried on both wires of the twisted pair simultaneously, the occurrence of a short circuit there along will not cause a power overload. An additional advantage of this structure is that it will not cause burnout of a LAN node which is not specially adapted for receive power over the twisted pair.

Figure 8B:
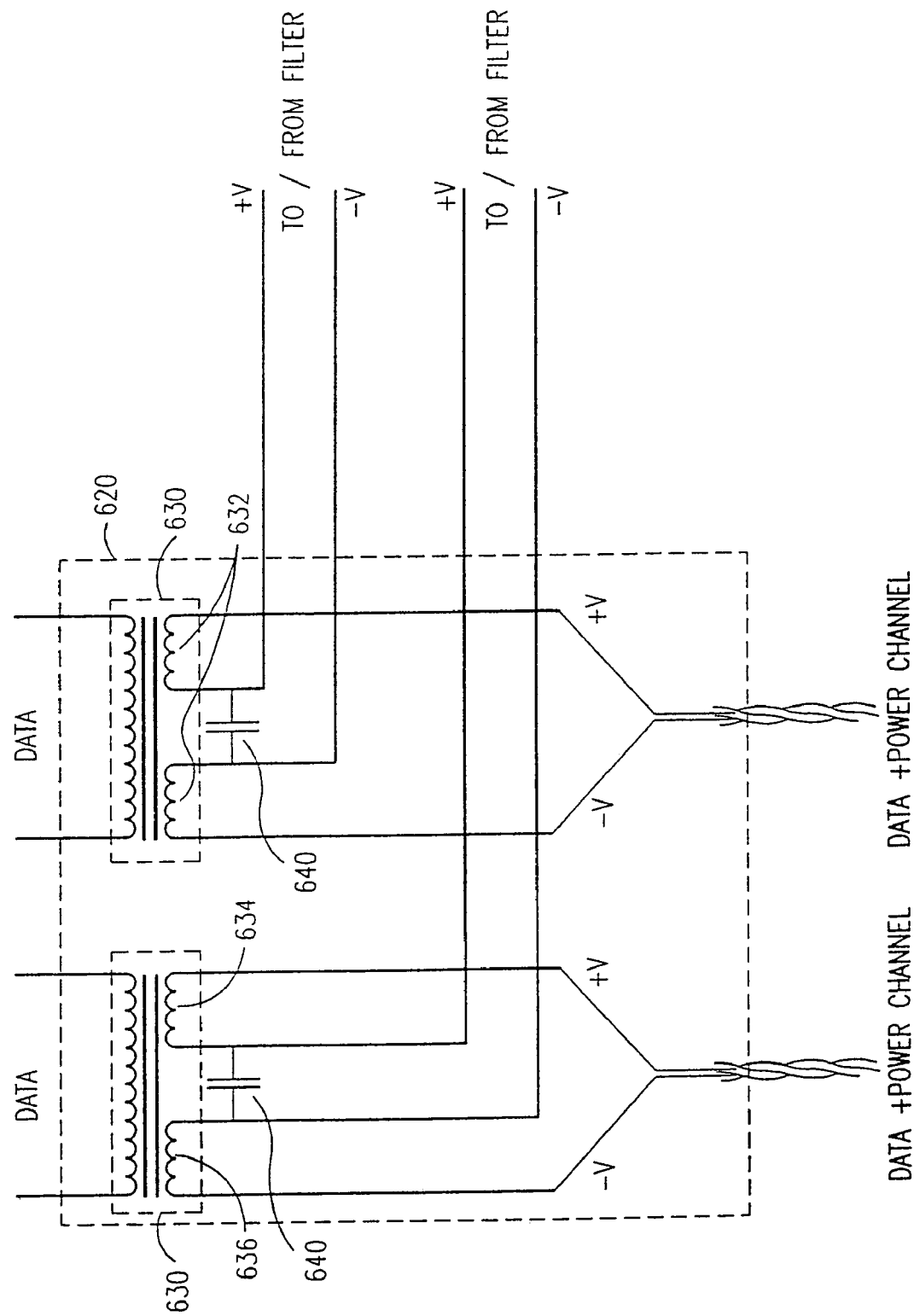

FIG. 8B describes a coupler 620, such as coupler 220 (FIG. 3A) or coupler 320 (FIG. 4A) suitable for use with a LAN in accordance with a preferred embodiment of the present invention and which includes a pair of additional transformers 630 for each channel. Transformers 630 are typically 1:1 transformers which are characterized in that they include a secondary 632 which is split into two separate windings 634 and 636. A capacitor 640 is connected between windings 634 and 636. The capacitor effectively connects the two windings in series for high frequency signals, such as data signals, but effectively isolates the two windings for DC.

This structure enables the two windings to carry respective positive and negative voltages via the same twisted pair. An advantage of this structure is that it applies a net zero DC current via the twisted pair and thus eliminates the magnetic field that would otherwise have existed had the twisted pair carried DC current in the same directions.

Figure 8C:
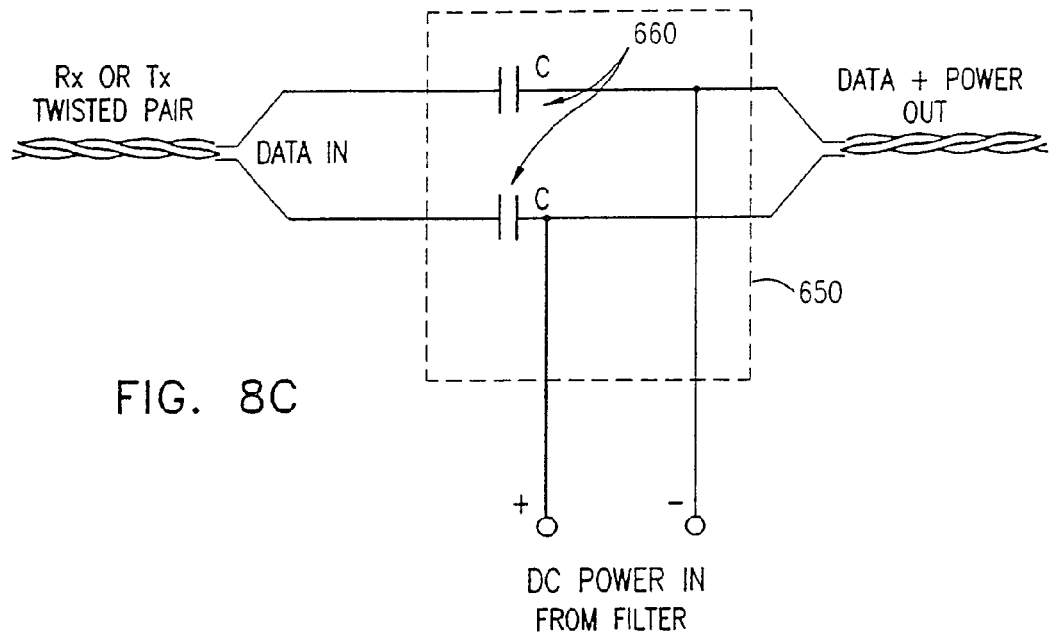

FIG. 8C describes a coupler 650, such as coupler 220 (FIG. 3A) or coupler 320 (FIG. 4A) suitable for use with a LAN in accordance with a preferred embodiment of the present invention and which includes a pair of capacitors 660 which effectively block DC from reaching the LAN switch. This structure is relatively simple and does not require an additional transformer.

Figure 8D:
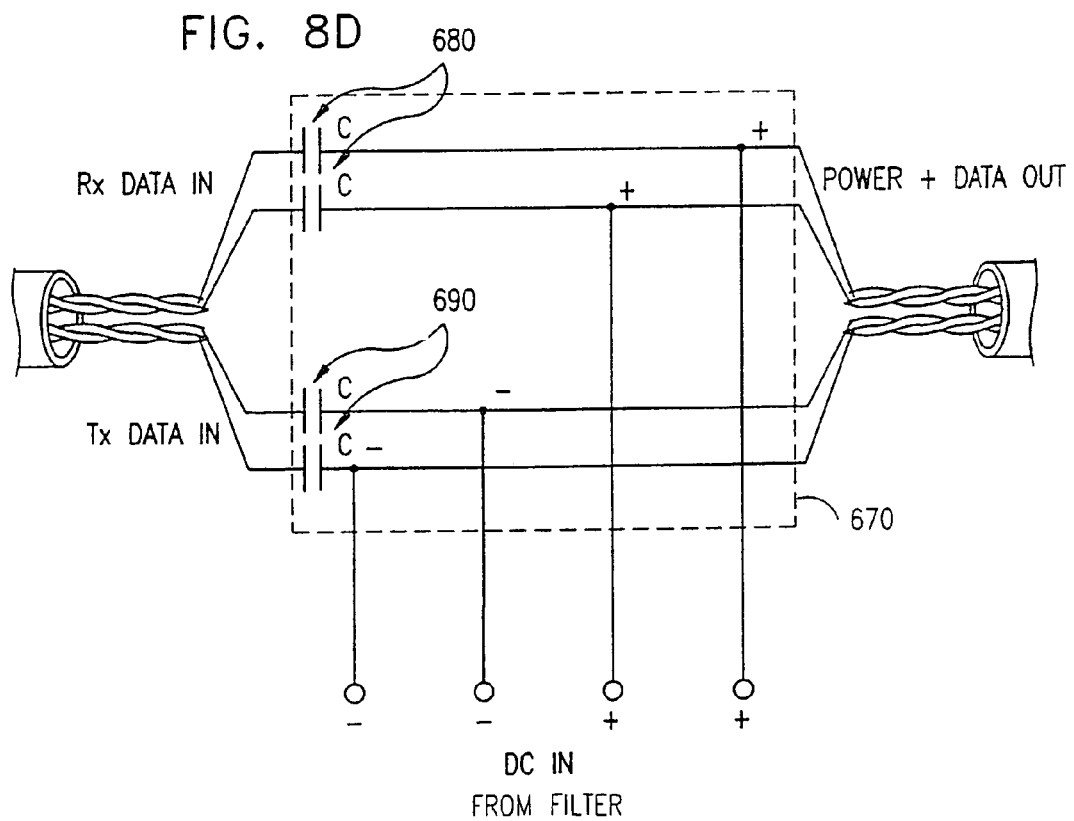

FIG. 8D describes a coupler 670, such as coupler 220 (FIG. 3A) or coupler 320 (FIG. 4A) suitable for use with a LAN in accordance with a preferred embodiment of the present invention and which includes two pairs of capacitors 680 and 690 which effectively block DC from reaching the LAN switch. This structure is also relatively simple and does not require an additional transformer.

This structure also has the advantage that due to the fact that the same voltage is carried on both wires of the twisted pair simultaneously, the occurrence of a short circuit there along will not cause a power overload. An additional advantage of this structure is that it will not cause burnout of a LAN node which is not specially adapted for receive power over the twisted pair.

Figure 8E:
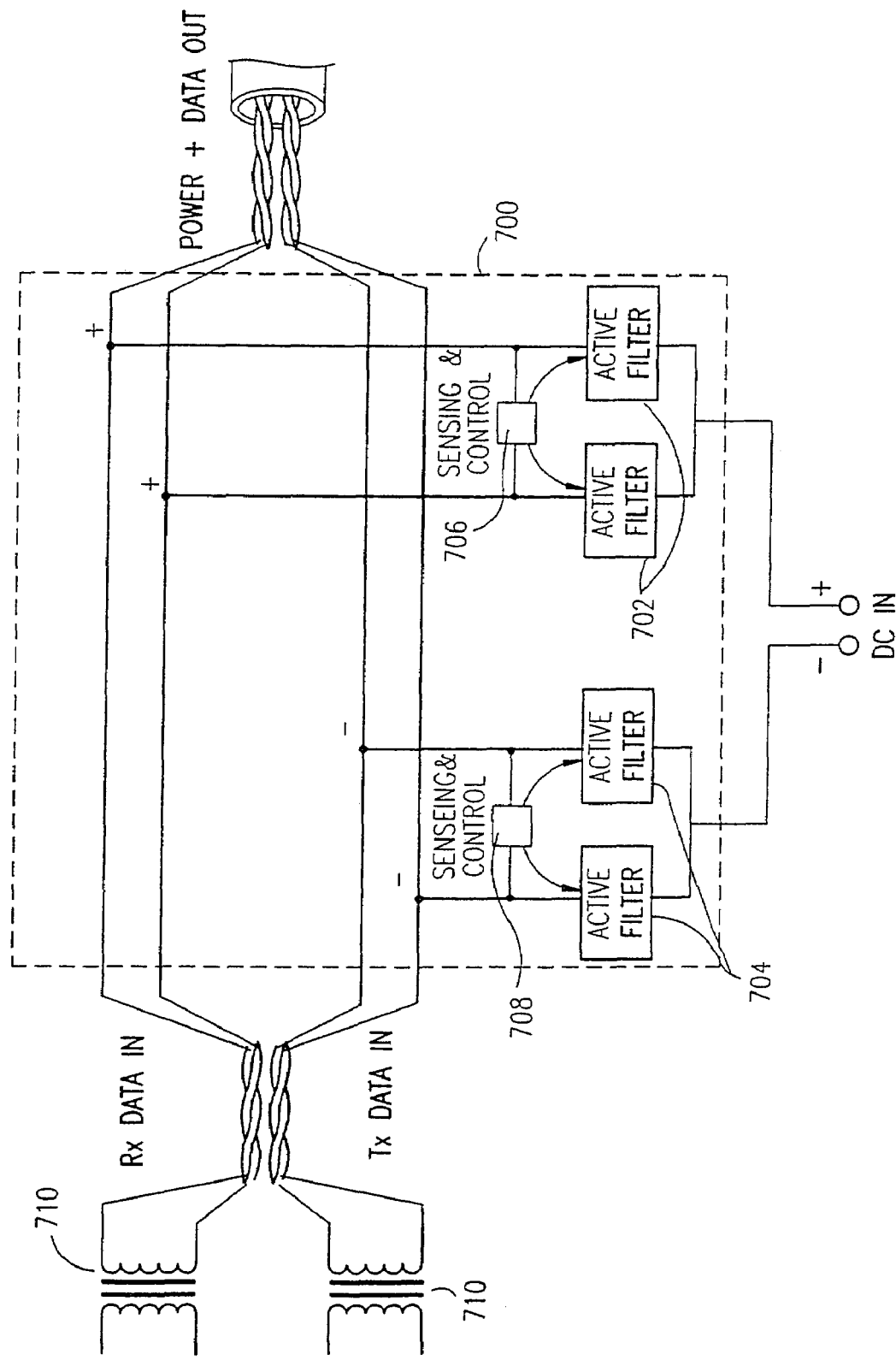

FIG. 8E describes a coupler 700, such as coupler 220 (FIG. 3A) or coupler 320 (FIG. 4A) suitable for use with a LAN in accordance with a preferred embodiment of the present invention and which is a self-balancing common mode coupling circuit. Combiner 700 comprises two pairs of adjustable active balancing circuits 702 and 704, which are operative in conjunction with respective sensing and control circuits 706 and 708.

It is a particular feature of the embodiment of FIG. 8E that the two pairs of adjustable active balancing circuits 702 and 704, which are operative in conjunction with respective sensing and control circuits 706 and 708 are operative to maintain precisely identical voltages on each of the two wires comprising a twisted pair coupled thereto.

Normally the output of a LAN switch is coupled to communication cabling via an isolation transformer 710, which is not part of the coupler 700. When precisely identical voltages, as aforesaid, are applied to each of the two wires comprising the twisted pair, there is no DC voltage across the secondary windings of the isolation transformer 710 and thus no DC current flows therethrough. This obviates the need for DC isolating capacitors and thus improves the balancing and impedance matching behavior of the combiner.

It is appreciated that whereas in a theoretically ideal system there would not be any need for active balancing as provided in the embodiment of FIG. 8E, in reality due to variations in the DC resistance along the entire communication cabling system, the DC voltages on each of the two wires of the twisted pair would not be identical in the absence of active balancing, thus creating a DC voltage drop across the secondary of transformer 710 which could cause either saturation or burnout of transformer 710.

Figure 8F:
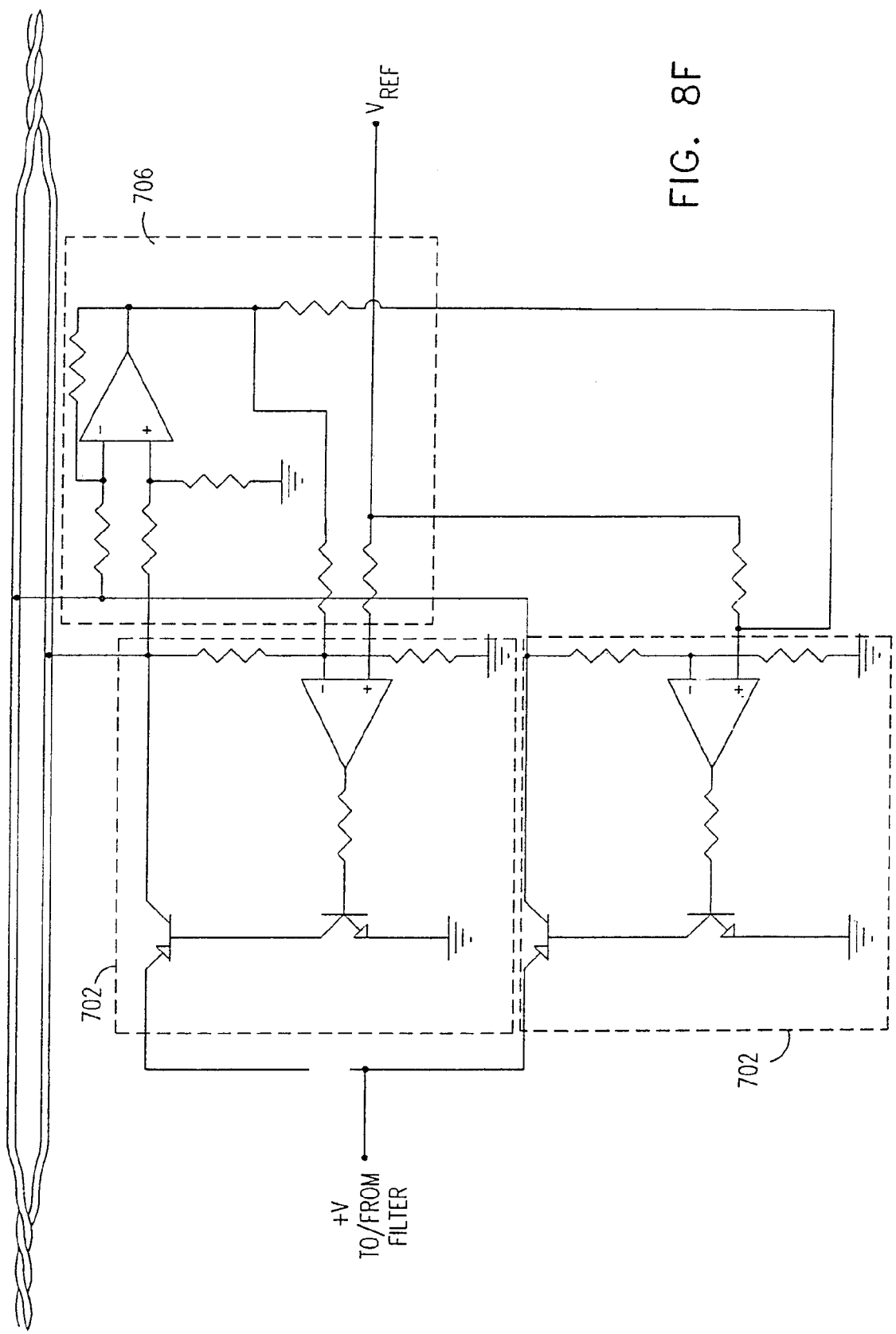

Reference is now made FIG. 8F, which is a simplified schematic illustration of a preferred implementation of the embodiment of FIG. 8E. Inasmuch as identical reference numerals are employed in both FIGS. 8E and 8F, the schematic illustration of FIG. 8F is believed to be self-explanatory and therefore, for the sake of conciseness, no additional textual description thereof is provided herein.

Figure 8G:
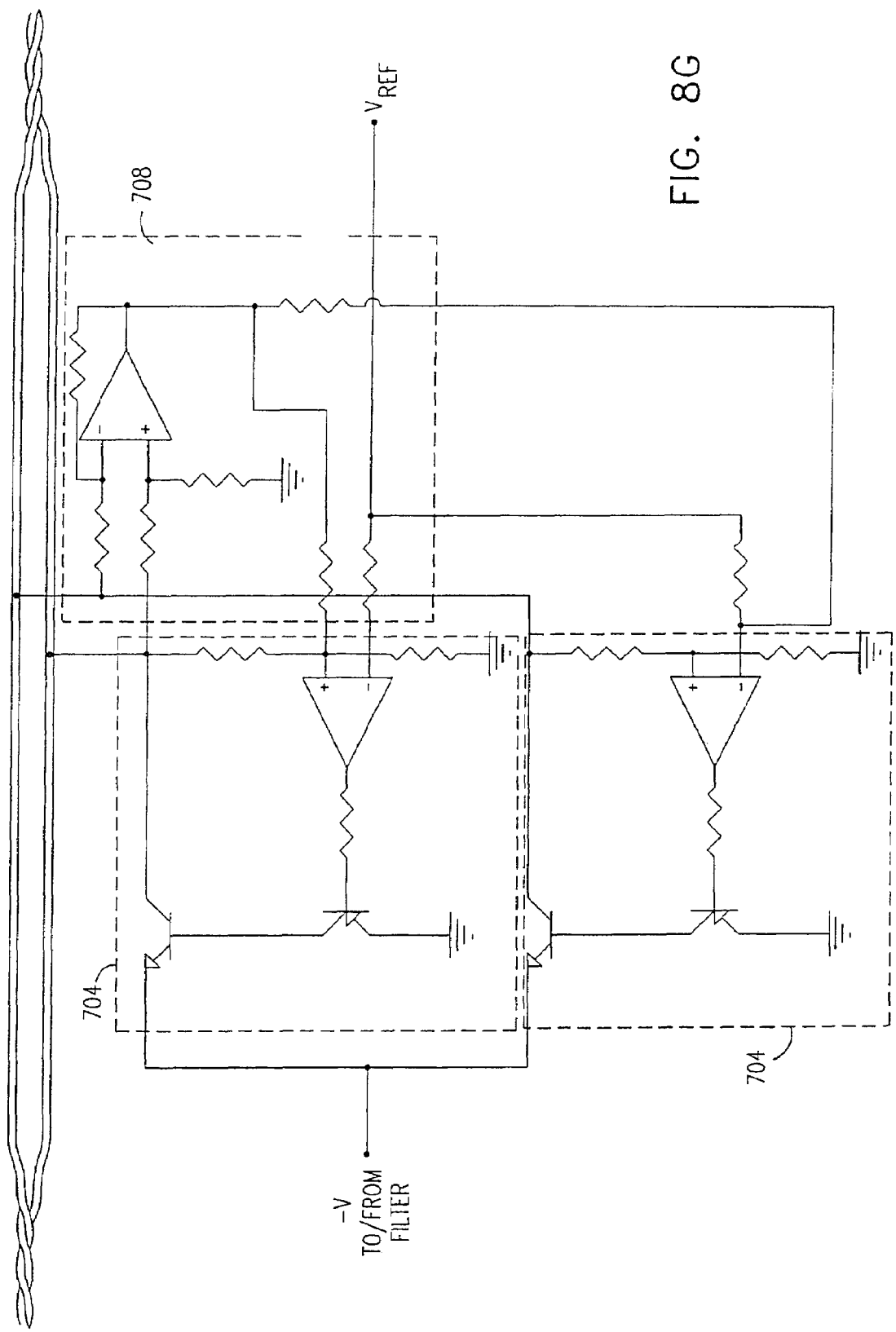

Reference is now made FIG. 8G, which is a simplified schematic illustration of a preferred implementation of the embodiment of FIG. 8E. Inasmuch as identical reference numerals are employed in both FIGS. 8E and 8G, the schematic illustration of FIG. 8G is believed to be self-explanatory and therefore, for the sake of conciseness, no additional textual description thereof is provided herein.

Reference is now made to FIGS. 9A-9G which are simplified block diagram and schematic illustrations of various embodiments of a separator useful in the embodiments of FIGS. 1A, 2A & 7A preferably in combination with the respective combiners of FIGS. 8A-8G.

In addition to the components included in FIGS. 9A to 9G, these separators may also include appropriate filters to avoid interpair and interport crosstalk.

The various embodiments have the common purpose of decoupling DC power from the communication cabling without upsetting the balance there along, while producing a minimal change in the line impedance thereof and preventing saturation or burnout of line transformers coupled thereto.

FIG. 9A describes a separator 1600, such as separator 142 (FIG. 2A), suitable for use with a LAN in accordance with a preferred embodiment of the present invention and which includes a pair of additional transformers 1610 for each channel. Transformers 1610 are typically 1:1 transformers which are characterized in that they include a center tap at the primary via which the DC voltage is extracted from both wires of a twisted pair.

This structure maintains the balance of the line and prevents core saturation. This structure also has the advantage that due to the fact that the same voltage is carried on both wires of the twisted pair simultaneously, the occurrence of a short circuit there along will not cause a power overload. An additional advantage of this structure is that it will not cause burnout of a LAN node which is not specially adapted for receive power over the twisted pair.

FIG. 9B describes a separator 1620, such as separator 142 (FIG. 2A) suitable for use with a LAN in accordance with a preferred embodiment of the present invention and which includes a pair of additional transformers 1630 for each channel. Transformers 1630 are typically 1:1 transformers which are characterized in that they include a primary 1632 which is split into two separate windings 1634 and 1636. A capacitor 1640 is connected between windings 1634 and 1636. The capacitor effectively connects the two windings in series for high frequency signals, such as data signals, but effectively isolates the two windings for DC.

This structure enables the two windings to carry respective positive and negative voltages via the same twisted pair. An advantage of this structure is that it applies a net zero DC current via the twisted pair and thus eliminates the magnetic field that would otherwise have existed had the twisted pair carried DC current in the same directions.

Figure 9C:
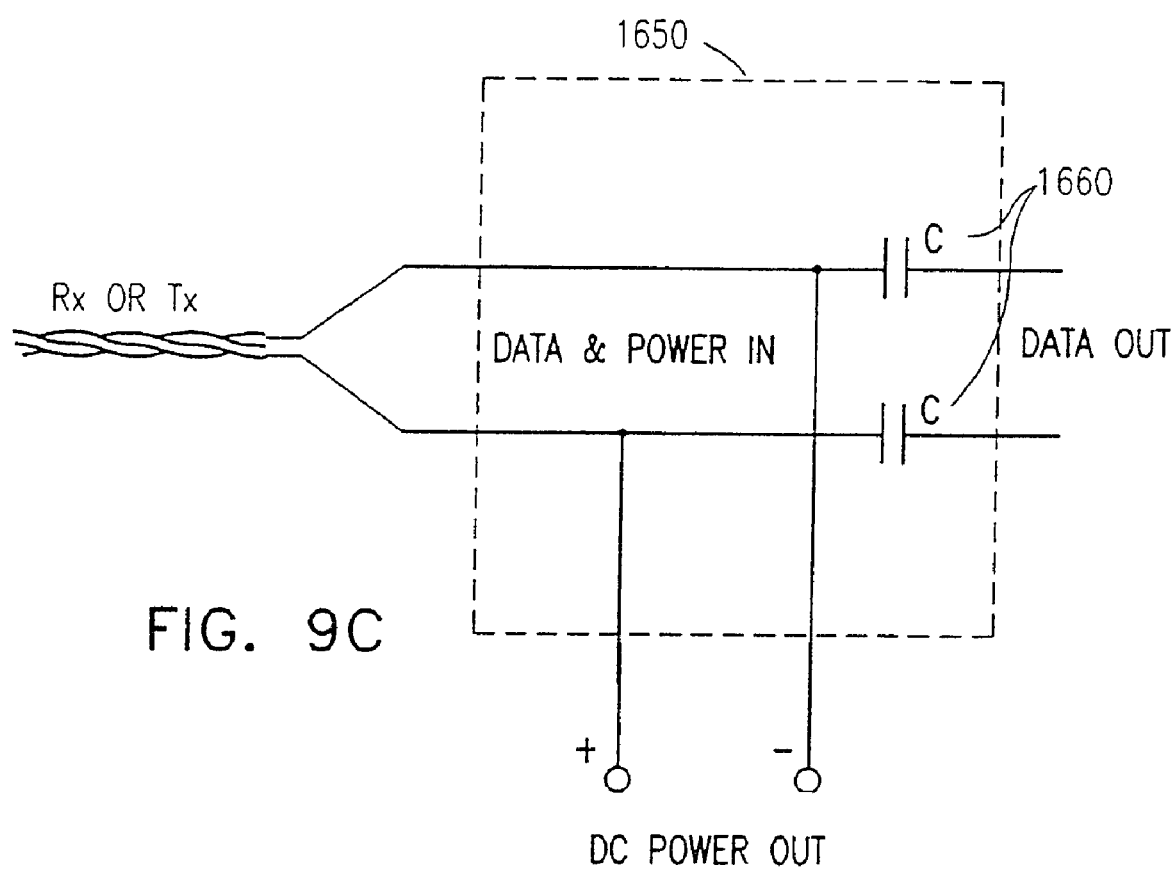

FIG. 9C describes a separator 1650, such as separator 142 (FIG. 2A), suitable for use with a LAN in accordance with a preferred embodiment of the present invention and which includes a pair of capacitors 1660 which effectively block DC from reaching the node circuits. This structure is relatively simple and does not require an additional transformer.

Figure 9D:
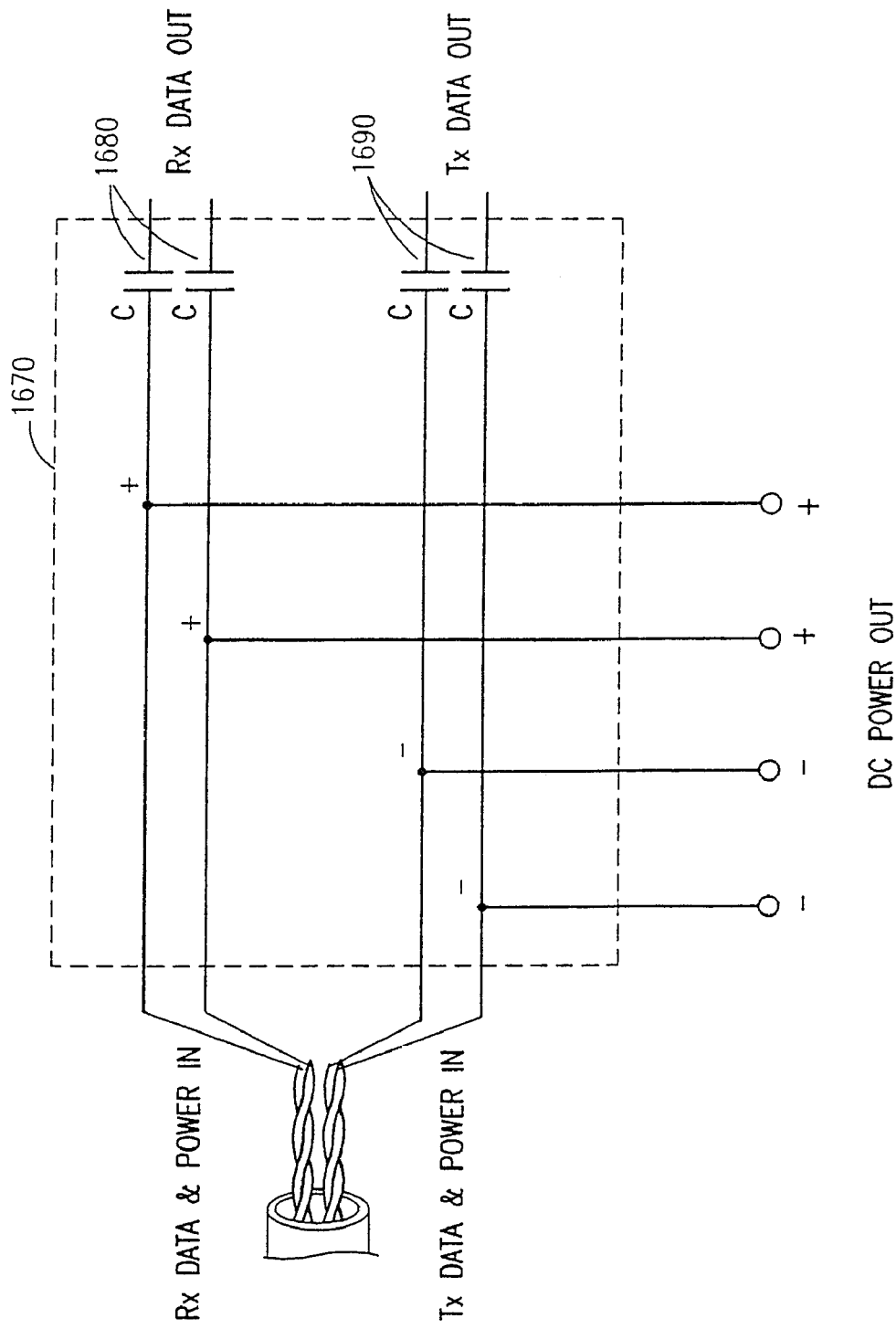

FIG. 9D describes a separator 1670, such as separator 142 (FIG. 2A), suitable for use with a LAN in accordance with a preferred embodiment of the present invention and which includes two pairs of capacitors 1680 and 1690 which effectively block DC from reaching the node circuits. This structure is also relatively simple and does not require an additional transformer.

This structure also has the advantage that due to the fact that the same voltage is carried on both wires of the twisted pair simultaneously, the occurrence of a short circuit there along will not cause a power overload. An additional advantage of this structure is that it will not cause burnout of a LAN node which is not specially adapted for receive power over the twisted pair.

Figure 9E:
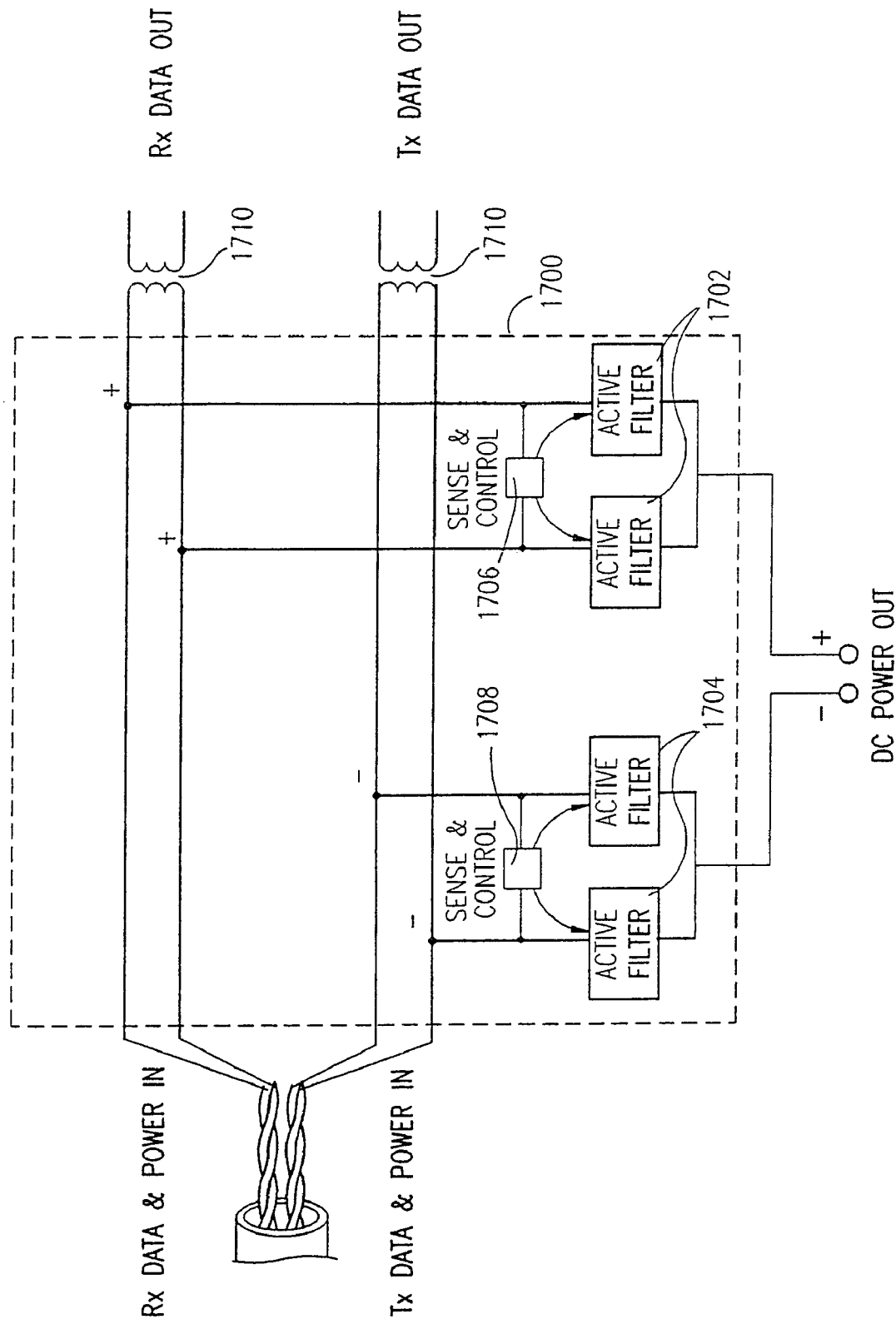

FIG. 9E describes a separator 1700, such as separator 142 (FIG. 2A), suitable for use with a LAN in accordance with a preferred embodiment of the present invention and which is a self-balancing common mode coupling circuit. Separator 1700 comprises two pairs of adjustable active balancing circuits 1702 and 1704, which are operative in conjunction with respective sensing and control circuits 1706 and 1708.

It is a particular feature of the embodiment of FIG. 9E that the two pairs of adjustable active balancing circuits 1702 and 1704, which are operative in conjunction with respective sensing and control circuits 1706 and 1708 are operative to maintain precisely identical voltages on each of the two wires comprising a twisted pair coupled thereto.

Normally the input of a LAN node is coupled to communication cabling via an isolation transformer 1710, which is not part of the separator 1700. When precisely identical voltages, as aforesaid, are maintained on each of the two wires comprising the twisted pair, there is no DC voltage across the primary windings of the isolation transformer 1710 and thus no DC current flows therethrough. This obviates the need for DC isolating capacitors and thus improves the balancing and impedance matching behavior of the separator.

It is appreciated that whereas in a theoretically ideal system there would not be any need for active balancing as provided in the embodiment of FIG. 9E, in reality due to variations in the DC resistance along the entire communication cabling system, the DC voltages on each of the two wires of the twisted pair would not be identical in the absence of active balancing, thus creating a DC voltage drop across the primary of transformer 1710 which could cause either saturation or burnout of transformer 1710.

Figure 9F:
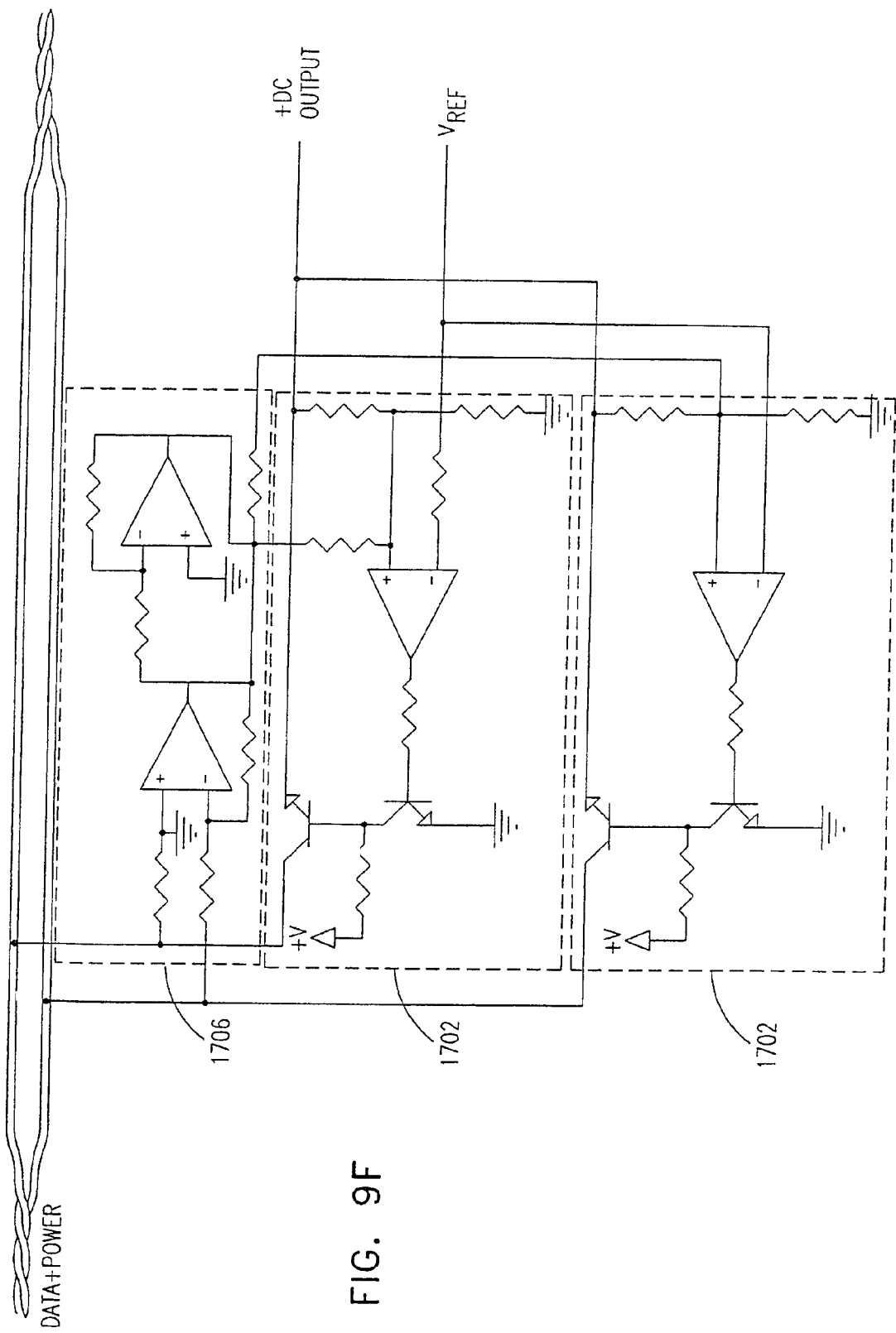

Reference is now made FIG. 9F, which is a simplified schematic illustration of part of a preferred implementation of the embodiment of FIG. 9E, including elements 1702 and 1706 thereof. Inasmuch as identical reference numerals are employed in both FIGS. 9E and 9F, the schematic illustration of FIG. 9F is believed to be self-explanatory and therefore, for the sake of conciseness, no additional textual description thereof is provided herein.

Figure 9G:
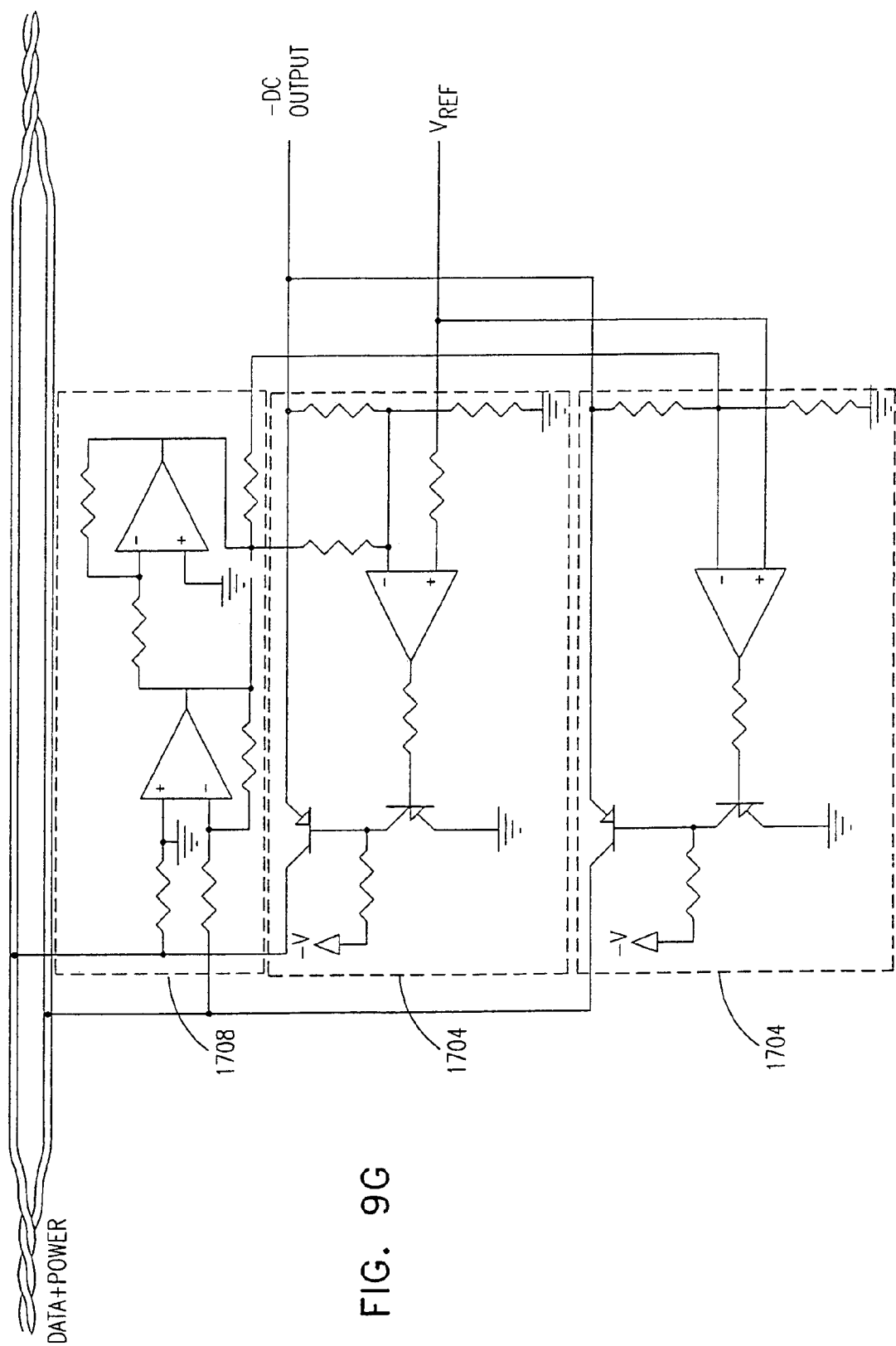

Reference is now made FIG. 9G, which is a simplified schematic illustration of part of a preferred implementation of the embodiment of FIG. 9E, including elements 1704 and 1708 thereof. Inasmuch as identical reference numerals are employed in both FIGS. 9E and 9G, the schematic illustration of FIG. 9G is believed to be self-explanatory and therefore, for the sake of conciseness, no additional textual description thereof is provided herein.

The circuits of FIGS. 9F and 9G is provided to ensure that the voltage is identical on both leads of the twisted pair to which they are coupled in order to prevent current flow through transformers 1710 (FIG. 9E). This is accomplished by the circuits of 9F and 9G by changing the current flowing through the active filters 1702 and 1704 under the control of elements 1706 and 1708 respectively.

Figure 10A:
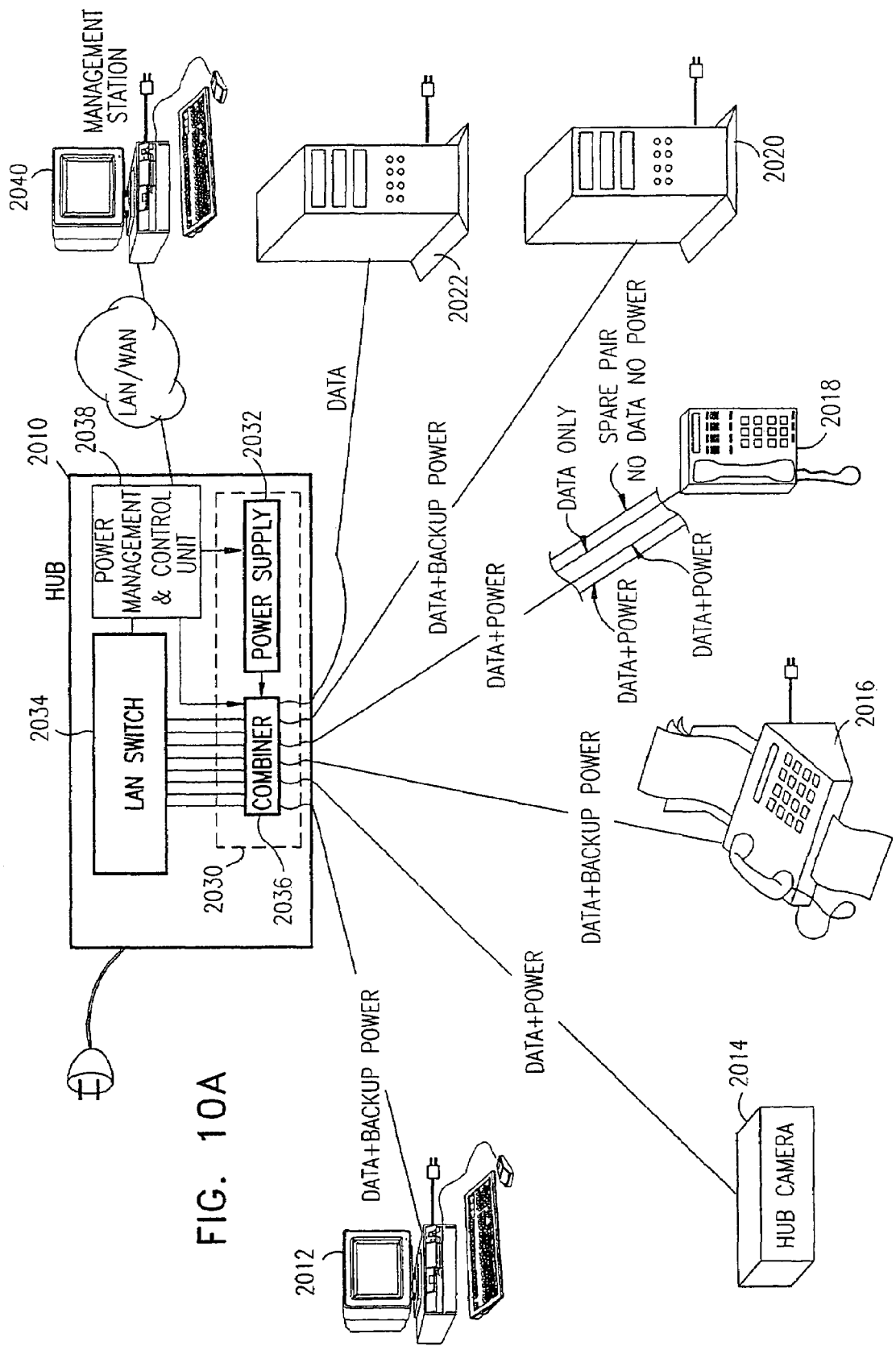
FIGS. 10A & 10B are simplified block diagram illustrations of two alternative embodiments of a communications network including power supply and management over communications cabling constructed and operative in accordance with a preferred embodiment of the present invention.

Reference is now made to FIG. 10A, which is a simplified block diagram illustration of a communications network including power supply and management over communications cabling constructed and operative in accordance with a preferred embodiment of the present invention.

As seen in FIG. 10A, there is provided a local area network (LAN) comprising a hub 2010 which is coupled, by cabling, preferably a structured cabling system, to a plurality of LAN nodes, such as a desktop computer 2012, a web camera 2014, a facsimile machine 2016, a LAN telephone, also known as an IP telephone 2018, a computer 2020 and a server 2022.

In accordance with a preferred embodiment of the present invention there is provided a power supply subsystem 2030 which is operative to provide at least some operating or backup power to at least some of said plurality of nodes via the hub 2010 and the communication cabling connecting the hub to various LAN nodes.

In the illustrated embodiment of FIG. 10A, subsystem 2030 is located within the hub 2010 and includes a power supply 2032 which supplies operating power and/or backup power to various LAN nodes via the communication cabling. The communication cabling connects a LAN switch 2034 via a combiner 2036 to the various LAN nodes. The combiner couples electrical power from the power supply 2032 along the communication cabling to at least some of the LAN nodes. Bidirectional data communications from LAN switch 2034 pass through the combiner 2036, substantially without interference.

In accordance with a preferred embodiment of the present invention, there is provided in hub 2010 a power management & control unit 2038 which monitors and controls the power supplied by subsystem 2030 to the various LAN nodes via the communications cabling. The power management & control unit 2038 preferably communicates with a management workstation 2040, preferably via a LAN or a WAN. Management workstation 2040 is operative, preferably under the control of an operator, to govern the operation of power management & control unit 2038.

It is appreciated that a management workstation 2040 may govern the operation of multiple power management & control units 2038. The power management & control unit 2038 may also communicate with various LAN nodes via LAN switch 2034 by providing standard LAN messages to the nodes thereby to govern their current mode of power usage. For example, power management & control unit 2038 may send control messages which are decoded at the LAN nodes and are employed by controllers in the circuitry of FIGS. 14A & 14B for controlling whether full or partial functionality is provided there at.

In one specific case, when the power management & control unit 2038 senses that mains power to power supply 2032 is not available, it may send a control message via LAN switch 2034 to cause the various LAN nodes to operate in a backup or reduced power mode.

It is seen that the communication cabling from the hub 2010 to the desktop computer 2012, facsimile machine 2016 and computer 2020 carries both data and backup power, while the communication cabling from the hub 2010 to the hub camera 2014 and LAN telephone 2018 carries both data and operating power and the communication cabling from the hub to the server 2022 carries only data, in a typically LAN arrangement constructed and operative in accordance with a preferred embodiment of the present invention.

It is appreciated that each of the LAN nodes 2012-2020, which receives power over the communication cabling, includes a separator for separating the electrical power from the data. In the illustrated embodiment of FIG. 10A, the separators are typically internal to the respective nodes and are not separately designated, it being appreciated that alternatively discrete separators may be employed.

It is a particular feature of the embodiment of FIG. 10A that both data and power are carried on the same twisted copper pair.

Figure 11A:
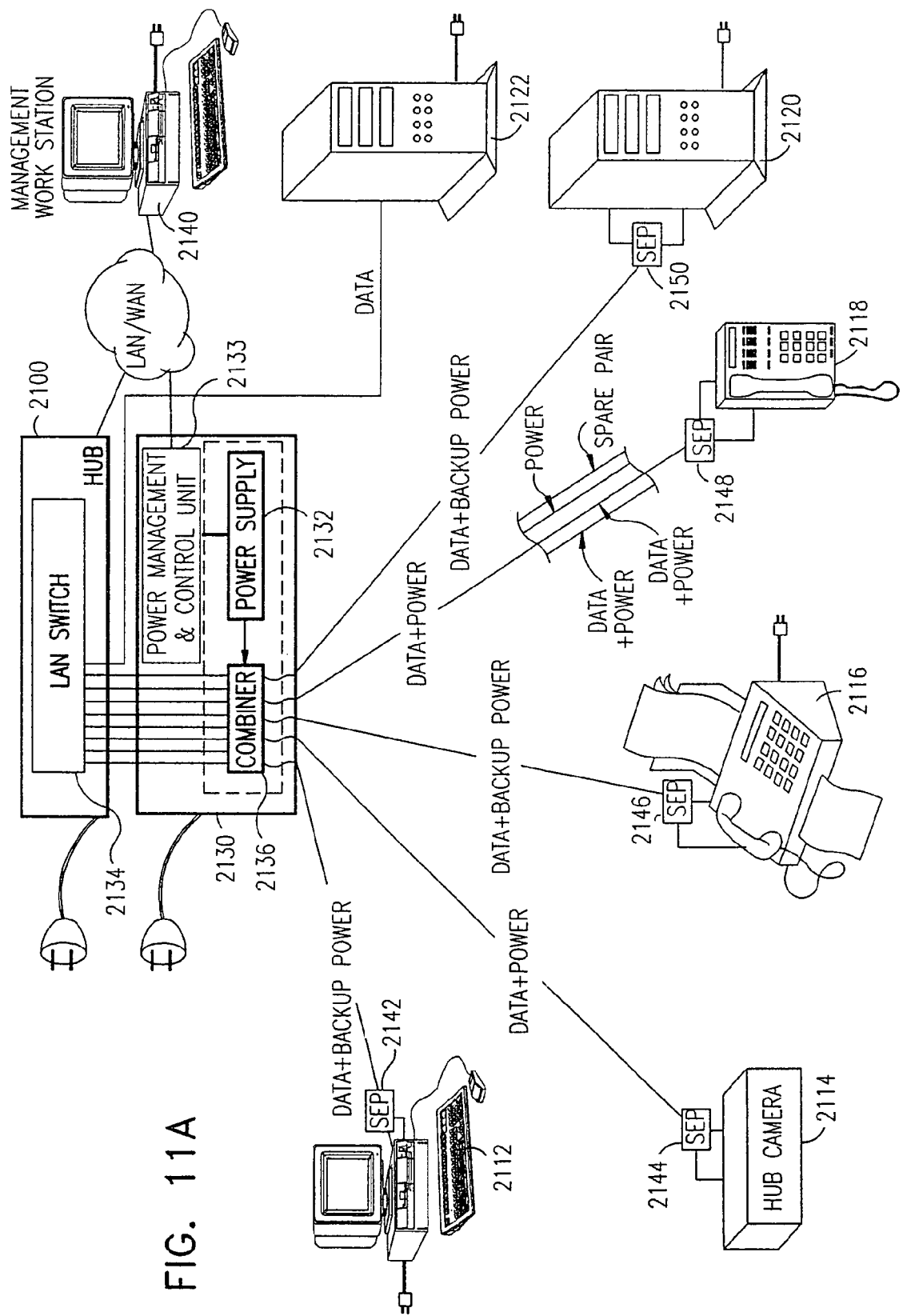
FIGS. 11A & 11B are simplified block diagram illustrations of two alternative embodiments of a local area network including power supply and management unit operative to provide electrical power to local area network nodes over communication cabling.

It is appreciated that FIG. 10A illustrates one embodiment of a system providing electric power to plural LAN nodes via a hub and communication cabling connecting the hub to various LAN nodes. Another embodiment of a system providing electric power to plural LAN nodes via a hub and communication cabling connecting the hub to various LAN nodes is illustrated in FIG. 11A. FIG. 11A illustrates a local area network including a power supply and management unit operative to provide electrical power to local area network nodes over communication cabling.

Figure 10B:
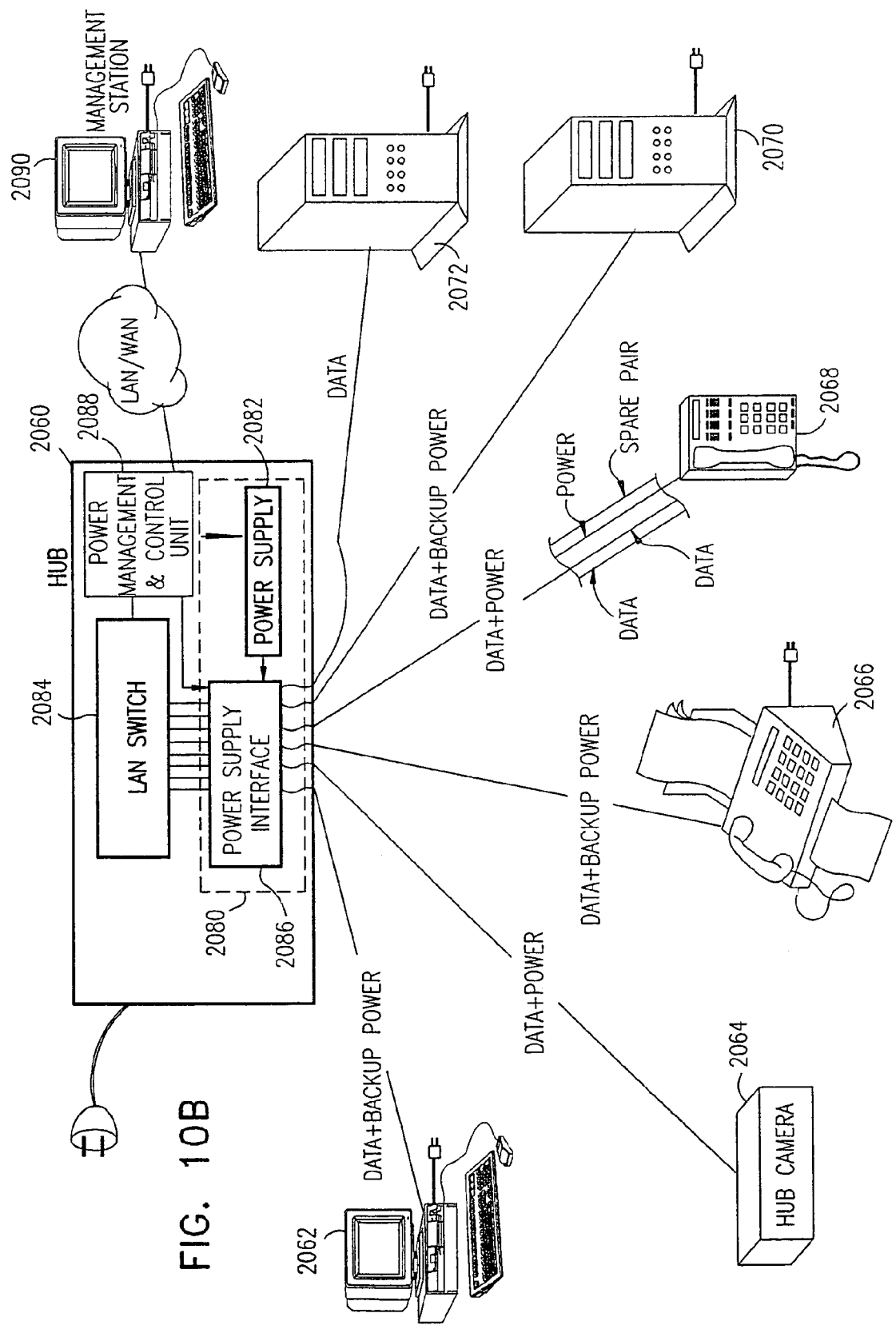

Reference is now made to FIG. 10B, which is a simplified block diagram illustration of a communications network including power supply and management over communications cabling constructed and operative in accordance with a preferred embodiment of the present invention.

As seen in FIG. 10B, there is provided a local area network (LAN) comprising a hub 2060 which is coupled, by cabling, preferably a structured cabling system, to a plurality of LAN nodes, such as a desktop computer 2062, a web camera 2064, a facsimile machine 2066, a LAN telephone, also known as an IP telephone 2068, a computer 2070 and a server 2072.

In accordance with a preferred embodiment of the present invention there is provided a power supply subsystem 2080 which is operative to provide at least some operating or backup power to at least some of said plurality of nodes via the hub 2060 and the communication cabling connecting the hub to various LAN nodes.

In the illustrated embodiment of FIG. 10B, subsystem 2080 is located within the hub 2060 and includes a power supply 2082 which supplies operating power and/or backup power to various LAN nodes via the communication cabling. The communication cabling connects a LAN switch 2084 via a power supply interface 2086 to the various LAN nodes. The power supply interface provides electrical power from the power supply 2082 along the communication cabling to at least some of the LAN nodes. Bidirectional data communications from LAN switch 2084 pass through the power supply interface 2086, substantially without interference.

In accordance with a preferred embodiment of the present invention, there is provided in hub 2060 a power management & control unit 2088 which monitors and controls the power supplied by subsystem 2080 to the various LAN nodes via the communications cabling. The power management & control unit 2088 preferably communicates with a management workstation 2090, preferably via a LAN or a WAN. Management workstation 2090 is operative, preferably under the control of an operator, to govern the operation of power management & control unit 2088.

It is appreciated that a management workstation 2090 may govern the operation of multiple power management & control units 2088. The power management & control unit 2088 may also communicate with various LAN nodes via LAN switch 2084 by providing standard LAN messages to the nodes thereby to govern their current mode of power usage. For example, power management & control unit 2088 may send control messages which are decoded at the LAN nodes and are employed by controllers in the circuitry of FIGS. 14A & 14B for controlling whether full or partial functionality is provided there at.

In one specific case, when the power management & control unit 2088 senses that mains power to power supply 2082 is not available, it may send a control message via LAN switch 2084 to cause the various LAN nodes to operate in a backup or reduced power mode.

It is seen that the communication cabling from the hub 2060 to the desktop computer 2062, facsimile machine 2066 and computer 2070 carries both data and backup power, while the communication cabling from the hub 2060 to the hub camera 2064 and LAN telephone 2068 carries both data and operating power and the communication cabling from the hub to the server 2072 carries only data, in a typically LAN arrangement constructed and operative in accordance with a preferred embodiment of the present invention.

It is appreciated that each of the LAN nodes 2062-2070, which receives power over the communication cabling, includes a connector for separately providing electrical power and data. In the illustrated embodiment of FIG. 10B, the connectors are typically internal to the respective nodes and are not separately designated, it being appreciated that alternatively discrete connector may be employed.

It is a particular feature of the embodiment of FIG. 10B that data and power are carried on separate twisted copper pairs of each communication cabling line.

Figure 11B:
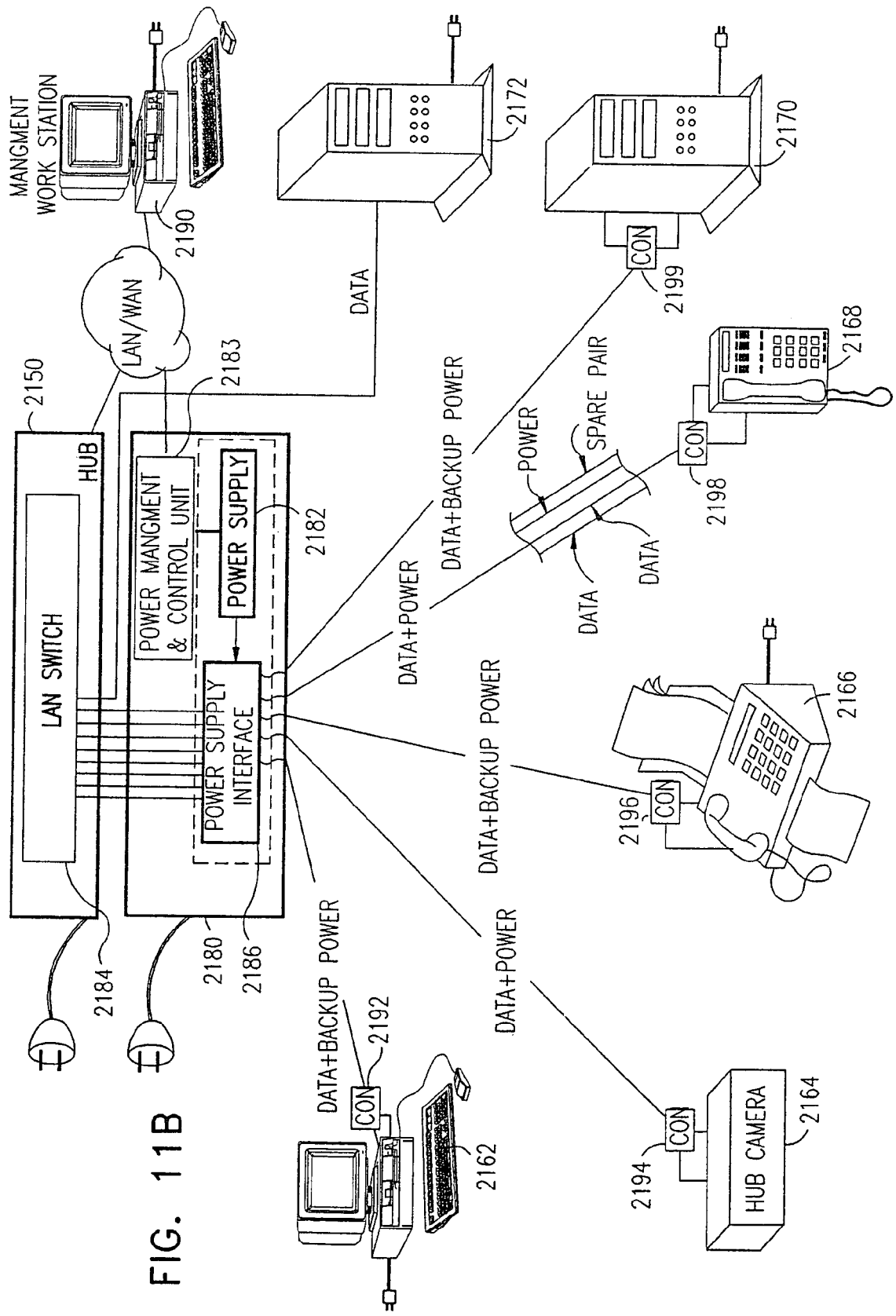

It is appreciated that FIG. 10B illustrates one embodiment of a system providing electric power to plural LAN nodes via a hub and communication cabling connecting the hub to various LAN nodes. Another embodiment of a system providing electric power to plural LAN nodes via a hub and communication cabling connecting the hub to various LAN nodes is illustrated in FIG. 11B. FIG. 11B illustrates a local area network including a power supply and management unit operative to provide electrical power to local area network nodes over communication cabling.

In the illustrated embodiment of FIG. 11A, a conventional hub 2100 does not provide electrical power over the communication cabling and a power supply and management subsystem 2130 is located externally of hub 2100 and includes a power supply 2132 which supplies operating power and/or backup power to various LAN nodes via the communication cabling as well as a power management & control unit 2133.

The communication cabling connects a LAN switch 2134 of conventional hub 2100 to a combiner 2136 in power supply and management subsystem 2130 and connects the combiner to the various LAN nodes. The combiner 2136 couples electrical power from the power supply 2132 along the communication cabling to at least some of the LAN nodes. Bidirectional data communications from LAN switch 2134 pass through the combiner 2136, substantially without interference.

In accordance with a preferred embodiment of the present invention, there is provided in power supply and management subsystem 2130 power management & control unit 2133 which monitors and controls the power supplied by subsystem 2130 to the various LAN nodes via the communications cabling. The power management & control unit 2133 preferably communicates with a management workstation 2140, preferably via a LAN or a WAN.

Management workstation 2140 is operative, preferably under the control of an operator, to govern the operation of power management & control unit 2133. It is appreciated that a management workstation 2140 may govern the operation of multiple power management & control units 2133 and may also govern the operation of multiple hubs 2100.

It is seen that the communication cabling from the hub 2100 to the desktop computer 2112, facsimile machine 2116 and computer 2120 carries both data and backup power, while the communication cabling from the hub 2100 to the hub camera 2114 and LAN telephone 2118 carries both data and operating power and the communication cabling from the hub 2100 to the server 2122 carries only data and may, but need not pass through subsystem 2130, in a typically LAN arrangement constructed and operative in accordance with a preferred embodiment of the present invention.

In the illustrated embodiment of FIG. 11A, each of the LAN nodes 2112-2120 which receives power is provided with an external separator for separating the data from the electrical power coupled to the communication cabling. The external separators associated with respective nodes 2112-2120 are designated by respective reference numbers 2142-2150. Each such separator has a communication cabling input and separate data and power outputs. It is appreciated that some or all of the nodes 2112-2120 may alternatively be provided with internal separators and that some or all of the nodes 2112-2120 may be provided with external separators.

It is appreciated that in addition to the LAN nodes described hereinabove, the present invention is useful with any other suitable nodes such as, for example, wireless LAN access points, emergency lighting system elements, paging loudspeakers, CCTV cameras, alarm sensors, door entry sensors, access control units, laptop computers, network elements, such as hubs, switches and routers, monitors and memory backup units for PCs and workstations.

In the illustrated embodiment of FIG. 11B, a conventional hub 2150 does not provide electrical power over the communication cabling and a power supply and management subsystem 2180 is located externally of hub 2150 and includes a power supply 2182 which supplies operating power and/or backup power to various LAN nodes via the communication cabling as well as a power management & control unit 2183.

The communication cabling connects a LAN switch 2184 of conventional hub 2150 to a power supply interface 2186 in power supply and management subsystem 2180 and connects the combiner to the various LAN nodes. The power supply interface 2186 provides electrical power from the power supply 2182 along the communication cabling to at least some of the LAN nodes. Bidirectional data communications from LAN switch 2184 pass through the power supply interface 2186, substantially without interference.

In accordance with a preferred embodiment of the present invention, there is provided in power supply and management subsystem 2180 power management & control unit 2183 which monitors and controls the power supplied by subsystem 2180 to the various LAN nodes via the communications cabling. The power management & control unit 2183 preferably communicates with a management workstation 2190, preferably via a LAN or a WAN.

Management workstation 2190 is operative, preferably under the control of an operator, to govern the operation of power management & control unit 2183. It is appreciated that a management workstation 2190 may govern the operation of multiple power management & control units 2183 and may also govern the operation of multiple hubs 2150.

It is seen that the communication cabling from the hub 2150 to the desktop computer 2162, facsimile machine 2166 and computer 2170 carries both data and backup power, while the communication cabling from the hub 2150 to the hub camera 2164 and LAN telephone 2168 carries both data and operating power and the communication cabling from the hub 2150 to the server 2172 carries only data and may, but need not pass through subsystem 2180, in a typically LAN arrangement constructed and operative in accordance with a preferred embodiment of the present invention.

In the illustrated embodiment of FIG. 11B, each of the LAN nodes 2162-2170 which receives power is provided with an external connector for separately providing data and electrical power from the communication cabling. The external connectors associated with respective nodes 2162-2170 are designated by respective reference numbers 2192-2199. Each such connector has a communication cabling input and separate data and power outputs. It is appreciated that some or all of the nodes 2162-2170 may alternatively be provided with internal connectors and that some or all of the nodes 2162-2170 may be provided with external connectors.

It is appreciated that in addition to the LAN nodes described hereinabove, the present invention is useful with any other suitable nodes such as, for example, wireless LAN access points, emergency lighting system elements, paging loudspeakers, CCTV cameras, alarm sensors, door entry sensors, access control units, laptop computers, network elements, such as hubs, switches and routers, monitors and memory backup units for PCs and workstations.

Figure 12A:
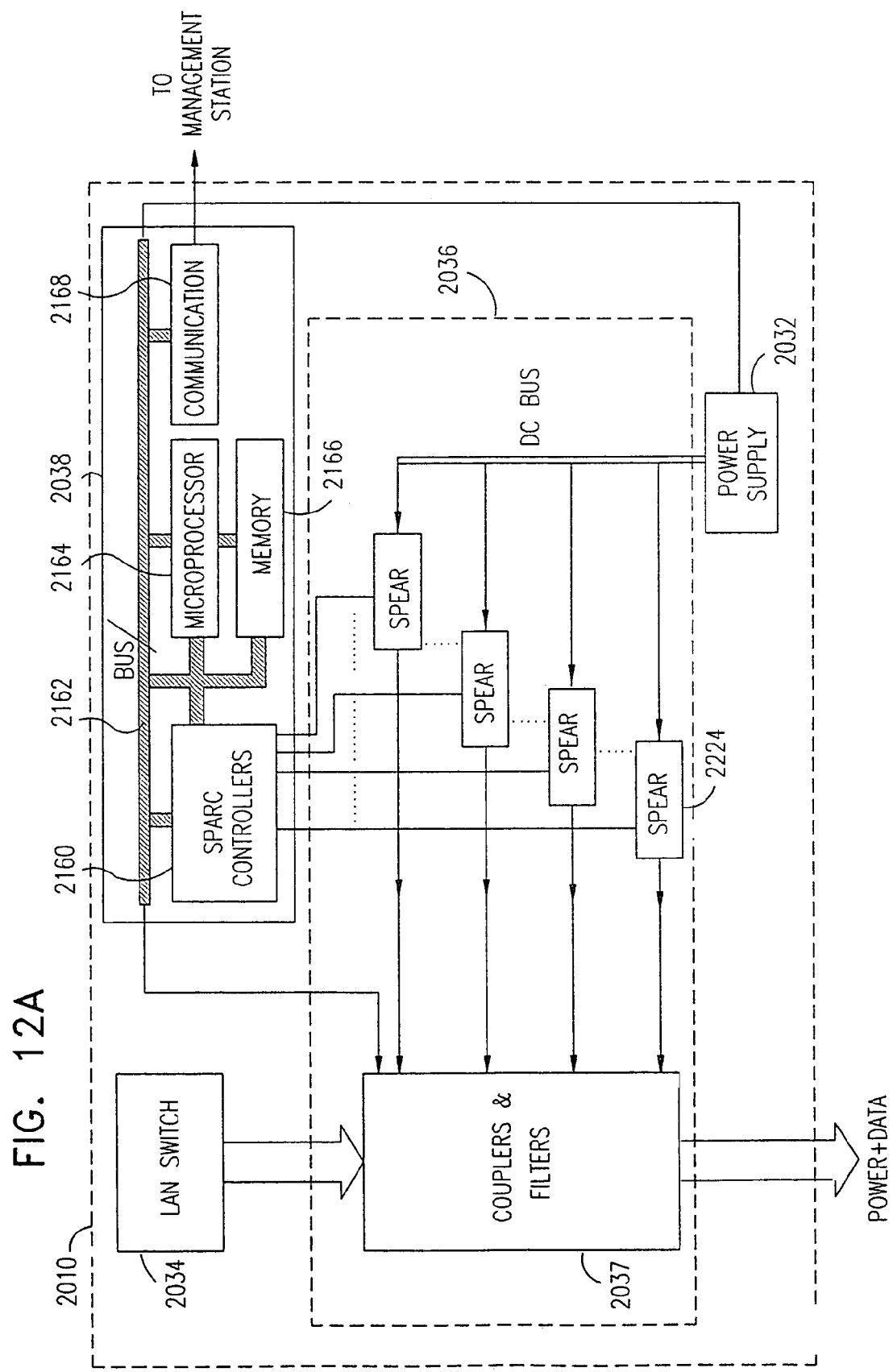
FIGS. 12A & 12B are simplified block diagram illustrations of a hub useful in the embodiments of FIGS. 10A & 10B respectively.

Reference is now made to FIG. 12A, which is a simplified block diagram illustration of a hub, such as hub 2010, useful in the embodiment of FIG. 10A. Hub 2010 preferably comprises a conventional, commercially available, LAN switch, such as LAN switch 2034 (FIG. 10A), which functions as a data communication switch/repeater and is coupled to a coupler and filter unit 2037 which includes couplers 220 and filters 222 as shown in FIG. 3A and forms part of combiner 2036 (FIG. 10A).

The coupler and filter unit 2037 is connected to a plurality of smart power allocation and reporting circuits (SPEARs) 2224. Each SPEAR 2224 is connected to power supply 2032 (FIG. 10A) for receiving electrical power therefrom. It is appreciated that power supply 2032 may be physically located externally of the hub 2010. Power supply 2032 may be provided with a power failure backup facility, such as a battery connection.

Power management & control unit 2038 (FIG. 10A), preferably includes SPEAR controllers 2160 which are preferably connected via a bus 2162 to a microprocessor 2164, a memory 2166 and communication circuitry 2168, which typically includes a modem. The power management & control subsystem 2038 is preferably operative to control the operation of all of the couplers, filters and SPEARs in combiner 2036 as well as to control the operation of the power supply 2032. Power management & control subsystem 2038 preferably communicates with management work station 2040 (FIG. 10A) in order to enable operator control and monitoring of the power allocated to the various LAN nodes in various operational modes of the system.

Figure 12B:
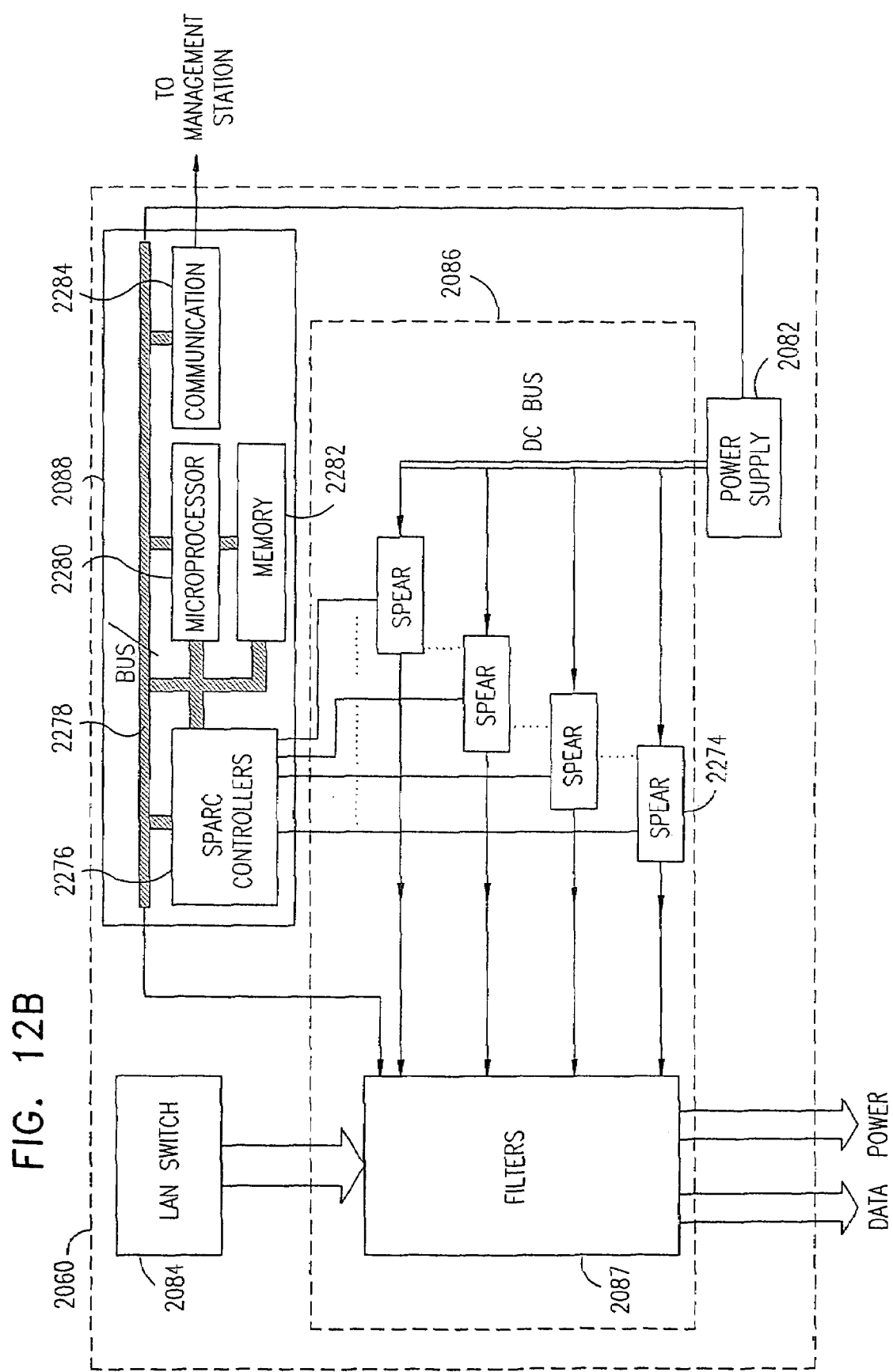

Reference is now made to FIG. 12B, which is a simplified block diagram illustration of a hub, such as hub 2060, useful in the embodiment of FIG. 10B. Hub 2060 preferably comprises a conventional, commercially available, LAN switch, such as LAN switch 2084 (FIG. 10B), which functions as a data communication switch/repeater and is coupled to a filter unit 2087 which includes filters 222 as shown in FIG. 3B and forms part of power supply interface 2086 (FIG. 10B).

The filter unit 2087 is connected to a plurality of smart power allocation and reporting circuits (SPEARs) 2274. Each SPEAR 2274 is connected to power supply 2082 (FIG. 10B) for receiving electrical power therefrom. It is appreciated that power supply 2082 may be physically located externally of the hub 2060. Power supply 2082 may be provided with a power failure backup facility, such as a battery connection.

Power management & control unit 2088 (FIG. 10B), preferably includes SPEAR controllers 2276 which are preferably connected via a bus 2278 to a microprocessor 2280, a memory 2282 and communication circuitry 2284, which typically includes a modem. The power management & control subsystem 2088 is preferably operative to control the operation of all of the filters and SPEARs in power supply interface 2086 as well as to control the operation of the power supply 2082. Power management & control unit 2088 preferably communicates with management work station 2090 (FIG. 10B) in order to enable operator control and monitoring of the power allocated to the various LAN nodes in various operational modes of the system.

Figure 13A:
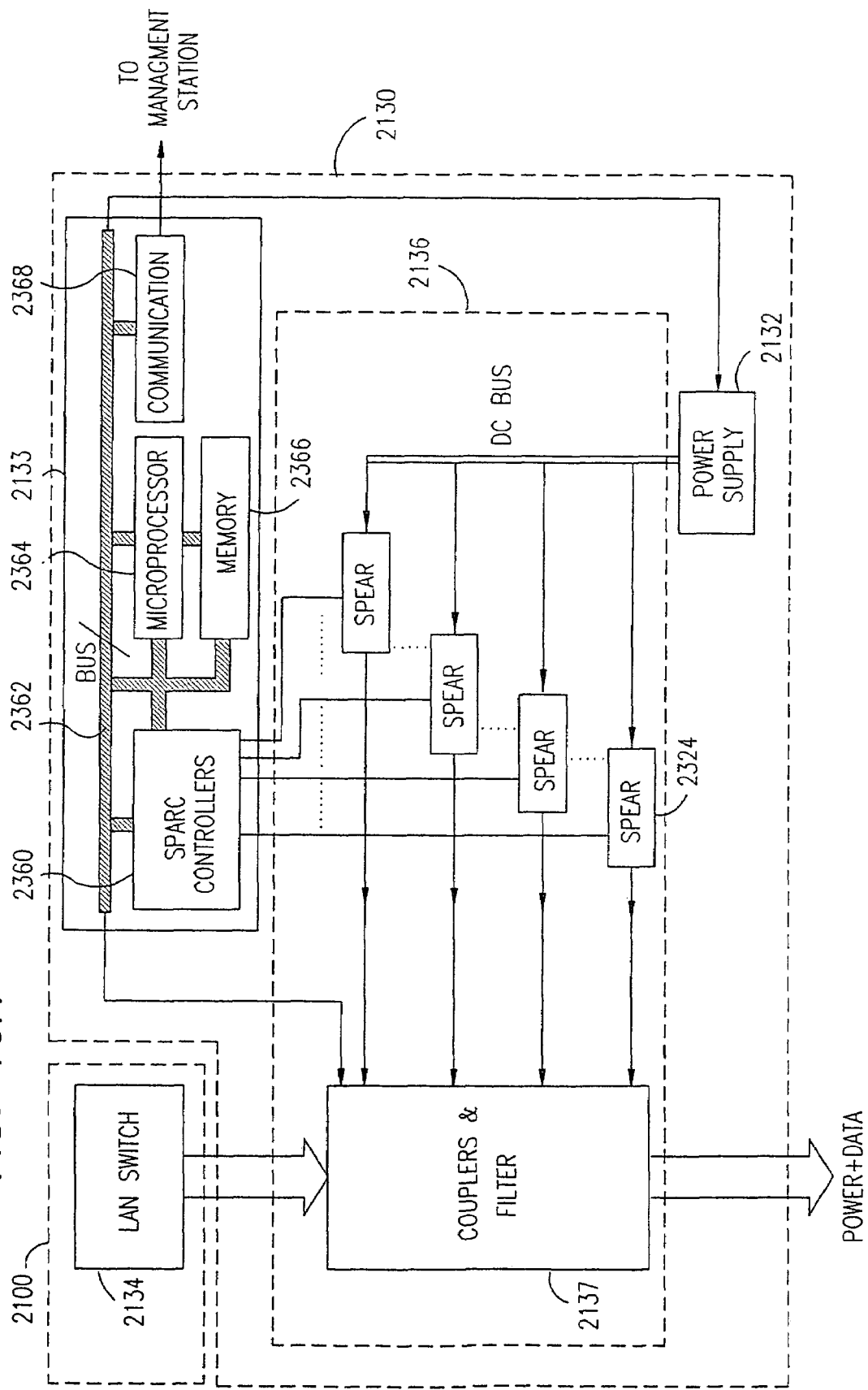
FIGS. 13A & 13B are simplified block diagram illustrations of a hub and a power supply and management subsystem useful in the embodiments of FIGS. 11A & 11B respectively.

Reference is now made to FIG. 13A, which is a simplified block diagram illustration of a hub and a power supply and management subsystem useful in the embodiment of FIG. 11A. Hub 2100 (FIG. 11A) preferably comprises a conventional, commercially available, LAN switch 2134 which functions as a data communication switch/repeater and is coupled to combiner 2136 forming part of power supply subsystem 2130.

Combiner 2136 includes a coupler and filter unit 2137 which include couplers 320 and filters 322 as shown in FIG. 4A.

The coupler and filter unit 2137 is connected to a plurality of smart power allocation and reporting circuits (SPEARS) 2324. Each SPEAR 2324 is connected to power supply 2132 (FIG. 11A) for receiving electrical power therefrom. It is appreciated that power supply 2132 may be physically located externally of the power supply and management subsystem 2130. Power supply 2132 may be provided with a power failure backup facility, such as a battery connection.

Power management & control unit 2133 (FIG. 11A), preferably includes SPEAR controllers 2360 which are preferably connected via a bus 2362 to a microprocessor 2364, a memory 2366 and communication circuitry 2368, which typically includes a modem. The power management & control unit 2133 is preferably operative to control the operation of all of the couplers, filters and SPEARs in combiner 2136 as well as to control the operation of the power supply 2132.

Power management & control subsystem 2133 preferably communicates with management work station 2140 (FIG. 11A) in order to enable operator control and monitoring of the power allocated to the various LAN nodes in various operational modes of the system.

Figure 13B:
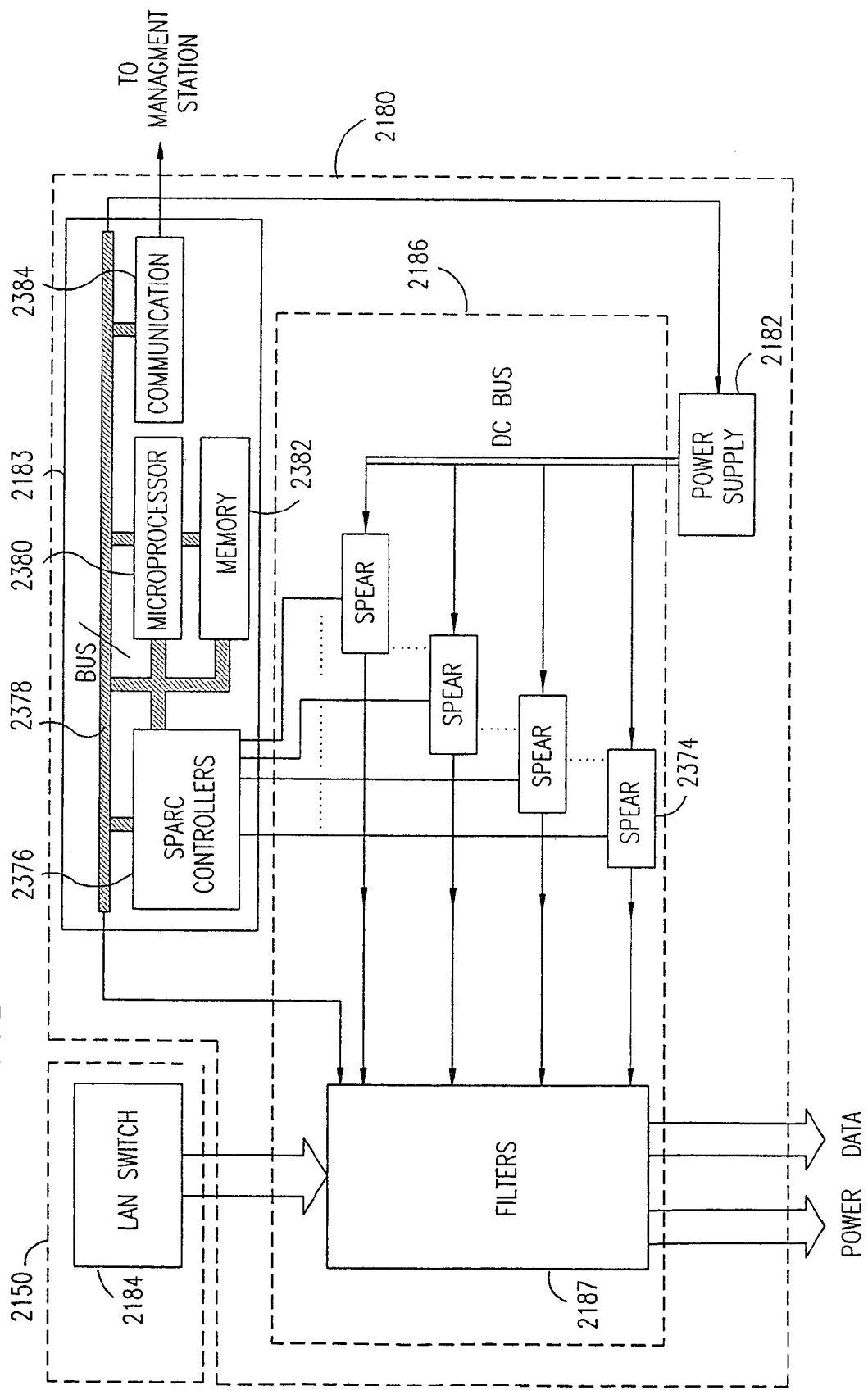

Reference is now made to FIG. 13B, which is a simplified block diagram illustration of a hub and a power supply and management subsystem useful in the embodiment of FIG. 11B. Hub 2150 (FIG. 11B) preferably comprises a conventional, commercially available, LAN switch 2184 which functions as a data communication switch/repeater and is coupled to power supply interface 2186 forming part of power supply subsystem 2180.

Power supply interface 2186 includes a filter unit 2187 which includes filters 372 as shown in FIG. 4B.

The filter unit 2187 is connected to a plurality of smart power allocation and reporting circuits (SPEARs) 2374. Each SPEAR 2374 is connected to power supply 2182 (FIG. 11B) for receiving electrical power therefrom. It is appreciated that power supply 2182 may be physically located externally of the power supply and management subsystem 2180. Power supply 2182 may be provided with a power failure backup facility, such as a battery connection.

Power management & control unit 2183 (FIG. 11B), preferably includes SPEAR controllers 2376 which are preferably connected via a bus 2378 to a microprocessor 2380, a memory 2382 and communication circuitry 2384, which typically includes a modem. The power management & control unit 2183 is preferably operative to control the operation of all of the filters and SPEARs in power supply interface 2186 as well as to control the operation of the power supply 2182.

Power management & control unit 2183 preferably communicates with management work station 2190 (FIG. 11B) in order to enable operator control and monitoring of the power allocated to the various LAN nodes in various operational modes of the system.

Figure 14A:
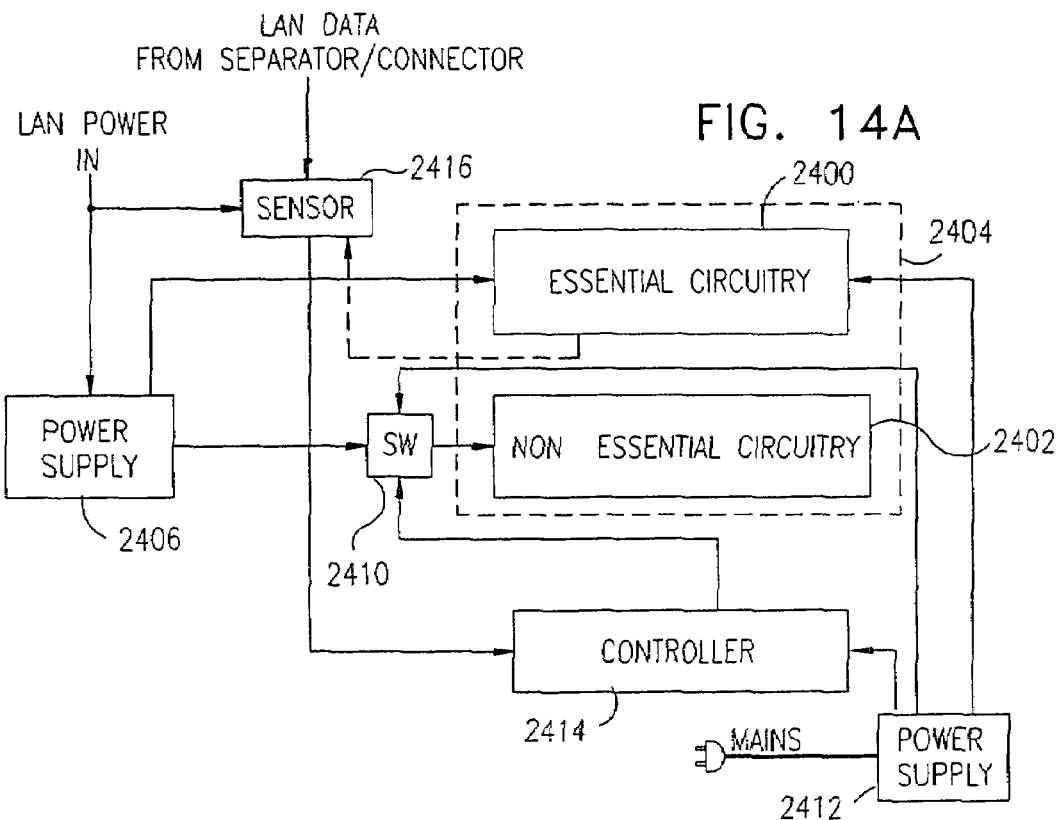
FIGS. 14A & 14B are simplified block diagrams of two different node configurations useful in the embodiments of FIGS. 10A, 10B, 11A & 11B.
Figure 14B:
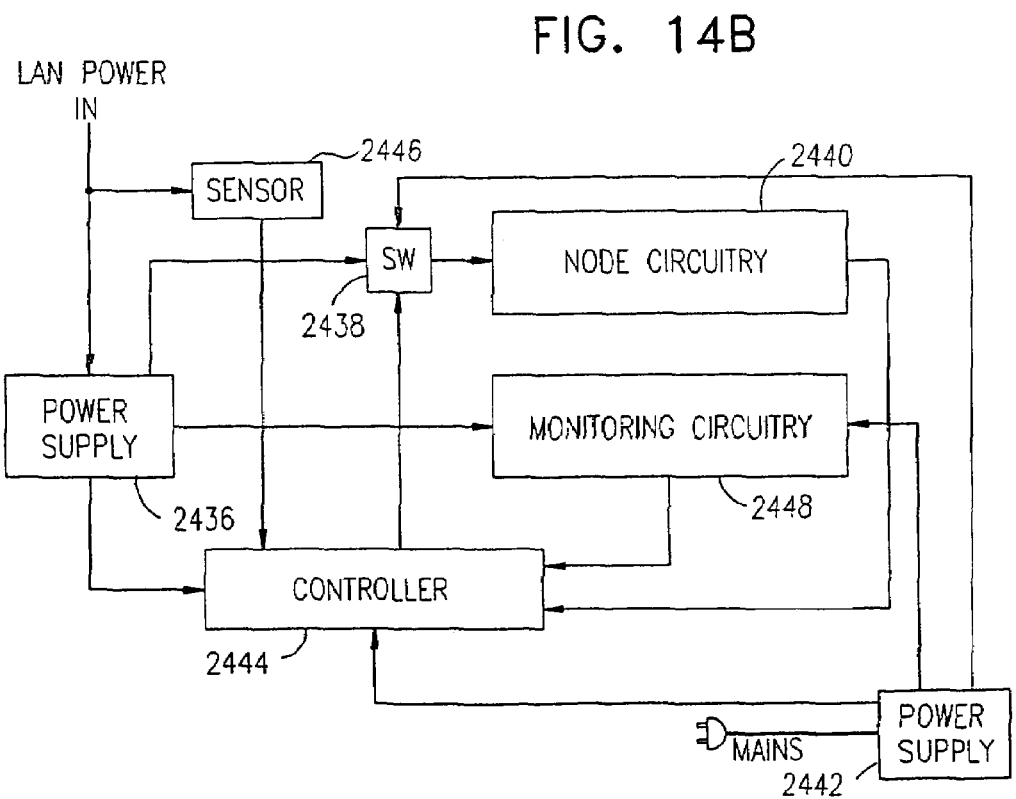

Reference is now made to FIGS. 14A & 14B, which are simplified block diagrams of two different node configurations useful in the embodiments of FIGS. 10A, 10B, 11A and 11B The circuitry seen in FIG. 14A includes circuitry which is preferably embodied in a node, parts of which circuitry may alternatively be embodied in a separator or connector associated with that node.

The node, whatever its nature, for example any of nodes 2012-2020 in FIG. 10A, 2062-2070 in FIG. 10B, 2112-2120 in FIG. 11A or 2162-2170 in FIG. 11B, typically includes circuitry which is required for both full functionality and reduced functionality operation, here termed "essential circuitry" and designated by reference numeral 2400, and circuitry which is not required for reduced functionality operation, here termed "non-essential circuitry" and designated by reference numeral 2402. For example, if the node comprises an IP telephone, the essential circuitry 2400 includes that circuitry enabling a user to speak and hear over the telephone, while the non-essential circuitry 2402 provides ancillary functions, such as automatic redial, telephone directory and speakerphone functionality.

The circuitry 2400 and 2402 which is typically part of the node is indicated by reference numeral 2404. Other circuitry, which may or may not be incorporated within the node will now be described. A power supply 2406, such as power supply 510 (FIG. 7A) or 560 (FIG. 7B) receives electrical power via communication cabling from a separator, such as separator 508 shown in FIG. 7A or from a connector, such as connector 558 shown in FIG. 7B. The power supply 2406 supplies electrical power separately to the essential circuitry 2400 and via a switch 2410 to the non-essential circuitry 2402. Switch 2410 may also receive and control the transfer of electrical power from a power supply 2412 which is connected to mains power.

Switch 2410 receives a control input from a controller 2414 which is typically a conventional microcontroller providing a binary output. Controller 2414 receives a control input from a sensor 2416. Preferably controller 2414 also receives a control input from power supply 2412.

Sensor 2416 may be implemented in a number of possible ways. It may, for example, sense the voltage level of the electrical power being supplied to power supply 2406. Additionally or alternatively, it may sense a control signal transmitted thereto, such as a signal transmitted via the communication cabling from the power management & control unit 2038 via the combiner 2036 (FIG. 10A) or from similar circuitry in the embodiment of FIG. 11A. Alternatively, it may sense a control signal transmitted thereto, such as a signal transmitted via the communication cabling from the power management & control unit 2088 via the power supply interface 2086 (FIG. 10B) or from similar circuitry in the embodiment of FIG. 11B.

The sensor 2416 may receive inputs from either or both the power and data outputs of separator 508 (FIG. 7A) or connector 558 (FIG. 7B). The input that it receives from the data output of separator 508 or connector 558 may be tapped from an input to the essential circuitry which may include control signal decoding functionality, but preferably may be derived from an output of the essential circuitry which provides a decoded control signal.

The functionality of controller 2414 may be summarized as follows: When the controller 2414 receives. a control input from power supply 2412 indicating that mains power is available, it operates switch 2410 such that power is supplied to both essential circuitry 2400 and non-essential circuitry 2402.

When mains power is not available via power supply 2412, but sensor 2416 indicates that sufficient power is available via the communications cabling, controller 2414 operates switch 2410 such that power is supplied to both essential circuitry 2400 and non-essential circuitry 2402.

When, however, mains power is not available via power supply 2412 and sensor 2416 indicates that sufficient power is not available, controller operates switch 2410 such that adequate power is supplied with highest priority to the essential circuitry 2400. If additional power beyond that required by essential circuitry 2400 is also available, it may be supplied to the nonessential circuitry 2402 via switch 2410.

Alternatively, the operation of switch 2410 by the controller 2414 may not be determined solely or at all by the power available, but rather solely by control signals sensed by sensor 2416, wholly or partially independently of the available power.

Reference is now made to FIG. 14B. The circuitry seen in FIG. 14B includes circuitry which is preferably embodied in a node, parts of which circuitry may alternatively be embodied in a separator or connector associated with that node. A power supply 2436, such as power supply 510 (FIG. 7A) or 560 (FIG. 7B) receives electrical power via communication cabling from a separator, such as separator 508 shown in FIG. 7A or from a connector, such as connector 558 shown in FIG. 7B. The power supply 2436 supplies electrical power via a switch 2438 to the circuitry 2440 of the node. Switch 2438 may also receive electrical power from a power supply 2442 which is connected to mains power.

Switch 2438 receives a control input from a controller 2444 which is typically a conventional microcontroller providing a binary output. Controller 2444 receives a control input from a sensor 2446 as well as a control input from monitoring circuitry 2448. Monitoring circuitry 2448, which is continually powered by power supply 2436 or power supply 2442, senses a need of the LAN node to shift to full-functionality from sleep mode functionality. It may sense this need, for example, by receiving a user input indicating an intention to use the node or by receiving a control message via the communications cabling. Controller 2444 may also receive a control input from power supply 2442.

Sensor 2446 may be implemented in a number of possible ways. It may, for example, sense the voltage level of the electrical power being supplied to power supply 2446. Additionally or alternatively, it may sense a control signal transmitted thereto, such as a signal transmitted via the communication cabling from the power management & control unit 2038 via the combiner 2036 (FIG. 10A) or from similar circuitry in the embodiment of FIG. 11A. Alternatively, it may sense a control signal transmitted thereto, such as a signal transmitted via the communication cabling from the power management & control unit 2088 via the power supply interface 2086 (FIG. 10B) or from similar circuitry in the embodiment of FIG. 11B.

The functionality of controller 2444 may be summarized as follows: In the absence of an indication to the contrary from the monitoring circuitry 2448 or from sensor 2446, the controller operates switch 2438 so that circuitry 2440 does not operate. When a suitable input is received either from the monitoring circuitry 2448 or from sensor 2446, indicating a need for operation of circuitry 2440, the controller 2444 operates switch 2438 to cause operation of circuitry 2444.

Figure 15:
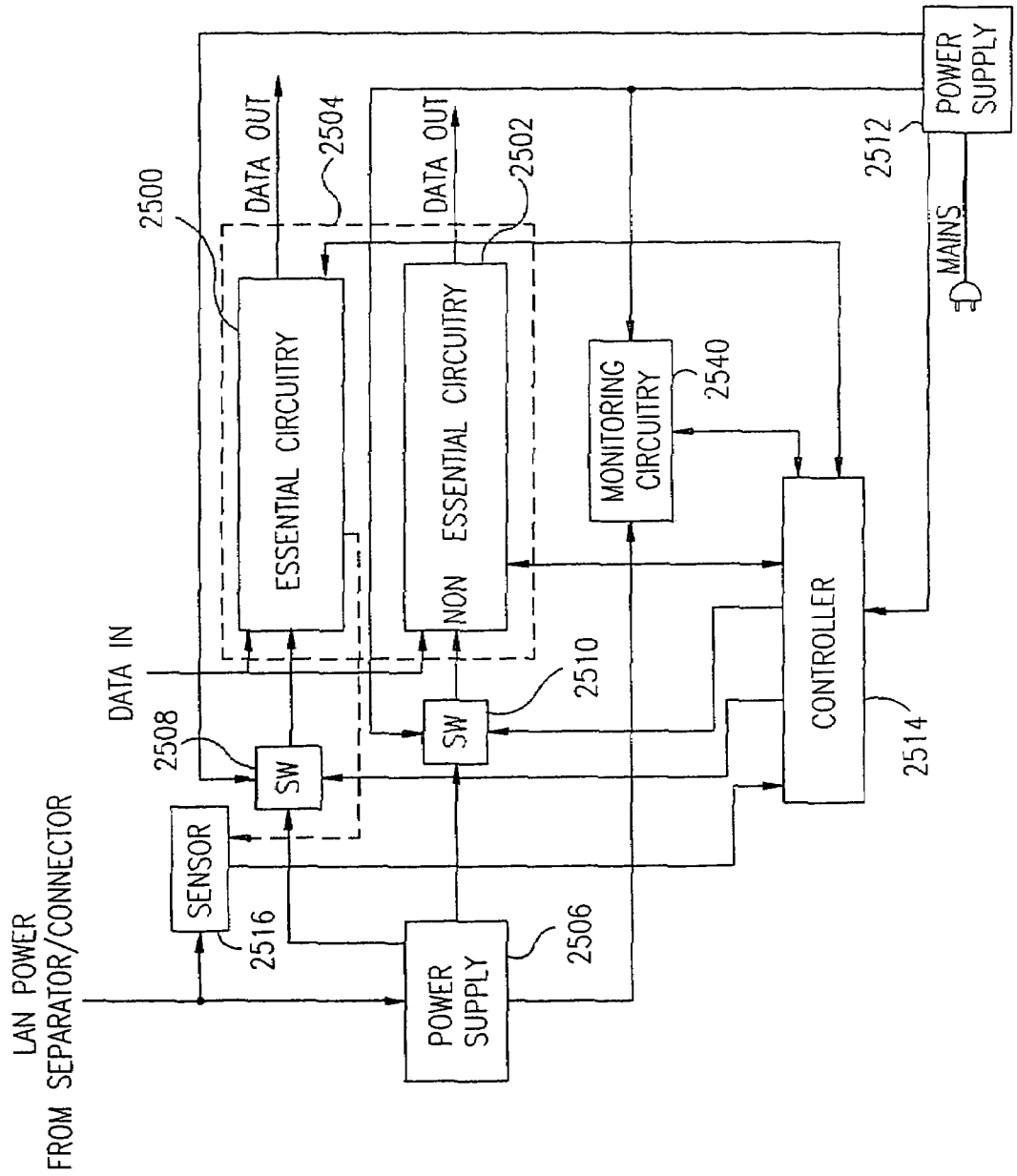
FIG. 15 is a simplified block diagram of a node configuration which combines the features shown in FIGS. 14A & 14B.

Reference is now made to FIG. 15. The circuitry seen in FIG. 15 includes circuitry which is preferably embodied in a node, parts of which circuitry may alternatively be embodied in a separator associated with that node.

The node, whatever its nature, for example any of nodes 2012-2020 in FIG. 10A, 2062-2070 in FIG. 10B, 2112-2120 in FIG. 11A or 2162-2170 in FIG. 11B, typically includes circuitry which is required for both full functionality and reduced functionality operation, here termed "essential circuitry" and designated by reference numeral 2500, and circuitry which is not required for reduced functionality operation, here termed "non-essential circuitry" and designated by reference numeral 2502. For example, if the node comprises an IP telephone, the essential circuitry 2500 includes that circuitry enabling a user to speak and hear over the telephone, while the non-essential circuitry 2502 provides ancillary functions, such as automatic redial, telephone directory and speakerphone functionality.

The circuitry 2500 and 2502 which is typically part of the node is indicated by reference numeral 2504. Other circuitry, which may or may not be incorporated within the node will now be described.

A power supply 2506, such as power supply 510 (FIG. 7A) or 560 (FIG. 7B) receives electrical power via communication cabling from a separator, such as separator 508 shown in FIG. 7A or connector 558 shown in FIG. 7B. The power supply 2506 supplies electrical power separately via a switch 2508 to the essential circuitry 2500 and via a switch 2510 to the non-essential circuitry 2502. Switches 2508 and 2510 may also receive and control the transfer of electrical power from a power supply 2512 which is connected to mains power.

Switches 2508 and 2510 each receive a control input from a controller 2514 which is typically a conventional microcontroller providing a binary output. Controller 2514 receives a control input from a sensor 2516. Preferably controller 2514 also receives a control input from power supply 2512.

Sensor 2516 may be implemented in a number of possible ways. It may, for example, sense the voltage level of the electrical power being supplied to power supply 2506. Additionally or alternatively, it may sense a control signal transmitted thereto, such as a signal transmitted via the communication cabling from the power management & control unit 2038 via the combiner 2036 (FIG. 10A) or from similar circuitry in the embodiment of FIG. 11A. Alternatively, it may sense a control signal transmitted thereto, such as a signal transmitted via the communication cabling from the power management & control unit 2088 via the power supply interface 2086 (FIG. 10B) or from similar circuitry in the embodiment of FIG. 11B.

The sensor 2516 may receive inputs from either or both the power and data outputs of separator 508 (FIG. 7A) or connector 558 (FIG. 7B). The input that it receives from the data output of separator 508 or from connector 558 may be tapped from an input to the essential circuitry which may include control signal decoding functionality, but preferably may be derived from an output of the essential circuitry which provides a decoded control signal.

Monitoring circuitry 2540, which is continually powered by power supply 2506 or power supply 2512, senses a need of the LAN node to shift to full-functionality from sleep mode functionality. It may sense this need, for example, by receiving a user input indicating an intention to use the node or by receiving a control message via the communications cabling.

The functionality of controller 2514 may be summarized as follows: When the controller 2514 receives a control input from power supply 2512 indicating that mains power is available, it operates switches 2508 and 2510 such that power is supplied to both essential circuitry 2500 and non-essential circuitry 2502.

When mains power is not available via power supply 2512, but sensor 2516 indicates that sufficient power is available via the communications cabling, controller 2514 operates switches 2508 and 2510 such that power is supplied to both essential circuitry 2500 and non-essential circuitry 2502.

When, however, mains power is not available via power supply 2512 and sensor 2516 indicates that sufficient power is not available, controller operates switch 2508 such that adequate power is supplied with highest priority to the essential circuitry 2500. If additional power beyond that required by essential circuitry 2500 is also available, it may be supplied to the non-essential circuitry 2502 via switch 2510.

Alternatively, the operation of switch 2510 by the controller 2514 may not be determined solely or at all by the power available, but rather solely by control signals sensed by sensor 2516, wholly or partially independently of the available power.

In the absence of an indication to the contrary from the monitoring circuitry 2540 or from sensor 2516, the controller operates switch 2508 so that circuitry 2500 does not operate. When a suitable input is received either from the monitoring circuitry 2540 or from sensor 2516, indicating a need for operation of circuitry 2500, the controller 2514 operates switch 2508 to cause operation of circuitry 2500.

In accordance with a preferred embodiment of the present invention, the power supply 2406 in the embodiment of FIG. 14A, 2436 in the embodiment of FIG. 14B and 2506 in the embodiment of FIG. 15 may be constructed to include rechargeable energy storage elements. In such an arrangement, these power supplies provide limited back-up power for use in the case of a power failure or any other suitable circumstance. They may also enable intermittent operation of LAN nodes in situations where only very limited power may be transmitted over the communication cabling.

Figure 16:
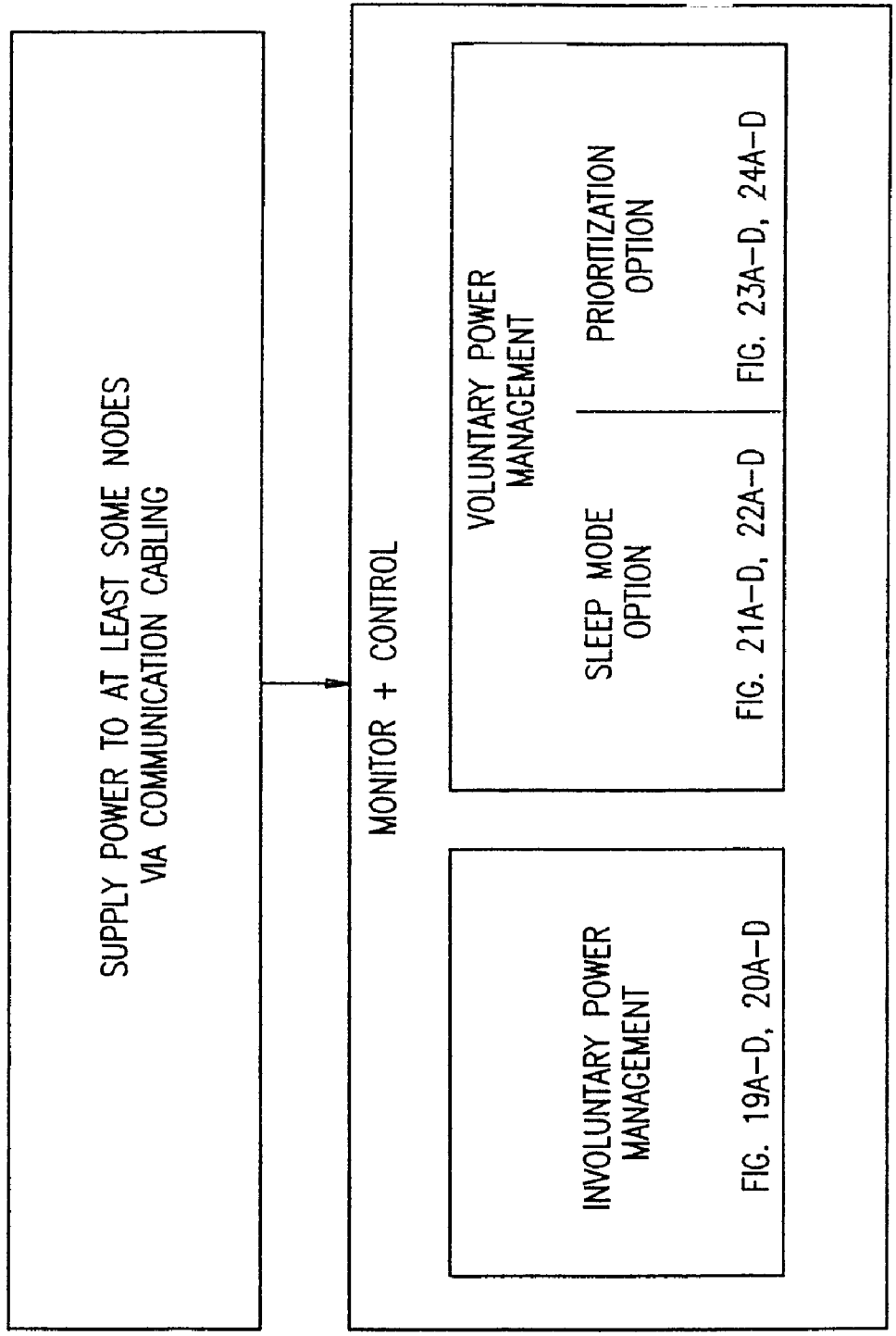
FIG. 16 is a generalized flowchart illustrating power management in both normal operation and reduced power modes of the networks of FIGS. 10A, 10B, 11A & 11B.

Reference is now made to FIG. 16, which is a generalized flowchart illustrating power management in both normal operation and reduced power modes of the networks of FIGS. 10A, 10B, 11A and 11B. As seen in FIG. 16, the power management & control unit 2038 (FIG. 10A), 2088 (FIG. 10B), 2133 (FIG. 11A) or 2138 (FIG. 11B) governs the supply of power to at least some LAN nodes via the communications cabling, preferably in accordance with a predetermined functionality which is described hereinbelow with reference to FIG. 17.

The power management & control unit 2038 (FIG. 10A), 2088 (FIG. 10B), 2133 (FIG. 11A) or 2138 (FIG. 11B) monitors and manages the power consumption of those LAN nodes. It senses over-current situations and effects power cutoffs as appropriate. The power management & control unit 2038 (FIG. 10A), 2088 (FIG. 10B), 2133 (FIG. 11A) or 2138 (FIG. 11B) may operate in either an involuntary power management mode or a voluntary power management mode. Normally the mode of operation is selected at the time that the LAN is configured, however, it is possible for mode selection to take place thereafter.

In an involuntary power management mode of operation, if the power management & control unit senses a situation of insufficient power availability for power transmission over the communications cabling to the LAN nodes, it supplies a reduced amount of power to at least some of the LAN nodes and may also provide control messages or other control inputs to the LAN nodes to cause them to operate in a reduced power mode. In a voluntary power management mode of operation, reduced power availability is mandated by management at certain times of reduced activity, such as nights and weekends, in order to save energy costs Reference is now made to FIG. 17, which illustrates a preferred methodology for supply of electrical power to at least some of the LAN nodes in accordance with the present invention.

Following initialization of hub 2010 (FIG. 10A), 20260 (FIG. 10B) or power supply and management subsystem 2130 (FIG. 11A), 2180 (FIG. 11B) the communications cabling connection to nodes, to which it is intended to transmit power over the communications cabling, is interrogated.

Initialization of hub 2010 (FIG. 10A), 20260 (FIG. 10B) or subsystem 2130 (FIG. 11A), 2180 (FIG. 11B) preferably includes automatically actuated test procedures which ensure proper operation of the elements of the hub 2010 (FIG. 10A), 20260 (FIG. 10B) or subsystem 2130 (FIG. 11A), 2180 (FIG. 11B) communication with management work station 2040 (FIG. 10A), 2090 (FIG. 10B), 2140 (FIG. 11A) or 2190 (FIG. 11B) if present to determine desired operational parameters of the hub for each node and setting up an internal data base including desired operational parameters for each node. During normal operation of the system, the various operational parameters for each node may be modified by an operator employing the management work station 2040 (FIG. 10A), 2090 (FIG. 10B), 2140 (FIG. 11A), 2190 (FIG. 11B).

The interrogation is described hereinbelow in greater detail with reference to FIGS. 18A and 18B.

If the node being interrogated is determined to have power-over-LAN type characteristics and is classified in the internal data base as a node to which it is intended to transmit power over the communications cabling, the SPEAR parameters are set based on the contents of the internal data base and power is transmitted to the node via the communications cabling. Where appropriate, suitable signaling messages are sent to the remote node and the status of the line connected to the node is reported to the management work station 2040.

The foregoing procedure is then repeated sequentially for each line of the hub 2110 or subsystem 2130, to which it is intended to transmit power over the communications cabling.

Figure 17:
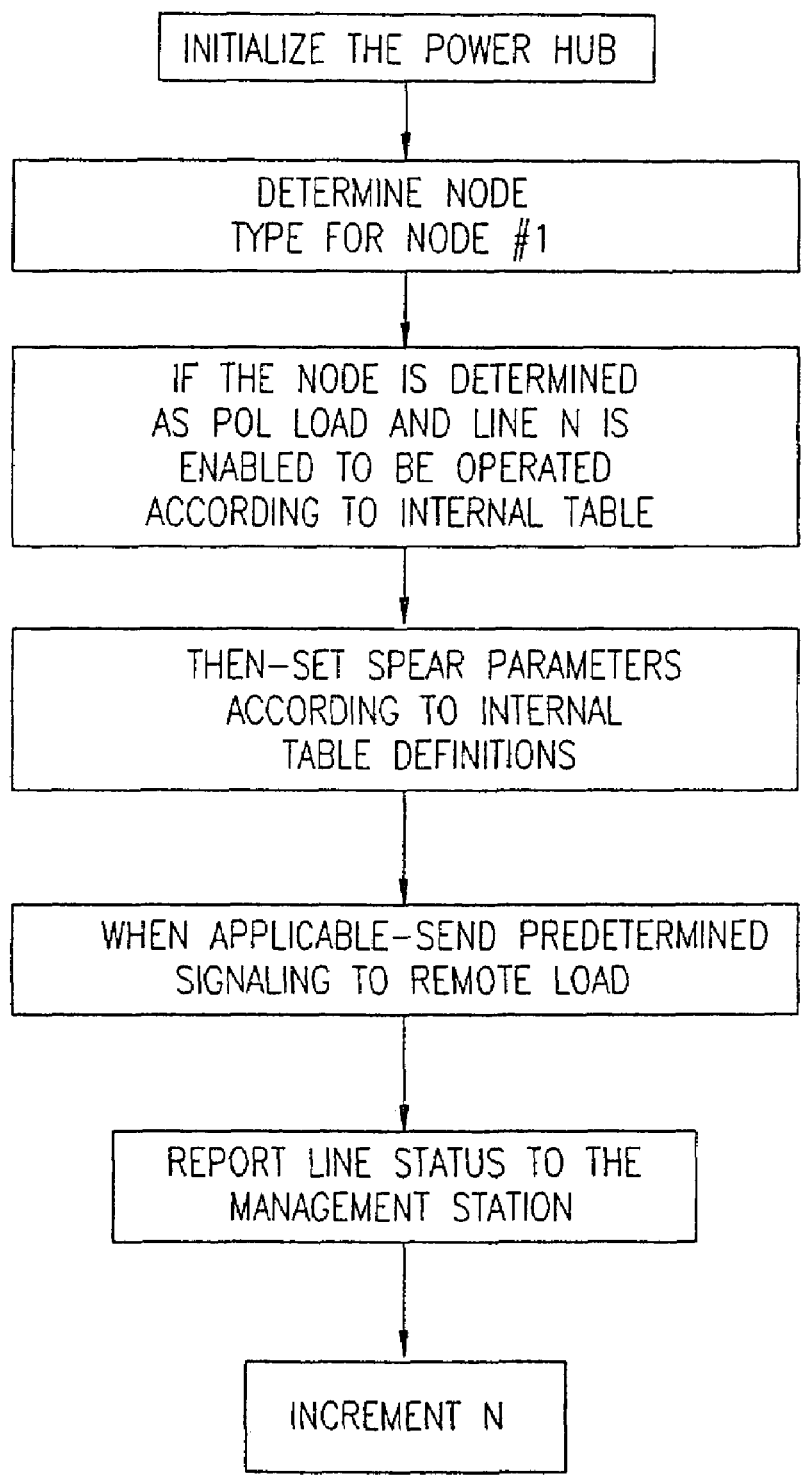
FIG. 17 is a generalized flowchart illustrating one step in the flowchart of FIG. 16.
Figure 18A:
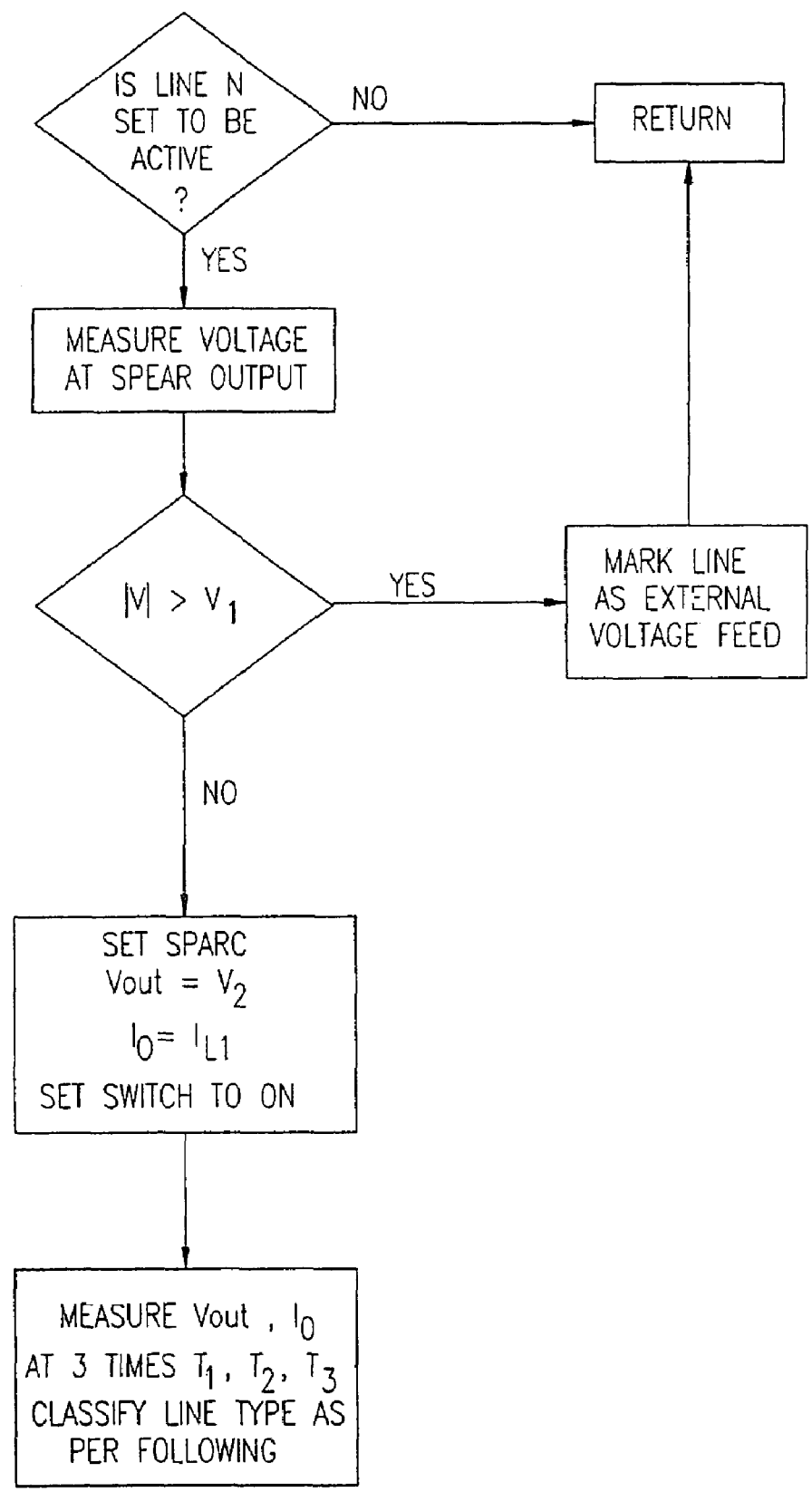
FIGS. 18A and 18B together are a generalized flowchart illustrating a preferred embodiment of the interrogation and initial power supply functionality which appears in FIG. 17.
Figure 18B:
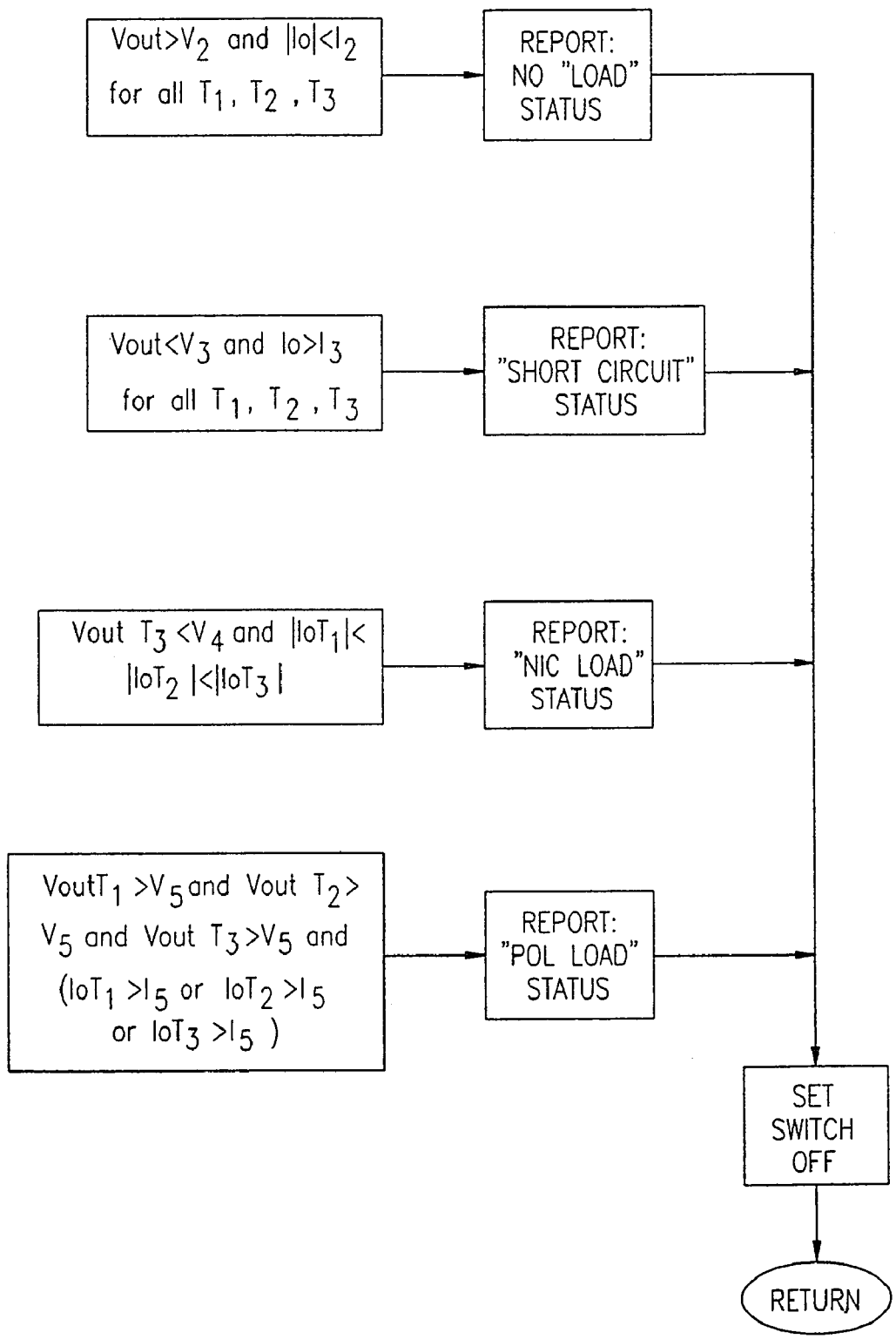

Reference is now made to FIGS. 18A and 18B, which together are a flowchart illustrating a preferred embodiment of the interrogation and initial power supply functionality which appears in FIG. 17.

As seen in FIGS. 18A & 18B, initially the voltage is measured at the output of the SPEAR 224 (FIG. 3A), 274 (FIG. 3B), 324 (FIG. 4A) or 374 (FIG. 4B) corresponding to a line to which it is intended to transmit power over the communications cabling. If the absolute value of the voltage is higher than a predetermined programmable threshold V1, the line is classified as having a voltage present thereon from an external source. In such a case power is not supplied thereto over the communications cabling.

If the absolute value of the voltage is not higher than the predetermined programmable threshold V1, the SPEAR current limit IO is set to a predetermined programmable value IL1. SPEAR switch 408 (FIG. 5) is turned ON.

The voltage and the current at the output of the SPEAR are measured, typically at three predetermined programmable times T1, T2 and T3. Times T1, T2 and T3 are typically determined by a time constant determined by the inductance of typical NIC transformers and the maximum roundtrip DC resistance of a maximum allowed length of communications cabling between the hub and a node. Typically, T1, T2 and T3 are equal to 1, 2 and 10 times the above time constant.

Typical values for T1, T2 and T3 are 4 msec, 8 msec and 40 msec, respectively.

Based on these measurements the status of the node and the line to which it is connected are determined. A typical set of determinations is set forth hereinbelow:

NO LOAD WHEN Vout>V2 AND THE ABSOLUTE VALUE OF IO<I2 FOR ALL T1, T2, T3

SHORT CIRCUIT WHEN Vout<V3 AND THE ABSOLUTE VALUE OF IO>I3 FOR ALL T1, T2, T3

NIC LOAD WHEN VoutT3<V4 AND
THE ABSOLUTE VALUE OF IOT1<IOT2<IOT3

POL LOAD WHEN VoutT1>V5 AND VoutT2>V5 AND VoutT3>V5 AND THE ABSOLUTE VALUE OF IOT1>I5 OR
THE ABSOLUTE VALUE OF IOT2>I5 OR
THE ABSOLUTE VALUE OF IOT3>I5.

WHERE
A NO LOAD condition is one in which a node is not connected to the line.
A SHORT CIRCUIT condition is one in which a short circuit exists across the positive and negative conductors of the line upstream of the node or in the node.
A NIC LOAD condition is one in which a Network Interface Card line transformer is connected across the line at the node.
A POL LOAD condition is one in which a Power Over LAN separator is connected across the line at the node.
V0 is the voltage at the output of the SPEAR.
V1 is a predetermined programmable value which is preferably arrived at by measuring the highest peak value of voltage Vout for a period of a few minutes when switch 408 is OFF. This value is typically multiplied by 2 to arrive at V1. V1 is typically equal to 3 Volts.
V2 is a predetermined programmable value which is preferably arrived at by measuring the lowest value of voltage Vout for a period of a few minutes when switch 408 is ON and when no load is connected between +Vout and −Vout at the output of each coupler 220 (FIG. 3A) and 320 (FIG. 4A). A typical value of V2 is 80% of Vin.
V3 is a predetermined programmable value which is preferably arrived at by measuring the highest peak value of voltage Vout for a period of a few minutes when switch 408 is ON and when a resistance, which corresponds to the maximum roundtrip DC resistance of a maximum allowed length of communications cabling between the hub and a node, typically 50 ohms, is connected between +Vout and −Vout at the output of each coupler 220 (FIG. 3A) and 320 (FIG. 4A). This value is typically multiplied by 2 to arrive at V1. V1 is typically equal to 3 Volts.
V4 is a predetermined programmable value which is preferably arrived at by measuring the highest peak value of voltage Vout for a period of a few minutes when switch 408 is ON and when a resistance, which corresponds to the maximum roundtrip DC resistance of a maximum allowed length of communications cabling between the hub and a node and the resistance of a NIC transformer, typically totaling 55 ohms, is connected between +Vout and −Vout at the output of each coupler 220 (FIG. 3A) and 320 (FIG. 4A). This value is typically multiplied by 2 to arrive at V1. V1 is typically equal to 3 Volts.
V5 is a predetermined programmable value which is preferably 50% of Vin, which represents a typical threshold value of Vin at which power supply 510 (FIG. 7) commence operation.
VoutT1 is Vout measured at time T1;
VoutT2 is Vout measured at time T2;
VoutT3 is Vout measured at time T3;
IO is the current flowing +Vout to −Vout which is measured by sensor 402 (FIG. 5)
IL1 is the predetermined programmable value of the current limit of switch 408 (FIG. 5) and is determined by the maximum allowable DC current through the NIC transformer which does not result in saturation or burnout thereof. IL1 is typically in the vicinity of 10 mA.
I2 is a predetermined programmable value which is preferably arrived at by measuring the maximum peak value of the current IO for a period of a few minutes when switch 408 is ON and when no load is connected between +Vout and −Vout at the output of each coupler 220 (FIG. 3A) and 320 (FIG. 4A). A typical value of I2 is 1 mA.
I3 is a predetermined programmable value which is preferably arrived at by measuring the minimum value of the current IO for a period of a few minutes when switch 408 is ON and when a resistance, which corresponds to the maximum roundtrip DC resistance of a maximum allowed length of communications cabling between the hub and a node, typically 50 ohms, is connected between +Vout and −Vout at the output of each coupler 220 (FIG. 3A) and 320 (FIG. 4A). I3 is typically equal to 80% of IL1.
I5 is a predetermined programmable value which is preferably arrived at by measuring the maximum peak value of the current IO for a period of a few minutes when switch 408 is ON and when no load is connected between +Vout and −Vout at the output of each coupler 220 (FIG. 3A) and 320 (FIG. 4A). This maximum peak value is multiplied by a factor, typically 2. A typical value of I5 is 2 mA.
IOT1 is IO measured at time T1;
IOT2 is IO measured at time T2;
IOT3 is IO measured at time T3;

Reference is now made to FIGS. 19A-19D, 20A-20D, 21A-21D, 22A-22D, 23A-23D and 24A-24D, which illustrate various functionalities for monitoring and managing power consumption in accordance with a preferred embodiment of the present invention. Most or all of the functionalities described hereinbelow employ a basic monitoring and managing technique which is now described:

In accordance with a preferred embodiment of the present invention, the functionality for monitoring and managing power consumption during normal operation includes sensing current on all lines. This is preferably carried out in a generally cyclic manner. The sensed current is compared with programmably predetermined reference values for each line. Alternatively or additionally, voltage may be sensed and employed for this purpose. On the basis of this comparison, each node is classified as being over-current, under-current or normal. The over-current classification may have programmably adjustable thresholds, such as high over-current, and regular over-current. The normal classification may have sub-classifications, such as active mode, sleep mode, and low-power mode.

The system is operative to control the operation of nodes classified as being over-current in the following manner: If the current at a node exceeds a regular over current threshold for at least a predetermined time, power to that node is cut off after the predetermined time. In any event, current supplied to a node is not permitted to exceed the high over-current threshold. In accordance with a preferred embodiment of the present invention, various intermediate thresholds may be defined between the regular over-current threshold and the high over-current threshold and the aforesaid predetermined time to cut-off is determined as a function of which of such intermediate thresholds is exceeded.

The system is operative to control the operation of nodes classified as being under-current in the following manner: Within a relatively short predetermined time following detection of an under-current node, which predetermined time is selected to avoid undesired response to noise, supply of current to such node is terminated.

In parallel to the functionality described hereinabove, the overall current flow to all of the nodes over all of the lines is monitored. This monitoring may take place in a centralized manner or alternatively may be based on an extrapolation of information received in the line-by-line monitoring described hereinabove.

The sensed overall current is compared with a programmably predetermined reference value. On the basis of this comparison, the entire power supply and management subsystem 2180 and the nodes connected thereto are together classified as being over-current or normal. The over-current classification may have programmably adjustable thresholds, such as high over-current, and regular over-current.

The system is operative to control the operation of power supply subsystems and nodes together classified as being over-current in the following manner: If the overall current exceeds a regular overall over-current threshold for at least a predetermined time, power to at least some nodes is either reduced or cut off after the predetermined time. In any event, the overall current is not permitted to exceed the high overall over-current threshold. In accordance with a preferred embodiment of the present invention, various intermediate thresholds may be defined between the regular overall over-current threshold and the high overall over-current threshold and the aforesaid predetermined time to cut-off is determined as a function of which of such intermediate thresholds is exceeded.

Additionally in parallel to the functionality described hereinabove, the system is operative to report either continuously or intermittently, the current level classification of each node and of the entire hub to an external monitoring system.

Further in parallel to the functionality described hereinabove, the system is operative to notify nodes of the impending change in the current supply thereto.

Reference is now made to FIGS. 19A, 19B, 19C and 19D, which are generalized flowcharts each illustrating one possible mechanism for full or no functionality operation in an involuntary power management step in the flowchart of FIG. 16.

Figure 19A:
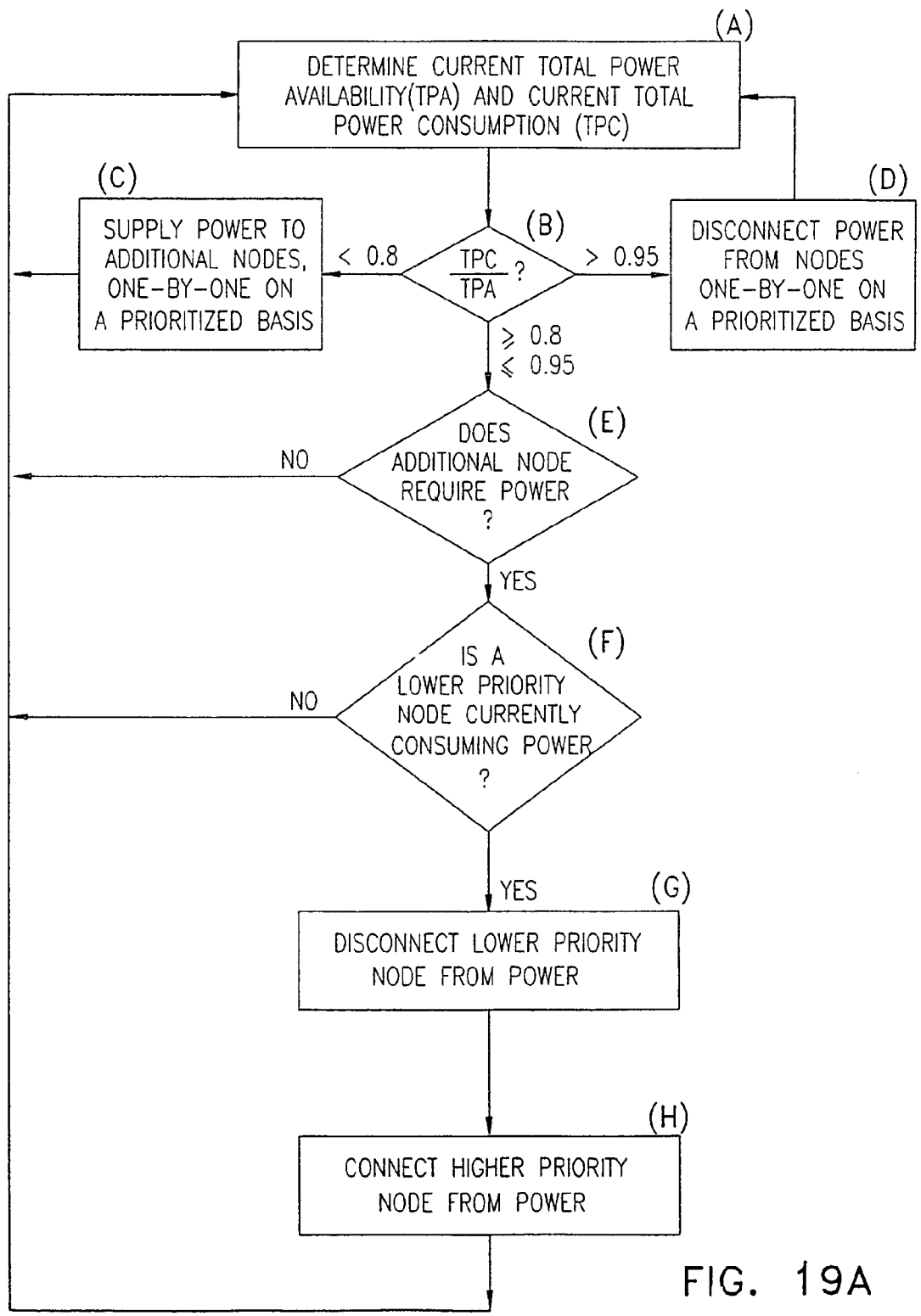

FIG. 19A illustrates a basic technique useful for full or no functionality operation in involuntary power management in accordance with a preferred embodiment of the present invention. As seen in FIG. 19A, the system initially determines the total power available to it as well as the total power that it is currently supplying to all nodes. The relationship between the current total power consumption (TPC) to the current total power availability (TPA) is then determined.

If TPC/TPA is less than typically 0.8, additional nodes are supplied full power one-by-one on a prioritized basis. If TPC/TPA is greater than typically 0.95, power to individual nodes is disconnected one-by-one on a prioritized basis.

If TPC/TPA is equal to or greater than typically 0.8 but less than or equal to typically 0.95, an inquiry is made as to whether a new node requires power. If so, and a node having a lower priority is currently receiving power, the lower priority node is disconnected from power and the higher priority node is connected to power.

Figure 19B:
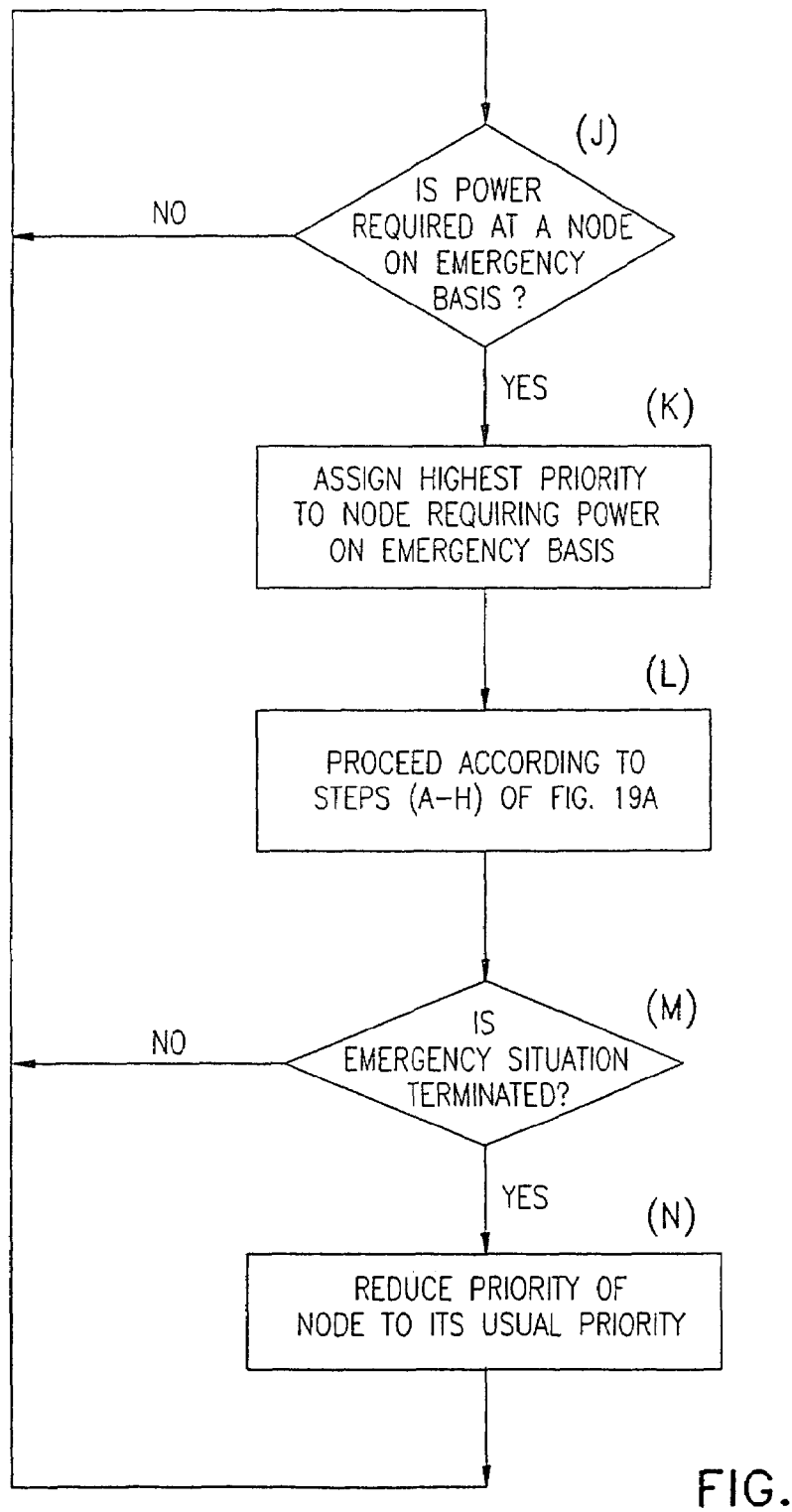

FIG. 19B illustrates a technique useful for full or no functionality operation with emergency override in involuntary power management in accordance with a preferred embodiment of the present invention. The technique of FIG. 19B can be used in the environment of the functionality of FIG. 19A.

As seen in FIG. 19B, the system senses an emergency need for power at a given node. In such a case, the given node is assigned the highest priority and the functionality of FIG. 19A is applied. Once the emergency situation no longer exists, the priority of the given node is returned to its usual priority and the functionality of FIG. 19A operates accordingly.

FIG. 19C illustrates a technique useful for full or no functionality operation having queue-controlled priority in involuntary power management in accordance with a preferred embodiment of the present invention. As seen in FIG. 19C, the system initially determines the total power available to it as well as the total power that it is currently supplying to all nodes. The relationship between the current total power consumption (TPC) to the current total power availability (TPA) is then determined.

If TPC/TPA is less than typically 0.8, additional nodes are supplied full power one-by-one on a queue-controlled, prioritized basis, typically on a first come, first served basis. If TPC/TPA is greater than typically 0.95, power to individual nodes is disconnected one-by-one on a prioritized basis.

If TPC/TPA is equal to or greater than typically 0.8 but less than or equal to typically 0.95, an inquiry is made as to whether a new node requires power. If so, that node is added to the bottom of the queue.

Figure 19D:
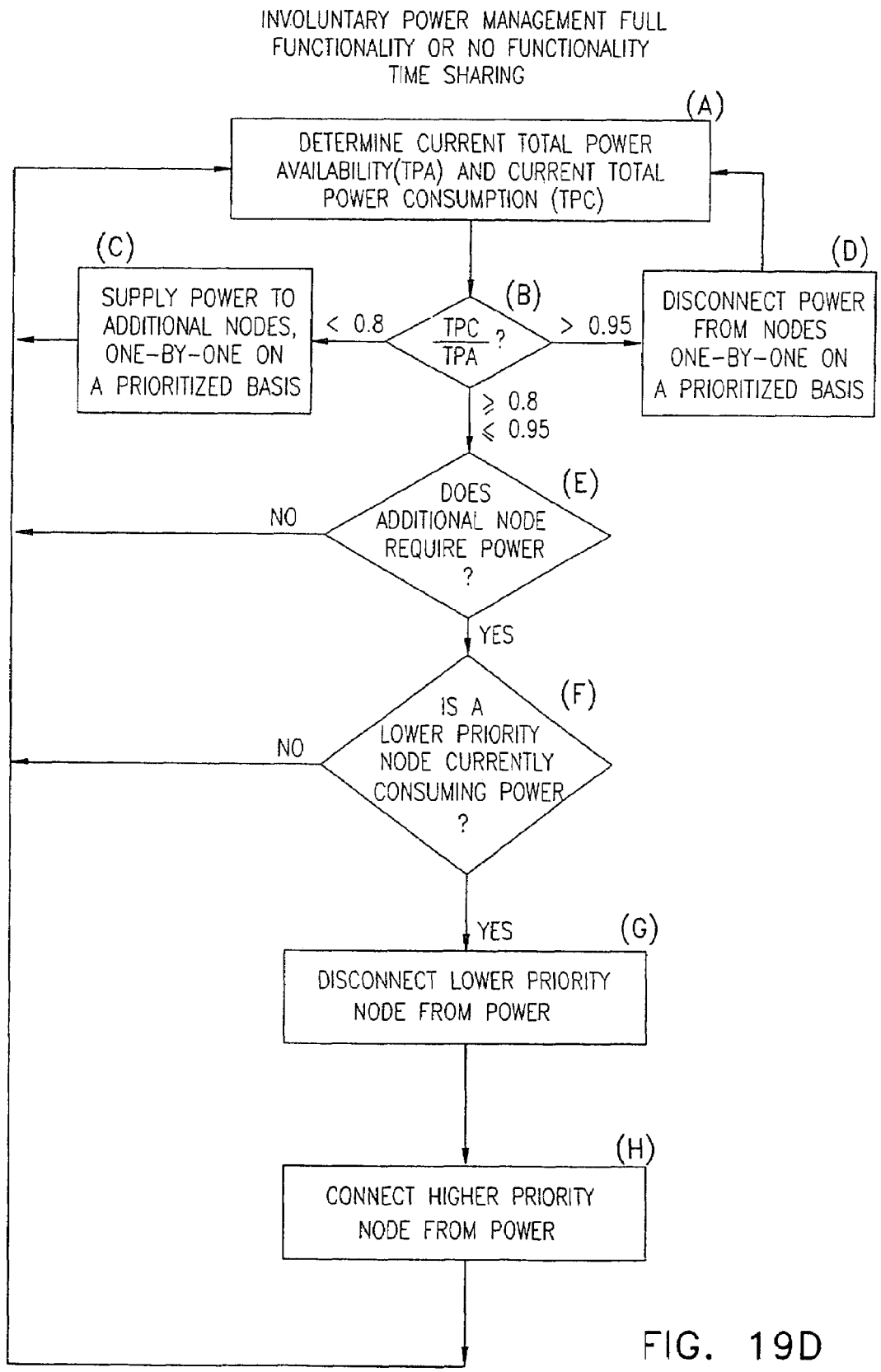

FIG. 19D illustrates a technique useful for full or no functionality operation on a time-sharing prioritized basis in involuntary power management in accordance with a preferred embodiment of the present invention. As seen in FIG. 19D, the system initially determines the total power available to it as well as the total power that it is currently supplying to all nodes. The relationship between the current total power consumption (TPC) to the current total power availability (TPA) is then determined If TPC/TPA is less than typically 0.8, additional nodes are supplied full power one-by-one on a time-sharing, prioritized basis, typically on a basis that the node having the longest duration of use is cut off first. If TPC/TPA is greater than typically 0.95, power to individual nodes is disconnected one-by-one on a prioritized basis.

If TPC/TPA is equal to or greater than typically 0.8 but less than or equal to typically 0.95, an inquiry is made as to whether a new node requires power. If so, and a node having a lower priority, in the sense that it has been receiving power for a longer time, which is above a predetermined minimum time, is currently receiving power, the lower priority node is disconnected from power and the higher priority node is connected to power.

It is appreciated that normally it is desirable that the node be informed in advance in a change in the power to be supplied thereto. This may be accomplished by signally along the communications cabling in a usual data transmission mode or in any other suitable mode.

Reference is now made to FIGS. 20A, 20B, 20C and 20D, which are generalized flowcharts each illustrating one possible mechanism for full or reduced functionality operation in an involuntary power management step in the flowchart of FIG. 16.

Figure 20A:
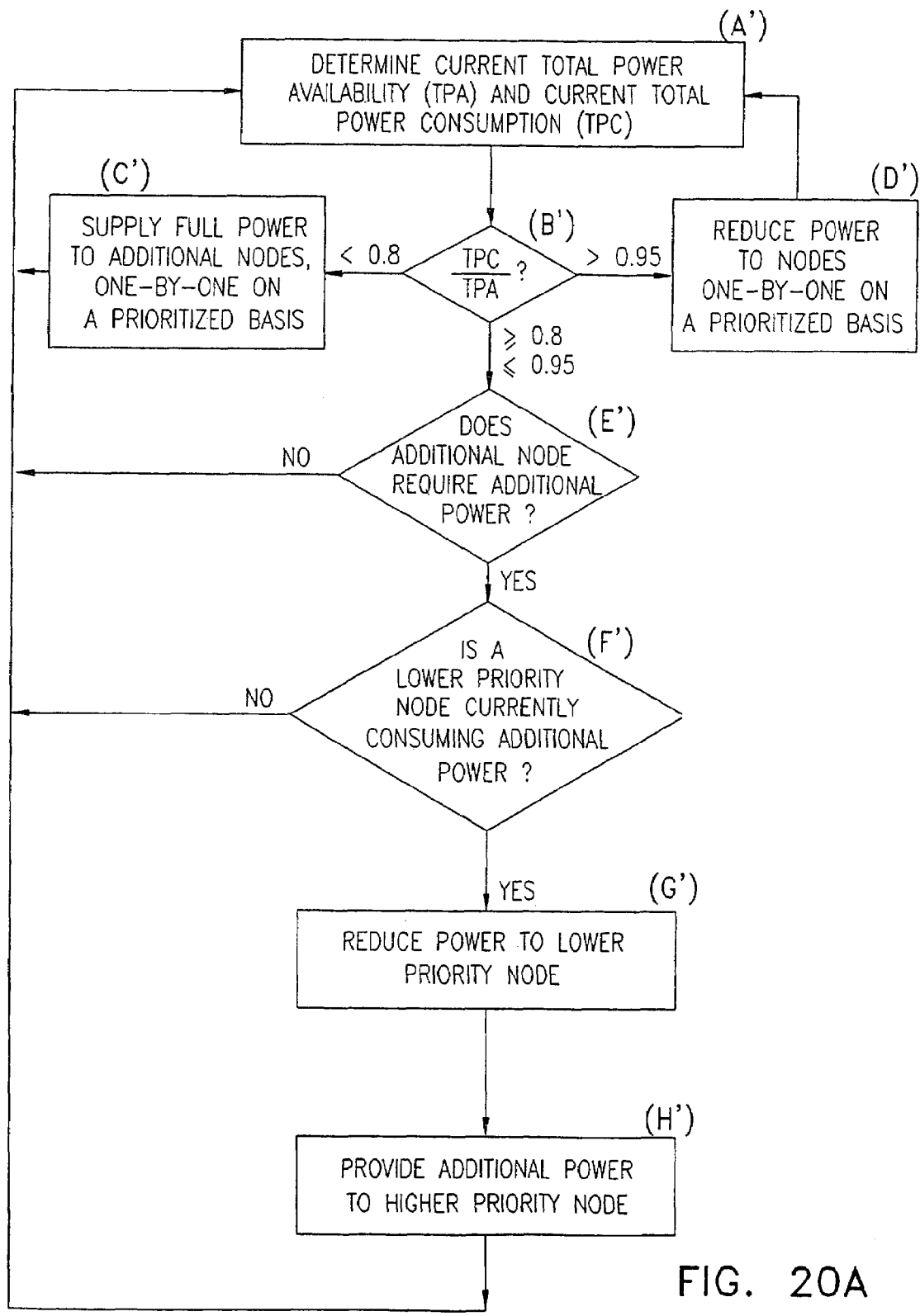
FIGS. 20A, 20B, 20C and 20D are generalized flowcharts each illustrating one possible mechanism for full or reduced functionality operation in an involuntary power management step in the flowchart of FIG. 16.

FIG. 20A illustrates a basic technique useful for full or reduced functionality operation in involuntary power management in accordance with a preferred embodiment of the present invention. As seen in FIG. 20A, the system initially determines the total power available to it as well as the total power that it is currently supplying to all nodes. The relationship between the current total power consumption (TPC) to the current total power availability (TPA) is then determined.

If TPC/TPA is less than typically 0.8, additional nodes are supplied full power one-by-one on a prioritized basis. If TPC/TPA is greater than typically 0.95, power to individual nodes is reduced one-by-one on a prioritized basis.

If TPC/TPA is equal to or greater than typically 0.8 but less than or equal to typically 0.95, an inquiry is made as to whether a new node requires additional power. If so, and a node having a lower priority is currently receiving power, the lower priority node has its power supply reduced and the higher priority node is provided with additional power.

Figure 20B:
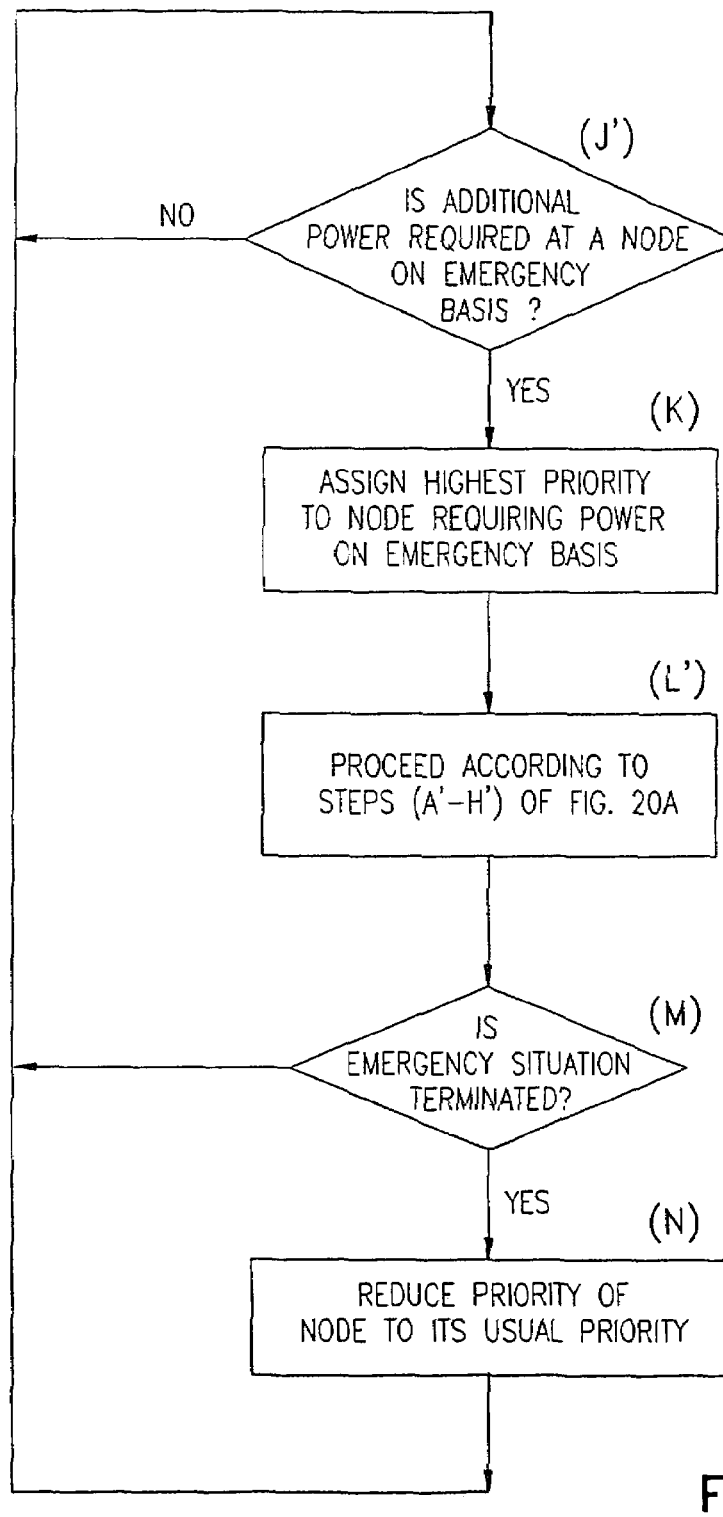

FIG. 20B illustrates a technique useful for full or reduced functionality operation with emergency override in involuntary power management in accordance with a preferred embodiment of the present invention. The technique of FIG. 20B can be used in the environment of the functionality of FIG. 20A.

As seen in FIG. 20B, the system senses an emergency need for additional power at a given node. In such a case, the given node is assigned the highest priority and the functionality of FIG. 20A is applied. Once the emergency situation no longer exists, the priority of the given node is returned to its usual priority and the functionality of FIG. 20A operates accordingly.

Figure 20C:
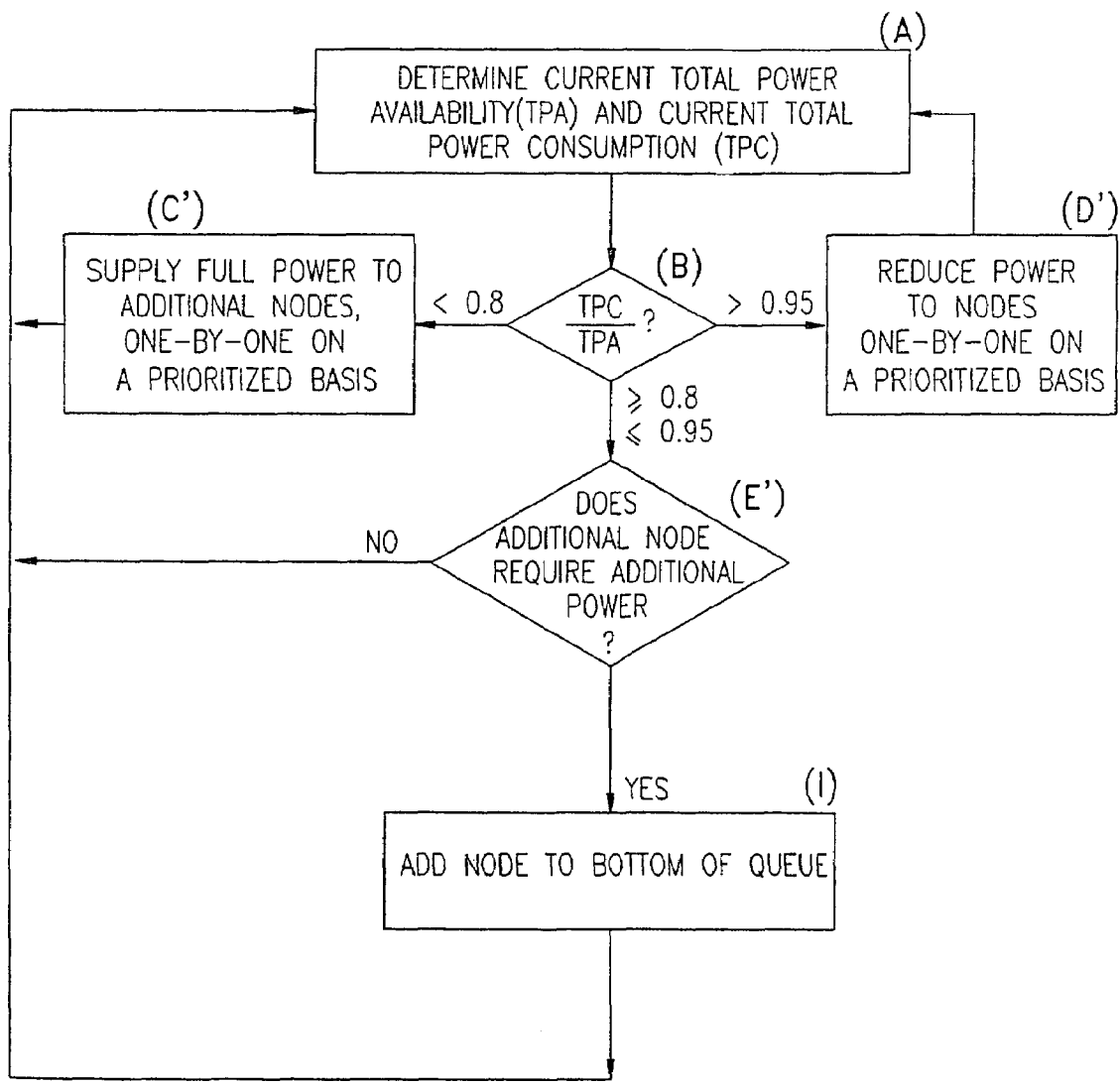

FIG. 20C illustrates a technique useful for full or reduced functionality operation having queue-controlled priority in involuntary power management in accordance with a preferred embodiment of the present invention. As seen in FIG. 20C, the system initially determines the total power available to it as well as the total power that it is currently supplying to all nodes. The relationship between the current total power consumption (TPC) to the current total power availability (TPA) is then determined.

If TPC/TPA is less than typically 0.8, additional nodes are supplied additional power one-by-one on a queue-controlled, prioritized basis, typically on a first come, first served basis. If TPC/TPA is greater than typically 0.95, power to individual nodes is reduced one-by-one on a prioritized basis.

If TPC/TPA is equal to or greater than typically 0.8 but less than or equal to typically 0.95, an inquiry is made as to whether a new node requires additional power. If so, that node is added to the bottom of the queue.

Figure 20D:
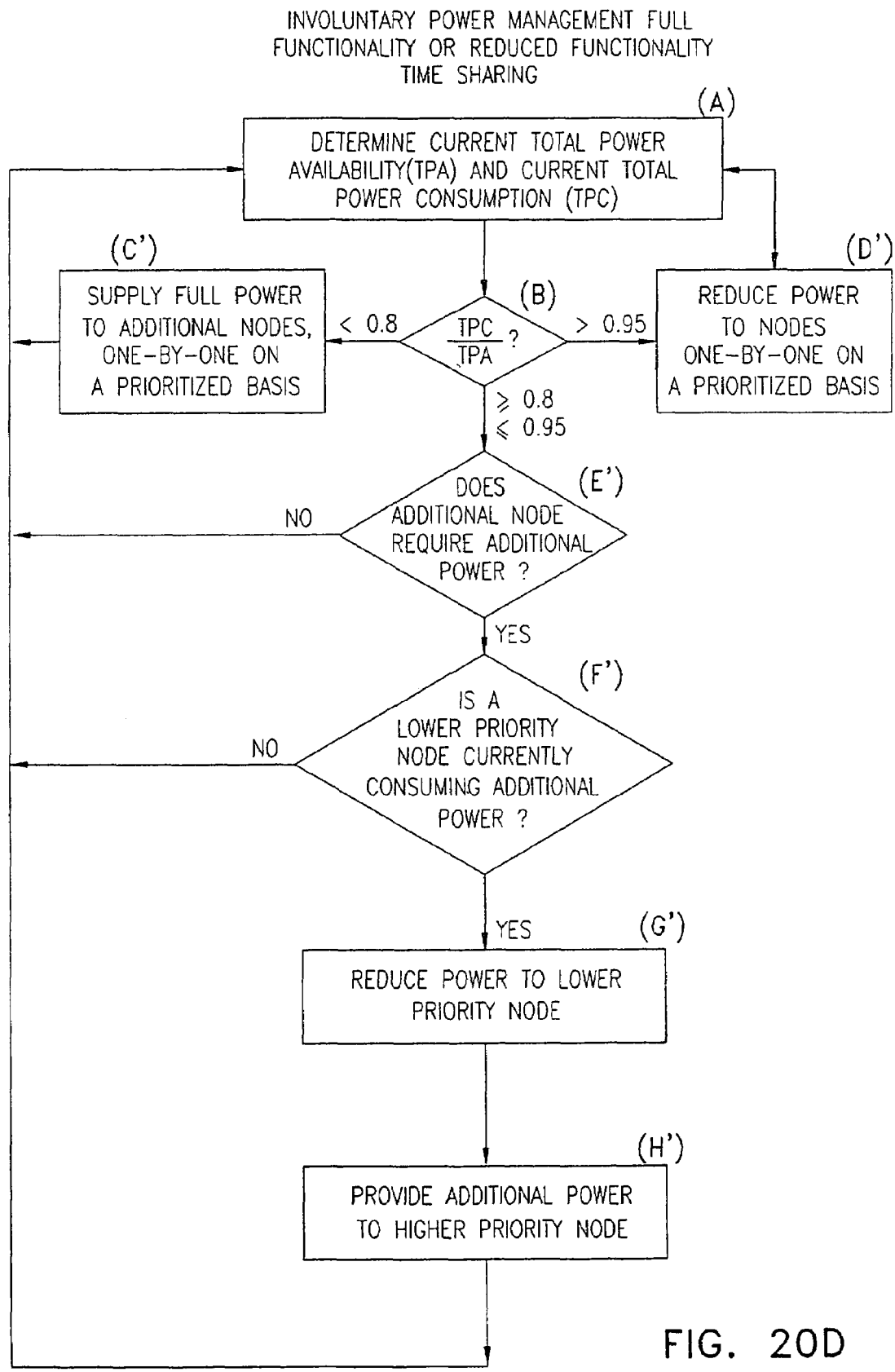

FIG. 20D illustrates a technique useful for full or reduced functionality operation having queue-controlled priority in involuntary power management in accordance with a preferred embodiment of the present invention. As seen in FIG. 20D, the system initially determines the total power available to it as well as the total power that it is currently supplying to all nodes. The relationship between the current total power consumption (TPC) to the current total power availability (TPA) is then determined.

If TPC/TPA is less than typically 0.8, additional nodes are supplied additional power one-by-one on a time-sharing, prioritized basis, typically on a basis that the node having the longest duration of use is cut off first. If TPC/TPA is greater than typically 0.95, power to individual nodes is disconnected one-by-one on a prioritized basis.

If TPC/TPA is equal to or greater than typically 0.8 but less than or equal to typically 0.95, an inquiry is made as to whether a new node requires additional power. If so, and a node having a lower priority, in the sense that it has been receiving power for a longer time, which is above a predetermined minimum time, is currently receiving full power, the lower priority node has its power supply reduced and the higher priority node is provided with additional power.

Reference is now made to FIGS. 21A, 21B, 21C and 21D are generalized flowcharts each illustrating one possible mechanism for node initiated sleep mode operation in a voluntary power management step in the flowchart of FIG. 16.

Figure 21A:
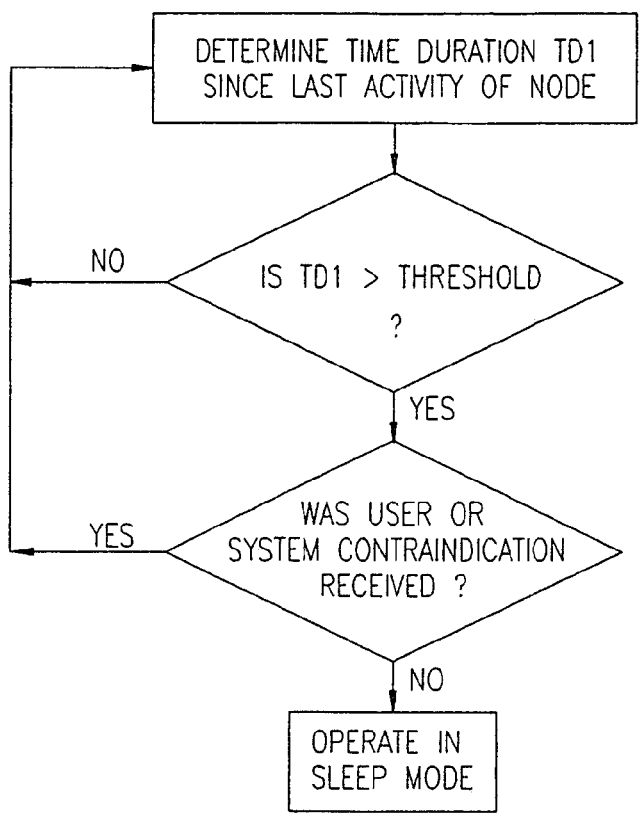
FIGS. 21A, 21B, 21C and 21D are generalized flowcharts each illustrating one possible mechanism for node initiated sleep mode operation in a voluntary power management step in the flowchart of FIG. 16.

FIG. 21A illustrates a situation wherein a node operates in a sleep mode as the result of lack of activity for at least a predetermined amount of time. As seen in FIG. 21A, the time duration TD1 since the last activity of the node is measured. If TD1 exceeds typically a few seconds or minutes, in the absence of a user or system input contraindicating sleep mode operation, the node then operates in a sleep mode, which normally involves substantially reduced power requirements.

Figure 21B:
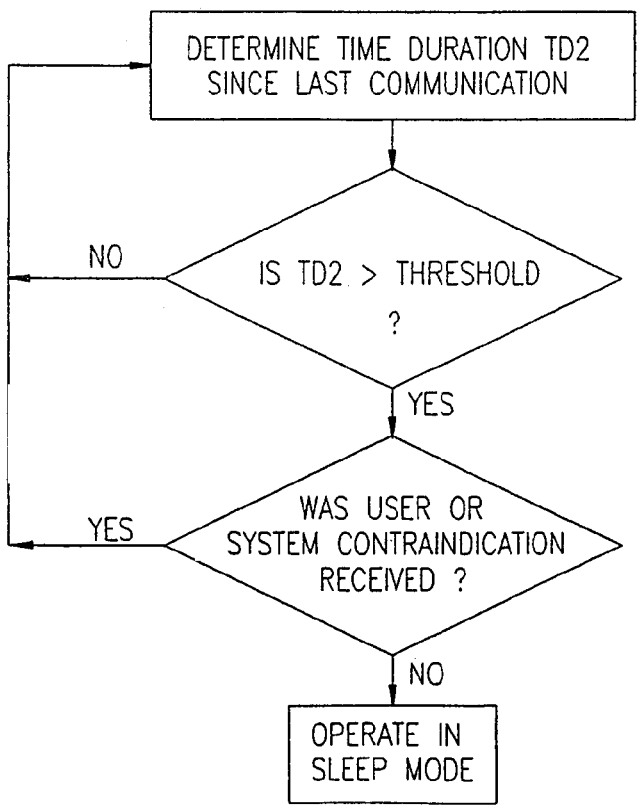

FIG. 21B illustrates a situation wherein a node operates in a sleep mode as the result of lack of communication for at least a predetermined amount of time. As seen in FIG. 21B, the time duration TD2 since the last communication of the node is measured. If TD2 exceeds typically a few seconds or minutes, in the absence of a user or system input contraindicating sleep mode operation, the node then operates in a sleep mode, which normally involves substantially reduced power requirements.

Figure 21C:
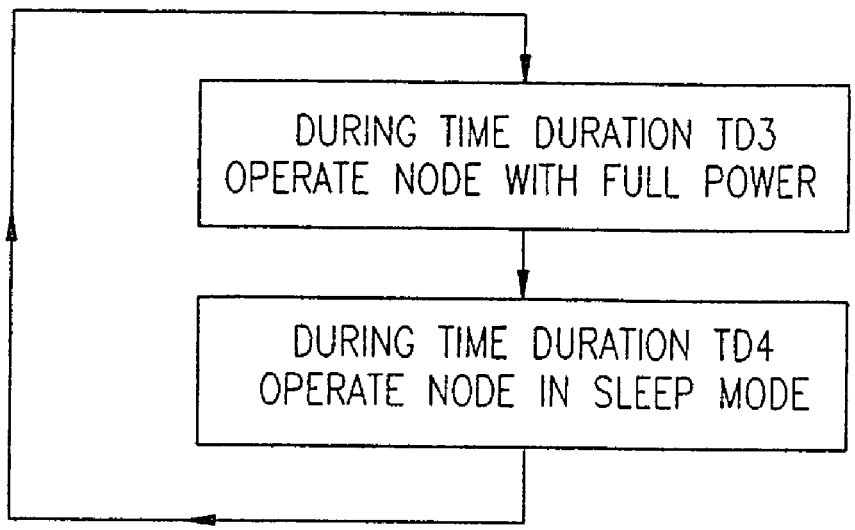

FIG. 21C illustrates a situation wherein a node operates in a sleep mode in response to clock control, such that the node is active within a periodically occurring time slot, absent an input from the system or the user. As seen in FIG. 21C, the time slots are defined as times TD3 while the remaining time is defined as TD4. The node determines whether it is currently within the time slot TD3. If not, i.e. during times TD4, it operates in the sleep mode.

Figure 21D:
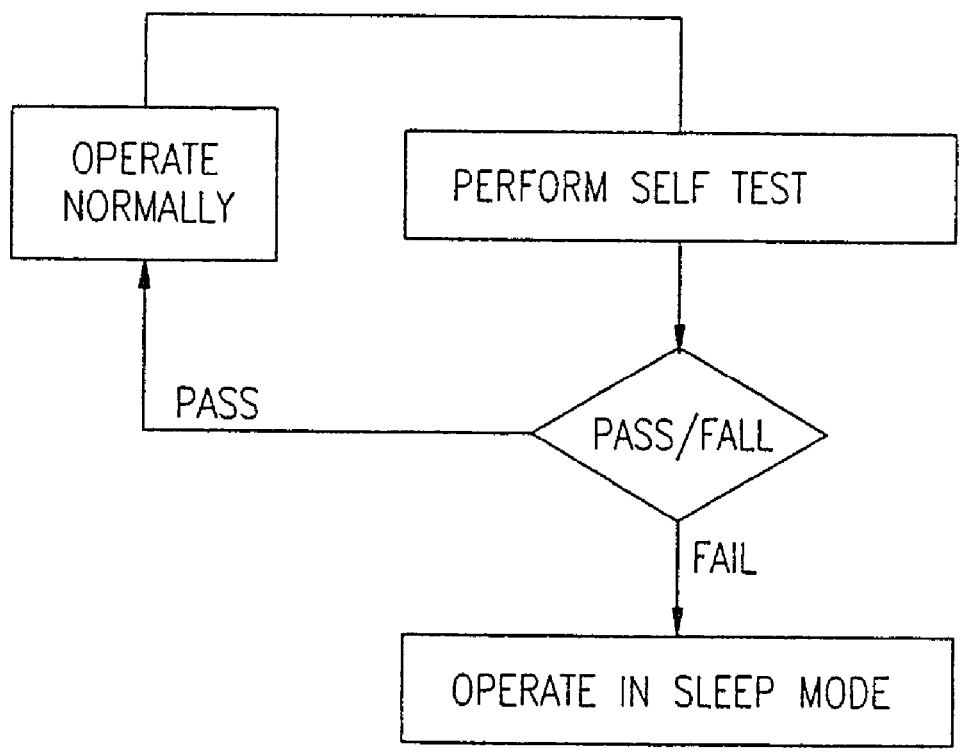

FIG. 21D illustrates a situation wherein a node operates in a sleep mode as the result of a sensed fault condition. As seen in FIG. 21D, the node periodically performs a self-test. The self test may be, for example, an attempt to communicate with the hub or power supply and management subsystem. If the node passes the test, it operates normally. If the node fails the test, it operates in the sleep mode.

Reference is now made to FIGS. 22A, 22B, 22C and 22D, which are generalized flowcharts each illustrating one possible mechanism for hub or power supply and management subsystem initiated sleep mode operation in a voluntary power management step in the flowchart of FIG. 16.

Figure 22A:
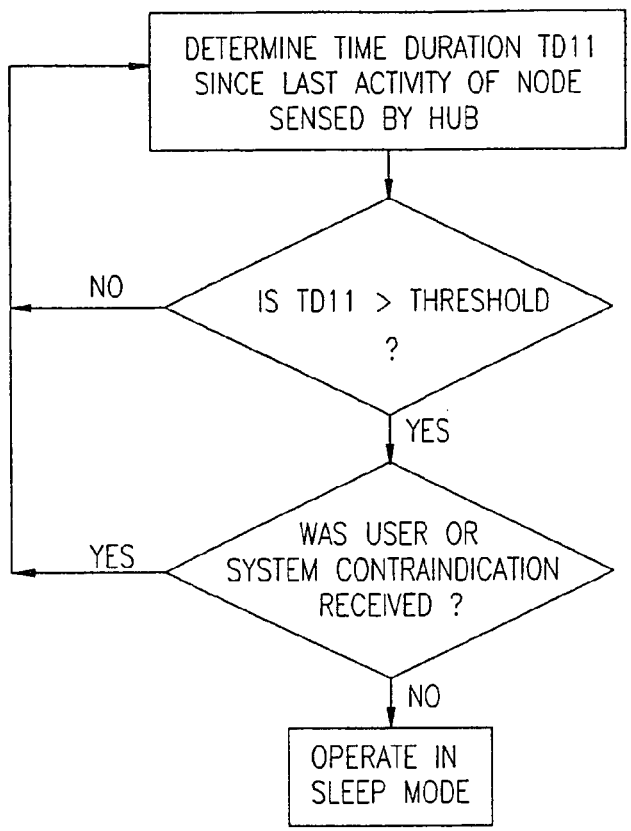
FIGS. 22A, 22B, 22C and 22D are generalized flowcharts each illustrating one possible mechanism for hub initiated sleep mode operation in a voluntary power management step in the flowchart of FIG. 16.

FIG. 22A illustrates a situation wherein a node operates in a sleep mode as the result of lack of activity for at least a predetermined amount of time. As seen in FIG. 22A, the time duration TDI since the last activity of the node as sensed by the hub or power supply and management subsystem is measured. If TDI exceeds typically a few seconds or minutes, in the absence of a user or system input contraindicating sleep mode operation, the node then operates in a sleep mode, which normally involves substantially reduced power requirements.

Figure 22B:
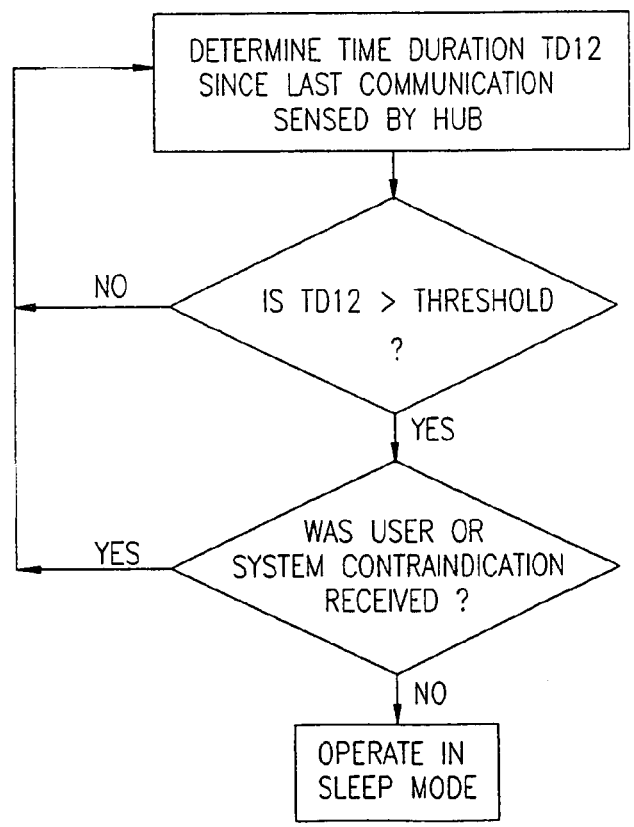

FIG. 22B illustrates a situation wherein a node operates in a sleep mode as the result of lack of communication for at least a predetermined amount of time. As seen in FIG. 22B, the time duration TD2 since the last communication of the node as sensed by the hub or power supply and management subsystem is measured. If TD2 exceeds typically a few seconds or minutes, in the absence of a user or system input contraindicating sleep mode operation, the node then operates in a sleep mode, which normally involves substantially reduced power requirements.

Figure 22C:
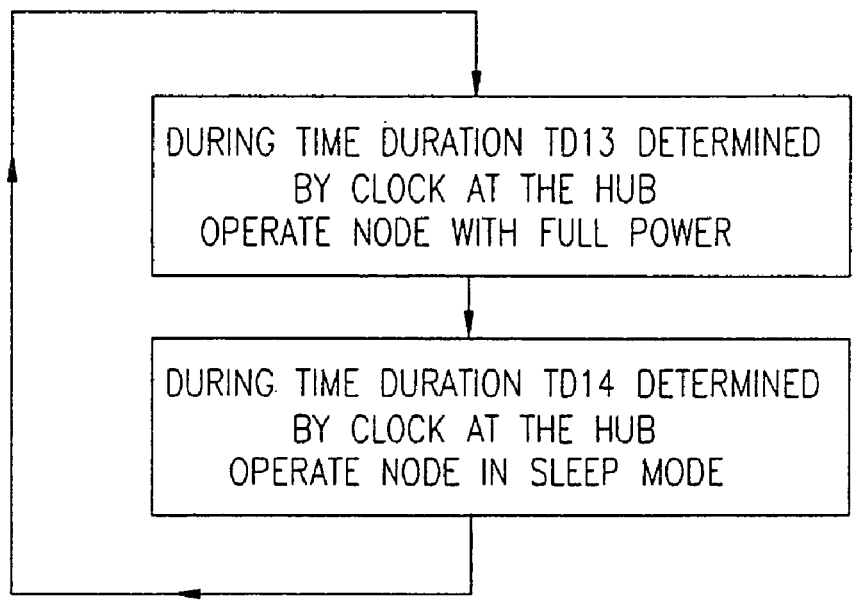

FIG. 22C illustrates a situation wherein a node operates in a sleep mode in response to clock control from the hub or power supply and management subsystem, such that the node is active within a periodically occurring time slot, absent an input from the system or the user. As seen in FIG. 22C, the time slots are defined as times TD3 while the remaining time is defined as TD4. The node determines whether it is currently within the time slot TD3. if not, i.e. during times TD4, it operates in the sleep mode.

Figure 22D:
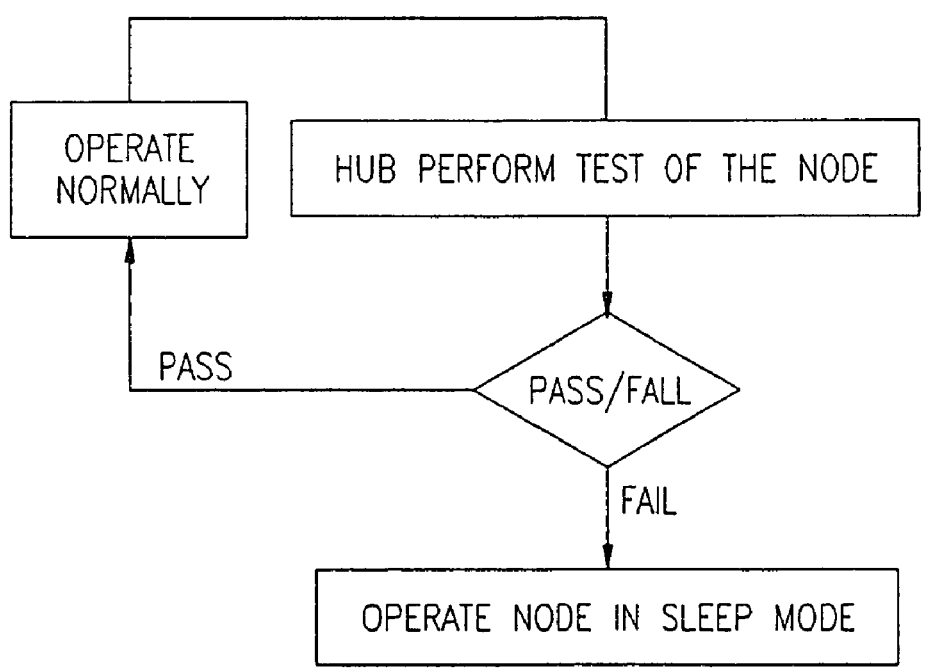

FIG. 22D illustrates a situation wherein a node operates in a sleep mode as the result of a fault condition sensed by the hub or power supply and management subsystem. As seen in FIG. 22D, the hub or power supply and management subsystem periodically performs a test of the node. The self test may be, for example, an attempt to communicate with the hub or power supply and management subsystem. If the node passes the test, it operates normally. If the node fails the test, it operates in the sleep mode.

Reference is now made to FIGS. 23A, 23B, 23C and 23D, which are generalized flowcharts each illustrating one possible mechanism for full or no functionality operation in a voluntary power management step in the flowchart of FIG. 16.

Figure 23A:
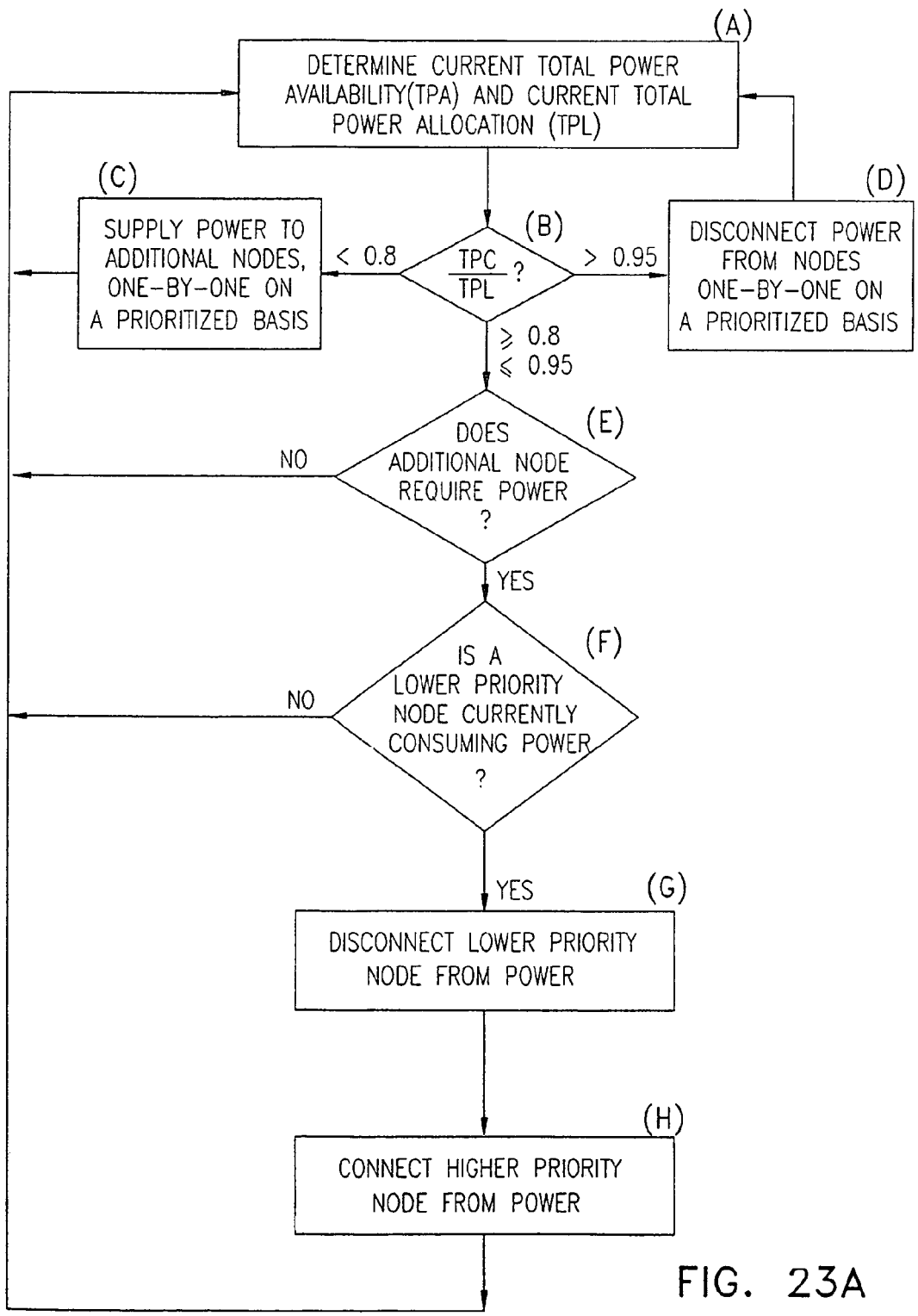
FIGS. 23A, 23B, 23C and 23D are generalized flowcharts each illustrating one possible mechanism for full or no functionality prioritized operation in a voluntary power management step in the flowchart of FIG. 16.

FIG. 23A illustrates a basic technique useful for full or no functionality operation in voluntary power management in accordance with a preferred embodiment of the present invention. As seen in FIG. 23A, the system initially determines the total power allocated to it as well as the total power that it is currently supplying to all nodes. The relationship between the current total power consumption (TPC) to the current total power allocation (TPL) is then determined.

If TPC/TPL is less than typically 0.8, additional nodes are supplied full power one-by-one on a prioritized basis. If TPC/TPL is greater than typically 0.95, power to individual nodes is disconnected one-by-one on a prioritized basis.

If TPC/TPL is equal to or greater than typically 0.8 but less than or equal to typically 0.95, an inquiry is made as to whether a new node requires power. If so, and a node having a lower priority is currently receiving power, the lower priority node is disconnected from power and the higher priority node is connected to power.

Figure 23B:
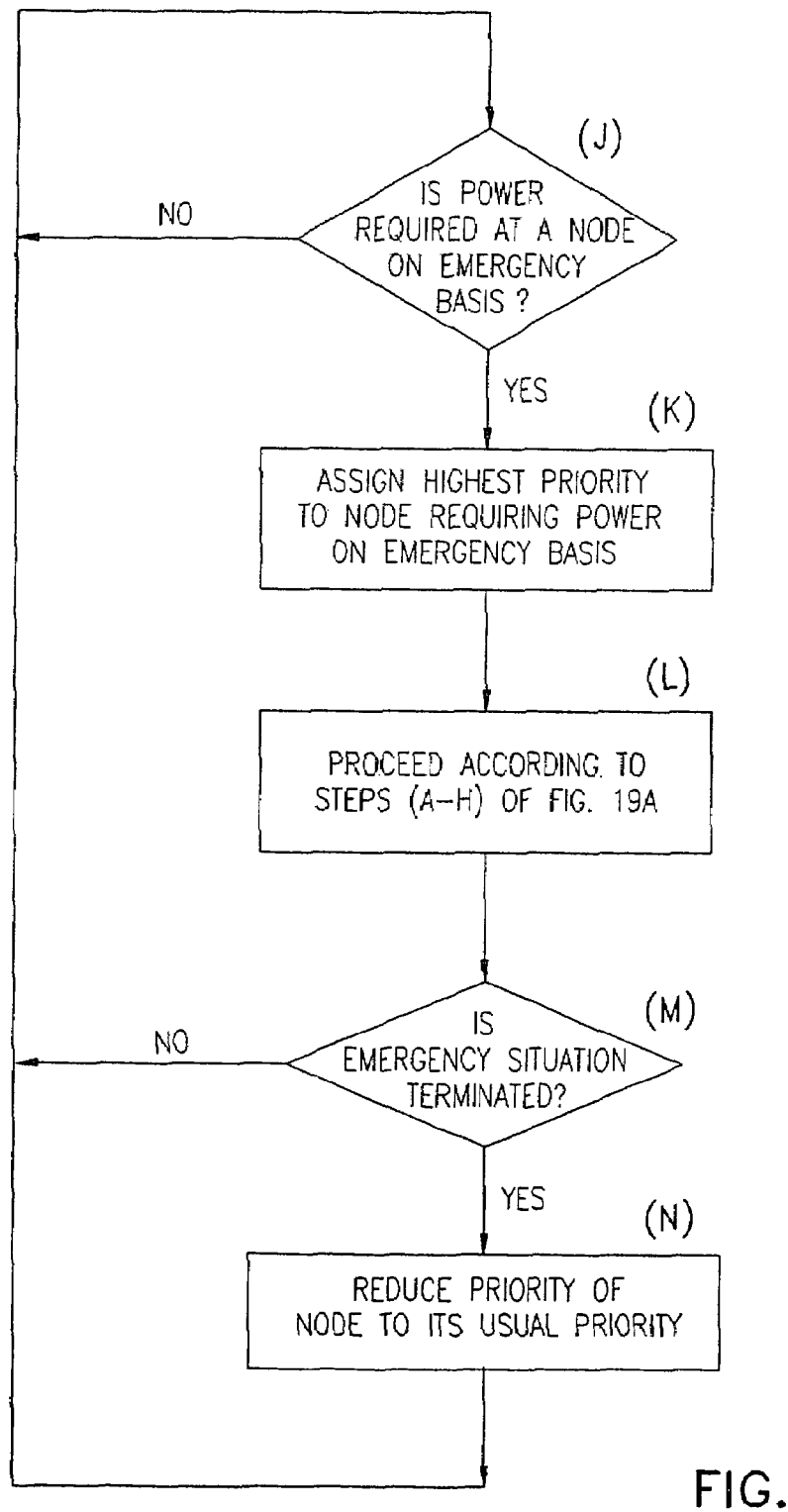

FIG. 23B illustrates a technique useful for full or no functionality operation with emergency override in voluntary power management in accordance with a preferred embodiment of the present invention. The technique of FIG. 23B can be used in the environment of the functionality of FIG. 23A.

As seen in FIG. 23B, the system senses an emergency need for power at a given node. In such a case, the given node is assigned the highest priority and the functionality of FIG. 23A is applied. Once the emergency situation no longer exists, the priority of the given node is returned to its usual priority and the functionality of FIG. 23A operates accordingly.

Figure 23C:
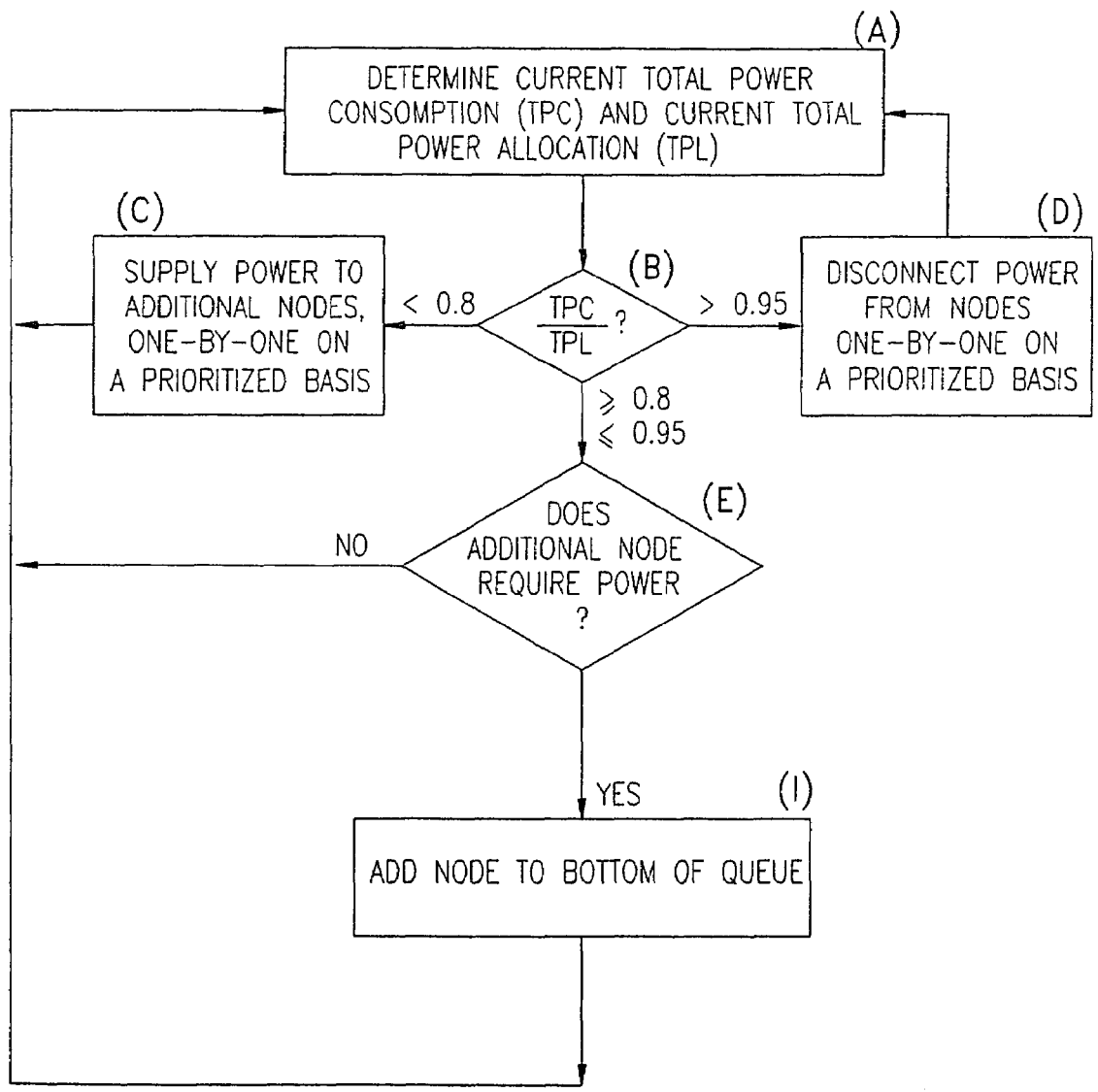

FIG. 23C illustrates a technique useful for full or no functionality operation having queue-controlled priority in voluntary power management in accordance with a preferred embodiment of the present invention. As seen in FIG. 23C, the system initially determines the total power allocated to it as well as the total power that it is currently supplying to all nodes. The relationship between the current total power consumption (TPC) to the current total power allocation (TPL) is then determined.

If TPC/TPL is less than typically 0.8, additional nodes are supplied full power one-by-one on a queue-controlled, prioritized basis, typically on a first come, first served basis. If TPC/TPL is greater than typically 0.95, power to individual nodes is disconnected one-by-one on a prioritized basis.

If TPC/TPL is equal to or greater than typically 0.8 but less than or equal to typically 0.95, an inquiry is made as to whether a new node requires power. If so, that node is added to the bottom of the queue.

Figure 23D:
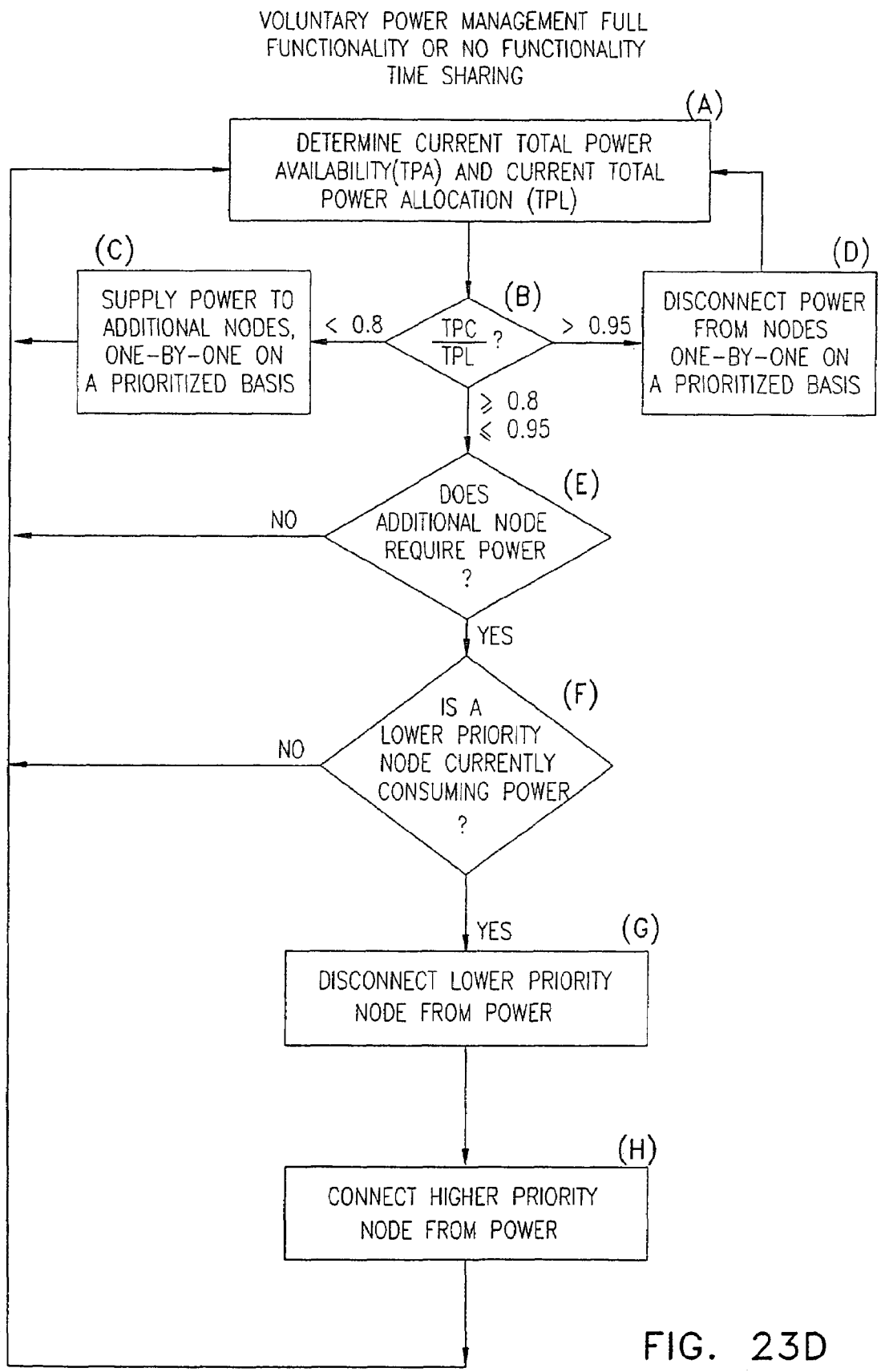

FIG. 23D illustrates a technique useful for full or no functionality operation on a time-sharing prioritized basis in voluntary power management in accordance with a preferred embodiment of the present invention. As seen in FIG. 23D, the system initially determines the total power allocated to it as well as the total power that it is currently supplying to all nodes. The relationship between the current total power consumption (TPC) to the current total power allocation (TPL) is then determined.

If TPC/TPL is less than typically 0.8, additional nodes are supplied full power one-by-one on a time-sharing, prioritized basis, typically on a basis that the node having the longest duration of use is cut off first. If TPC/TPL is greater than typically 0.95, power to individual nodes is disconnected one-by-one on a prioritized basis.

If TPC/TPL is equal to or greater than typically 0.8 but less than or equal to typically 0.95, an inquiry is made as to whether a new node requires power. If so, and a node having a lower priority, in the sense that it has been receiving power for a longer time, which is above a predetermined minimum time, is currently receiving power, the lower priority node is disconnected from power and the higher priority node is connected to power.

It is appreciated that normally it is desirable that the node be informed in advance in a change in the power to be supplied thereto. This may be accomplished by signaling along the communications cabling in a usual data transmission mode or in any other suitable mode.

Reference is now made to FIGS. 24A, 24B, 24C and 24D, which are generalized flowcharts each illustrating one possible mechanism for full or reduced functionality operation in a voluntary power management step in the flowchart of FIG. 16.

Figure 24A:
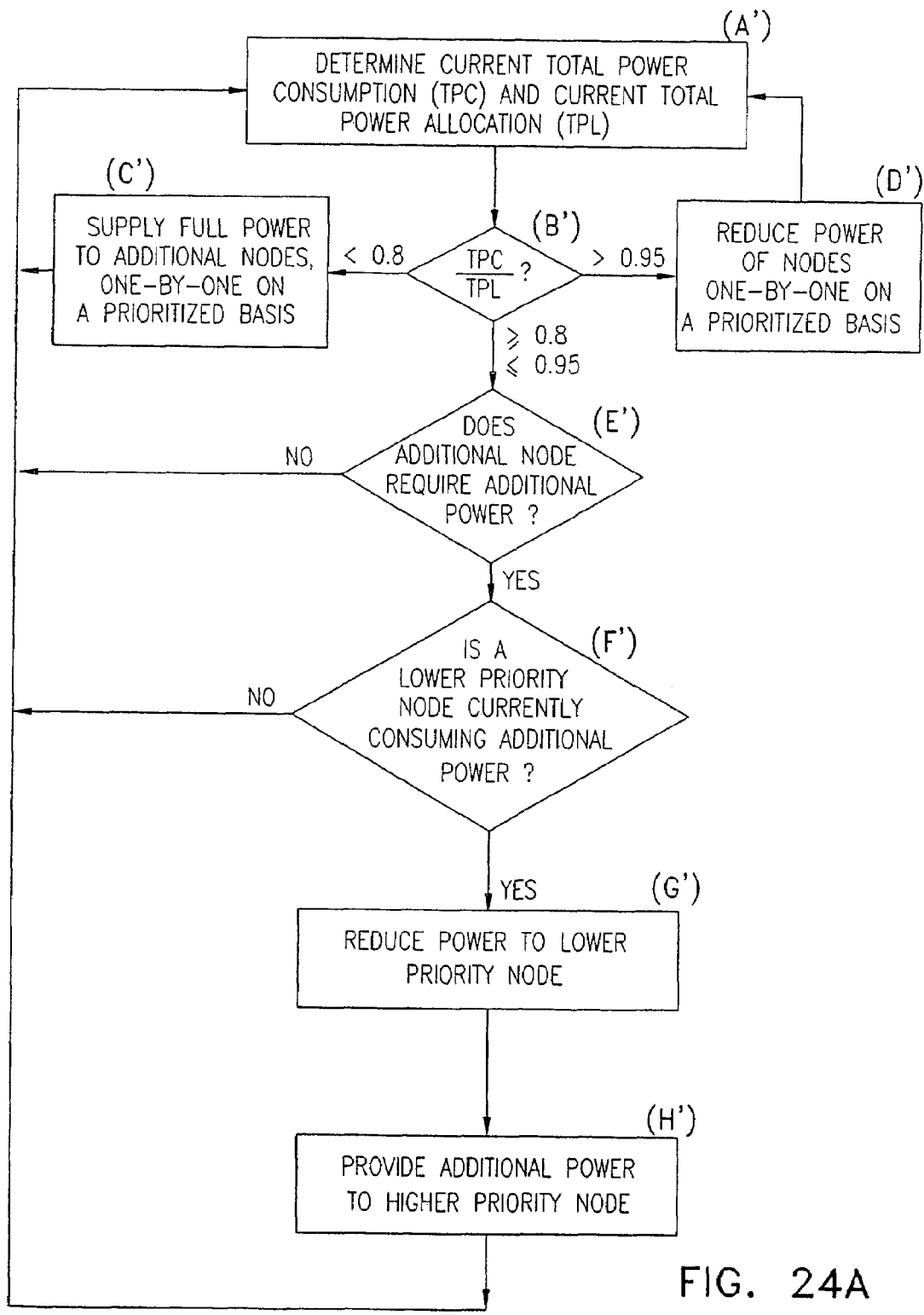
FIGS. 24A, 24B, 24C and 24D are generalized flowcharts each illustrating one possible mechanism for full or reduced functionality prioritized operation in a voluntary power management step in the flowchart of FIG. 16.

FIG. 24A illustrates a basic technique useful for full or reduced functionality operation in voluntary power management in accordance with a preferred embodiment of the present invention. As seen in FIG. 24A, the system initially determines the total power allocated to it as well as the total power that it is currently supplying to all nodes. The relationship between the current total power consumption (TPC) to the current total power allocation (TPL) is then determined.

If TPC/TPL is less than typically 0.8, additional nodes are supplied full power one-by-one on a prioritized basis. If TPC/TPL is greater than typically 0.95, power to individual nodes is reduced one-by-one on a prioritized basis.

If TPC/TPL is equal to or greater than typically 0.8 but less than or equal to typically 0.95, an inquiry is made as to whether a new node requires additional power. If so, and a node having a lower priority is currently receiving power, the lower priority node has its power supply reduced and the higher priority node is provided with additional power.

Figure 24B:
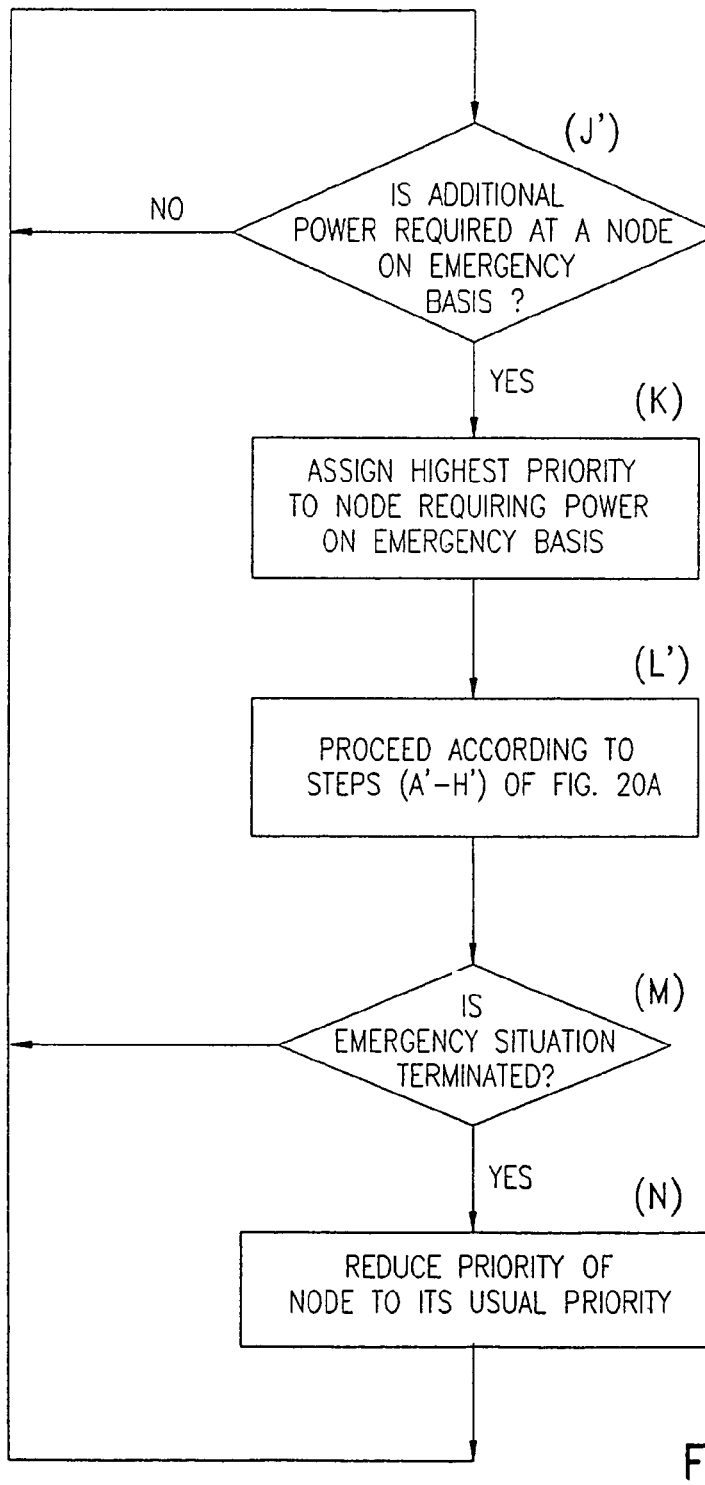

FIG. 24B illustrates a technique useful for full or reduced functionality operation with emergency override in voluntary power management in accordance with a preferred embodiment of the present invention. The technique of FIG. 24B can be used in the environment of the functionality of FIG. 24A.

As seen in FIG. 24B, the system senses an emergency need for additional power at a given node. In such a case, the given node is assigned the highest priority and the functionality of FIG. 24A is applied. Once the emergency situation no longer exists, the priority of the given node is returned to its usual priority and the functionality of FIG. 24A operates accordingly.

Figure 24C:
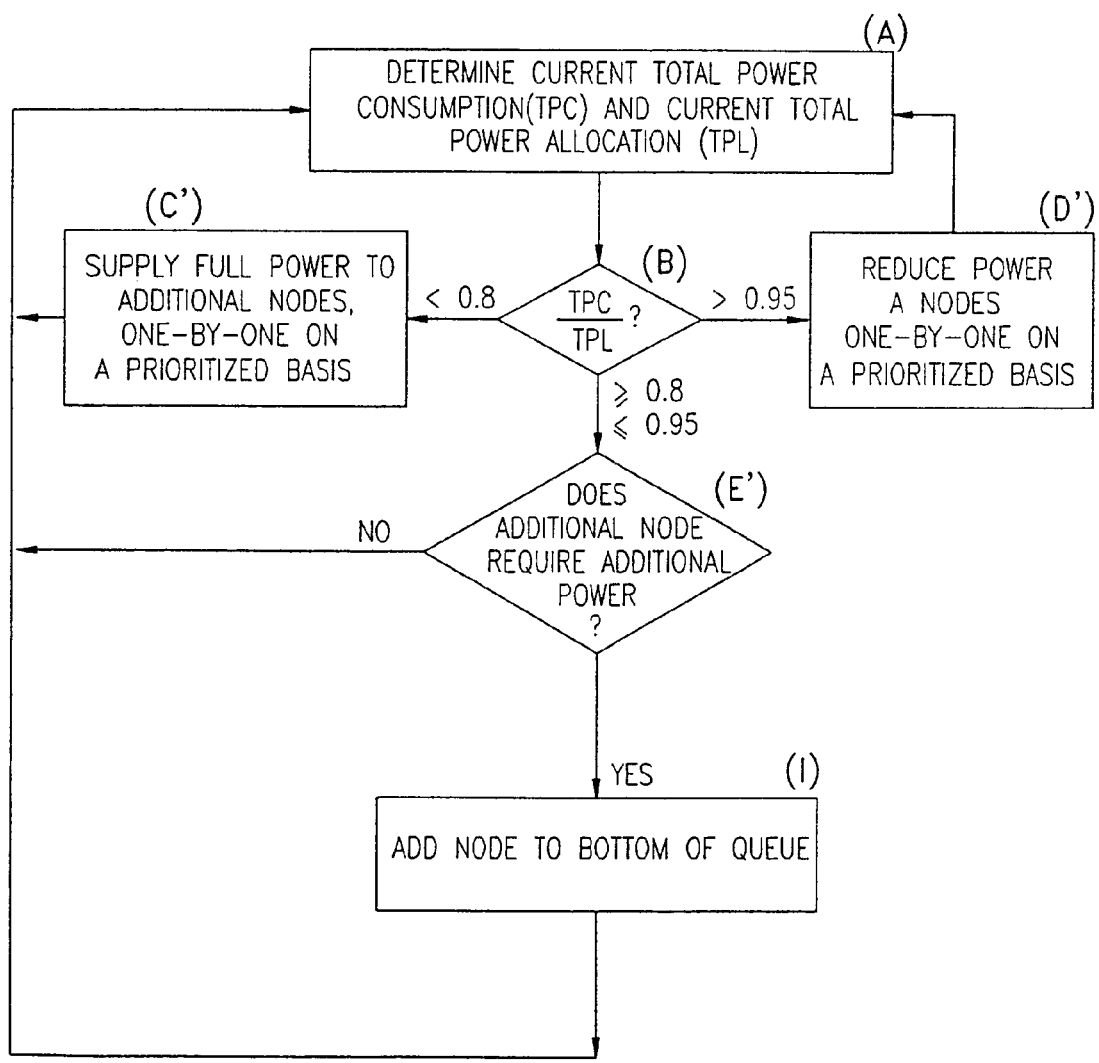

FIG. 24C illustrates a technique useful for full or reduced functionality operation having queue-controlled priority in voluntary power management in accordance with a preferred embodiment of the present invention. As seen in FIG. 24C, the system initially determines the total power allocated to it as well as the total power that it is currently supplying to all nodes. The relationship between the current total power consumption (TPC) to the current total power allocation (TPL) is then determined.

If TPC/TPL is less than typically 0.8, additional nodes are supplied additional power one-by-one on a queue-controlled, prioritized basis, typically on a first come, first served basis. If TPC/TPL is greater than typically 0.95, power to individual nodes is reduced one-by-one on a prioritized basis.

If TPC/TPL is equal to or greater than typically 0.8 but less than or equal to typically 0.95, an inquiry is made as to whether a new node requires additional power. If so, that node is added to the bottom of the queue.

Figure 24D:
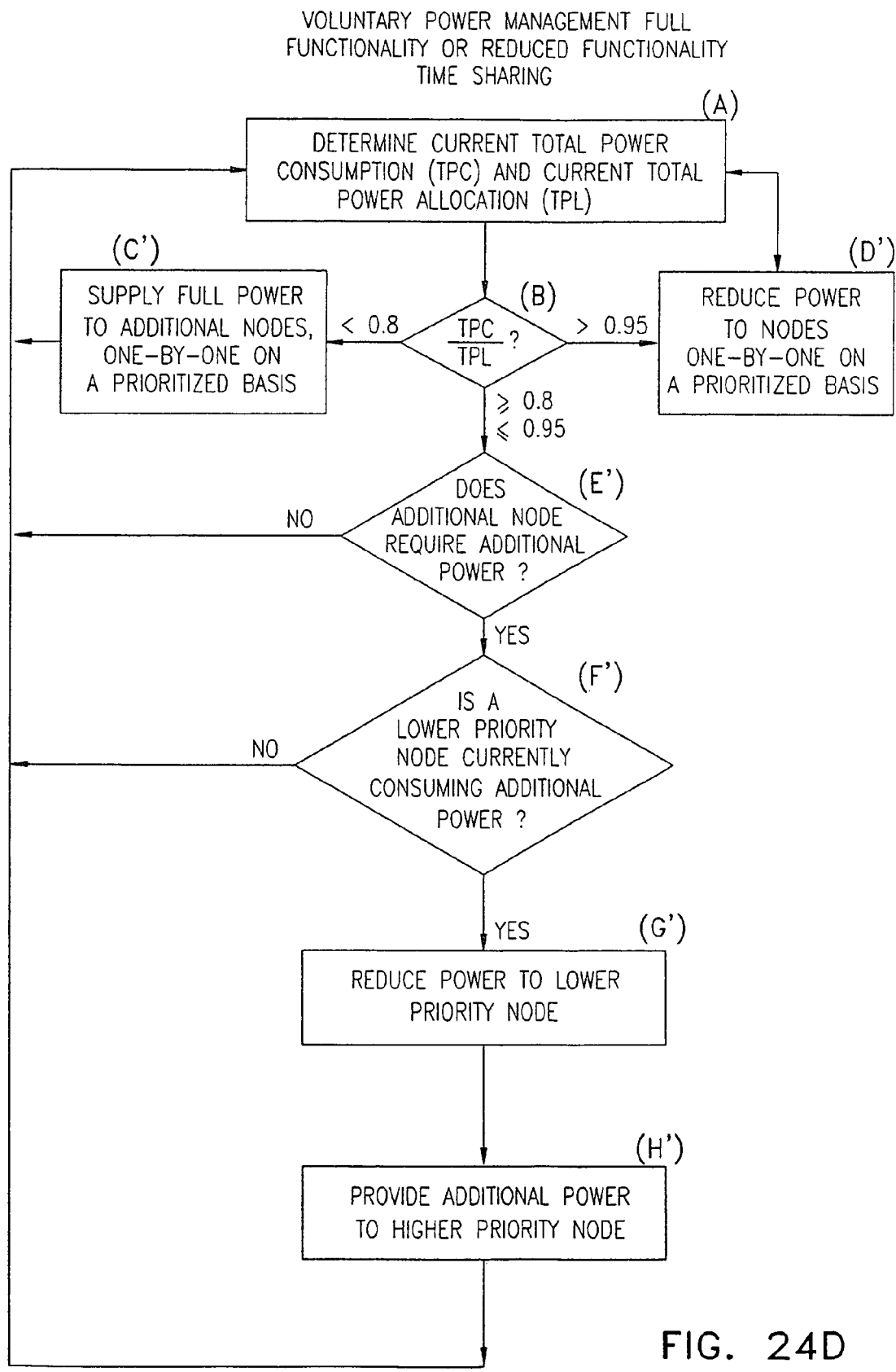

FIG. 24D illustrates a technique useful for full or additional functionality operation on a time sharing prioritized basis in voluntary power management in accordance with a preferred embodiment of the present invention. As seen in FIG. 24D, the system initially determines the total power allocated to it as well as the total power that it is currently supplying to all nodes. The relationship between the current total power consumption (TPC) to the current total power allocation (TPL) is then determined.

If TPC/TPL is less than typically 0.8, additional nodes are supplied additional power one-by-one on a time-sharing, prioritized basis, typically on a basis that the node having the longest duration of use is cut off first. If TPC/TPL is greater than typically 0.95, power to individual nodes is disconnected one-by-one on a prioritized basis.

If TPC/TPL is equal to or greater than typically 0.8 but less than or equal to typically 0.95, an inquiry is made as to whether a new node requires additional power. If so, and a node having a lower priority, in the sense that it has been receiving power for a longer time, which is above a predetermined minimum time, is currently receiving full power, the lower priority node has its power supply reduced and the higher priority node is provided with additional power.

It will be appreciated by persons skilled in the art that the present invention is not limited by what has been particularly shown and described hereinabove. Rather the scope of the present invention includes both combinations and sub-combinations of various features described hereinabove as well as modifications and variations thereof which would occur to persons skilled in the art and which are not in the prior art.

The invention claimed is:

1. A local area network comprising:
a LAN switch;
a plurality of local area network nodes;
a power supply subsystem comprising at least one of a voltage sensor and a current sensor;
a power management and control unit; and
a communication cabling connecting said plurality of local area network nodes to said power supply subsystem and to said LAN switch, said communication cabling providing data communication between said LAN switch and said plurality of local area network nodes;
said power supply subsystem being operative under control of said power management and control unit to;
provide at least some power via the communication cabling to said plurality of local area network nodes;
monitor via said at least one of a voltage sensor and a current sensor at least one of the power consumption of, and the current flow to, each of said plurality of local area network nodes; and
classify, responsive to said monitored at least one of the power consumption and the current flow, each of said plurality of local area network nodes for which said at least some power is provided via the communication cabling as alternatively one of over-current, under current and normal.
wherein in the event said power management and control unit classifies one of said plurality of local area network nodes for which at least some power is provided via the communication cabling as under current, said power management and control unit is further operative to terminate said provided power to said under current one of said plurality of local area network nodes within a predetermined time of said classification of said one of said plurality of local area network nodes as under current.

2. A local area network according to claim 1, wherein in the event said power management and control unit classifies one of said plurality of local area network nodes for which at least some power is provided via the communication cabling as over current, said power management and control unit is further operative to terminate said provided power to said over current one of said plurality of local area network nodes.

3. A local area network comprising:
a LAN switch;
a plurality of local area network nodes;
a power supply subsystem comprising at least one of a voltage sensor and a current sensor;
a power management and control unit; and
a communication cabling connecting said plurality of nodes to said power supply subsystem and to said LAN switch, said communication cabling providing data communication between said LAN switch and said plurality of local area network nodes;
said power supply subsystem being operative under control of said power management and control unit to:
provide at least some power via the communication cabling to said plurality of local area network nodes;
monitor via said at least one of a voltage sensor and a current sensor at least one of the power consumption of, and the current flow to, each of said plurality of local area network nodes;

classify, responsive to said monitored at least one of the power consumption and the current flow, each of said plurality of local area network nodes for which said at least some power is provided via the communication cabling as alternatively one of over-current, under current and normal;

monitor a total of the current flow to said plurality of local area network nodes provided at least some power via the communication cabling; and classify said monitored total current flow as being alternatively one of over-current and normal, wherein said total of the current flow represents the overall current flow to said plurality of local area network nodes.

4. A local area network according to claim 3, further comprising a management workstation in communication with said power management and control unit, said power management and control unit being operative to report said over-current or normal classification of said monitored total current flow to said management workstation.

5. A local area network according to claim 3, wherein said over current classification of said monitored total current flow exhibits a plurality of sub-classifications, each of said over current sub-classifications of said monitored total current flow being associated with a particular one of a plurality of programmably adjustable thresholds which is exceeded.

6. A power supply subsystem for supplying power to a plurality of local area network nodes over communication cabling, said power supply subsystem comprising:

at least one of a voltage sensor and a current sensor; and a power management and control unit, said power management and control unit being operative to:

provide at least some power via the communication cabling to the plurality of local area network nodes;

monitor via said one of a voltage sensor and a current sensor at least one of the power consumption of, and the current flow to, each of the plurality of local area network nodes;

classify, responsive to said monitored at least one of the power consumption and the current flow, each of the plurality of local area network nodes for which said at least some power is provided via the communication cabling as alternatively one of over-current, under current and normal;

monitor a total of the current flow to said plurality of local area network nodes; and classify said monitored total current flow as being one of over-current and normal, wherein said total of the current flow represents the overall current flow to said plurality of local area network nodes being provided said at least some power.

7. A power supply subsystem according to claim 6, wherein said power management and control unit is further operative to communicate said over-current or normal classification to a management workstation.

8. A power supply subsystem according to claim 6, wherein said power management and control unit is further operative to interrogate each of said plurality of local area network nodes to determine if the local area network node has characteristics allowing the local area network node to receive power over the communication cabling, and wherein said power management and control unit is further operative to report a status of said interrogation of each of said local area network nodes to a management workstation.

9. A power supply subsystem according to claim 6, wherein said over current classification of said monitored total current flow exhibits a plurality of sub-classifications, each of said over current sub-classifications of said monitored total current flow being associated with a particular one of a plurality of programmably adjustable thresholds which is exceeded.

10. A method of supplying power to at least one network node over communication cabling, the method comprising:

providing power to the at least one network node over the communication cabling;

monitoring at least one of power consumption of, and current flow to, said at least one network node for which said power is provided;

classifying, responsive to said monitoring, the at least one network node for which said power is provided as alternatively one of over-current, under current and normal; and providing a plurality of programmably adjustable thresholds for said over current classification, wherein said over current classification exhibits a plurality of sub-classification, each of said over current sub-classifications being associated with a particular one of said provided plurality of programmably adjustable thresholds which is exceeded.

11. A method according to claim 10, farther comprising:

terminating, in the event the at least one network node is classified as over current, said provided power to said over current at least one network node within a predetermined time of said classification of the at least one network node as over current, and wherein said predetermined time is a function of said particular one of said provided plurality of programmably adjustable thresholds which is exceeded.

12. A method according to claim 10, further comprising:

in the event the at least one network node is classified as under current, terminating said provided power to said under current at least one network node.

13. A method of supplying power to at least one network node over communication cabling, the method comprising:

providing power to the at least one network node over said communication cabling;

monitoring at least one of power consumption of, and current flow to, said at least one network node for which said power is provided;

classifying, responsive to said monitoring, the at least one network node for which said power is provided as alternatively one of over-current, under current and normal; and in the event the at least one network node is classified as under current, terminating said provided power to said under current at least one network node within a predetermined time of said classification of said at least one network node as under current.

14. A method of supplying power to a plurality of network nodes over communication cabling, the method comprising:

providing power to a plurality of network nodes over the communication cabling;

monitoring at least one of power consumption of and current flow to, each of said plurality of network nodes for which said power is provided;

classifying, responsive to said monitoring, each of said plurality of network nodes for which said power is provided as alternatively one of over-current, under current and normal;

monitoring a total of the current flow to said plurality of network nodes; and classifying said monitored total current flow as being alternatively one of over-current and normal, wherein said total current flow represents the overall current flow to said plurality of network nodes.

15. A method according to claim 14, further comprising:
reporting said classification of said total current flow to a management workstation.

16. A method according to claim 14, further comprising:
providing a plurality of programmably adjustable thresholds for said total current flow over current classification, wherein said total current flow over current classification exhibits a plurality of sub-classification, each of said total current flow over current sub-classifications being associated with a particular one of said provided plurality of programmably adjustable thresholds which is exceeded.

17. A local area network comprising:
a LAN switch;
a plurality of local area network nodes;
a power supply subsystem comprising at least one of a voltage sensor and a current sensor;
a power management and control unit; and
a communication cabling connecting said plurality of nodes to said power supply subsystem and to said LAN switch, said communication cabling providing data communication between said LAN switch and said plurality of local area network nodes;

said power supply subsystem being operative under control of said power management and control unit to:
provide at least some power via the communication cabling to said plurality of local area network nodes;
monitor via said at least one of a voltage sensor and a current sensor at least one of the power consumption of, and the current flow to, each of said plurality of local area network nodes; and
classify, responsive to said monitored at least one of the power consumption and the current flow, each of said plurality of local area network nodes for which said at least some power is provided via the communication cabling as alternatively one of over-current, under current and normal, wherein said over current classification exhibits a plurality of sub-classifications, each of said over current sub-classification being associated with a particular one of a plurality of programmably adjustable thresholds which is exceeded.

18. A local area network according to claim 17, wherein in the event said power management and control unit classifies one of said plurality of local area network nodes for which at least some power is provided via the communication cabling as over current, said power management and control unit is farther operative to terminate said provided power to said over current one of said plurality of local area network nodes within a predetermined time of said classification of said one of said plurality of local area network nodes as over current, and wherein said predetermined time is a function of said particular one of said plurality of programmably adjustable thresholds which is exceeded.

19. A power supply subsystem for supplying power to at least one local area network node over communication cabling, said power supply subsystem comprising:
at least one of a voltage sensor and a current sensor; and
a power management and control unit,
said power management and control unit being operative to:
provide at least some power via the communication cabling to the at least one local area network node;
monitor via said one of a voltage sensor and a current sensor at least one of the power consumption of, and the current flow to, the at least one local area network node: and
classify, responsive to said monitored at least one of the power consumption and the current flow, the at least one network node for which said at least some power is provided via the communication cabling as alternatively one of over-current, under current and normal, wherein in the event said power management and control unit classifies one of the at least one local area network nodes for which at least some power is provided via the communication cabling as under current, said power management and control unit is further operative to terminate said provided power to said under current at least one local area network within a predetermined time of said classification of said at least one local area network node as under current.

20. A power supply subsystem according to claim 19, wherein in the event said power management and control unit classifies one of the at least one network node for which at least some power is provided via the communication cabling as over current, said power management and control unit is further operative to terminate said provided power to said over current at least one network node.

21. A power supply subsystem for supplying power to at least one local area network node over communication cabling, said power supply subsystem comprising:
at least one of a voltage sensor and a current sensor; and
a power management and control unit,
said power management and control unit being operative to:
provide at least some power via the communication cabling to the at least one local area network node;
monitor via said one of a voltage sensor and a current sensor at least one of the power consumption of, and the current flow to, the at least one local area network node: and
classify, responsive to said monitored at least one of the power consumption and the current flow, the at least one local area network node for which said at least some power is provided via the communication cabling as alternatively one of over-current, under current and normal, wherein in the event said power management and control unit classifies the at least one local area network node for which at least some power is provided via the communication cabling as over current, said power management and control unit is further operative to terminate said provided power to said over current at least one network node, and
wherein said over current classification exhibits a plurality of sub-classifications, each of said over current sub-classification being associated with a particular one of a plurality of programmably adjustable thresholds which is exceeded.

22. A power supply subsystem according to claim 21, wherein in the event said power management and control unit classifies one of the at least one local area network nodes for which at least some power is provided via the communication cabling as under current, said power management and control unit is further operative to terminate said provided power to said under current at least one local area network node.

23. A power supply subsystem according to claim 21, wherein said termination of said provided power is within a predetermined time of said classification of said one of said plurality of local area network nodes as over current, and wherein said predetermined time is a function of said particular one of said plurality of programmably adjustable thresholds which is exceeded.

* * * * *

UNITED STATES PATENT AND TRADEMARK OFFICE
CERTIFICATE OF CORRECTION

PATENT NO. : 7,254,734 B2
APPLICATION NO. : 10/712331
DATED : August 7, 2007
INVENTOR(S) : Lehr et al.

It is certified that error appears in the above-identified patent and that said Letters Patent is hereby corrected as shown below:

Claim 1 (Col. 44) line 18 to read: --said power management and control unit "to;"--
Claim 1 (Col. 44) line 30 to read: --current, under current and "normal,"--
Claim 11 (Col. 46) line 27 to read: --A method according to claim 10, "further" comprising:--
Claim 18 (Col. 47) line 55 to read: --and control unit is "further" operative to terminate--

Signed and Sealed this

Eleventh Day of December, 2007

JON W. DUDAS
*Director of the United States Patent and Trademark Office*

UNITED STATES PATENT AND TRADEMARK OFFICE
CERTIFICATE OF CORRECTION

PATENT NO. : 7,254,734 B2  Page 1 of 1
APPLICATION NO. : 10/712331
DATED : August 7, 2007
INVENTOR(S) : Lehr et al.

It is certified that error appears in the above-identified patent and that said Letters Patent is hereby corrected as shown below:

Col. 1, before line 3 to read:

Cross Reference to Related Applications

This application is a continuation of application S/N 10/218,739 filed August 13, 2002, which is a continuation-in-part of application 09/293,343 filed April 16, 1999, now U.S. Patent 6,643,566, which claims benefit of provisional application S/N 60/115,628 filed January 12, 1999.

Signed and Sealed this

Eleventh Day of November, 2008

JON W. DUDAS
*Director of the United States Patent and Trademark Office*